(12) United States Patent
Trandal et al.

(10) Patent No.: US 8,423,548 B1
(45) Date of Patent: Apr. 16, 2013

(54) METHODS AND SYSTEMS FOR INVENTORY MANAGEMENT

(76) Inventors: David Scott Trandal, Santa Barbara, CA (US); David Brahm, The Woodlands, TX (US)

( * ) Notice: Subject to any disclaimer, the term of this patent is extended or adjusted under 35 U.S.C. 154(b) by 0 days.

(21) Appl. No.: 13/526,359

(22) Filed: Jun. 18, 2012

Related U.S. Application Data

(63) Continuation of application No. 13/177,907, filed on Jul. 7, 2011, now Pat. No. 8,219,558, which is a continuation-in-part of application No. 12/109,745, filed on Apr. 25, 2008, now Pat. No. 7,899,823.

(51) Int. Cl.
*G06F 7/00* (2006.01)

(52) U.S. Cl.
USPC .......................................................... 707/736

(58) Field of Classification Search .................. 707/736; 705/28
See application file for complete search history.

(56) References Cited

U.S. PATENT DOCUMENTS

2006/0282342 A1 * 12/2006 Chapman ........................ 705/28

* cited by examiner

*Primary Examiner* — Truong Vo

(57) ABSTRACT

The present invention relates to inventory management solutions, and in particular, to methods and systems for inventorying items and property over wireless and data networks, using digital imaging, positioning, RFID, and data terminals. The user experience in performing inventory management is simplified and enhanced over existing methods.

20 Claims, 70 Drawing Sheets http://www.HomeInventoryPersonalProperty.com

Your Home Inventory
*Secure. Easy. FREE!*

Products & Services    Contact Us    Help

Current Customer Sign In: ▷

New Customer Registration: ▶ — 5300

Name: Jane Jones — 5510

Mobile Number: 805-555-1212 — 5520

Password: *********** — 5530

Multi-Level Residence: ○ Yes  ● No — 5540 if yes, how many levels (not including the basement) ⬚ — 5550

[Download Now] — 5560

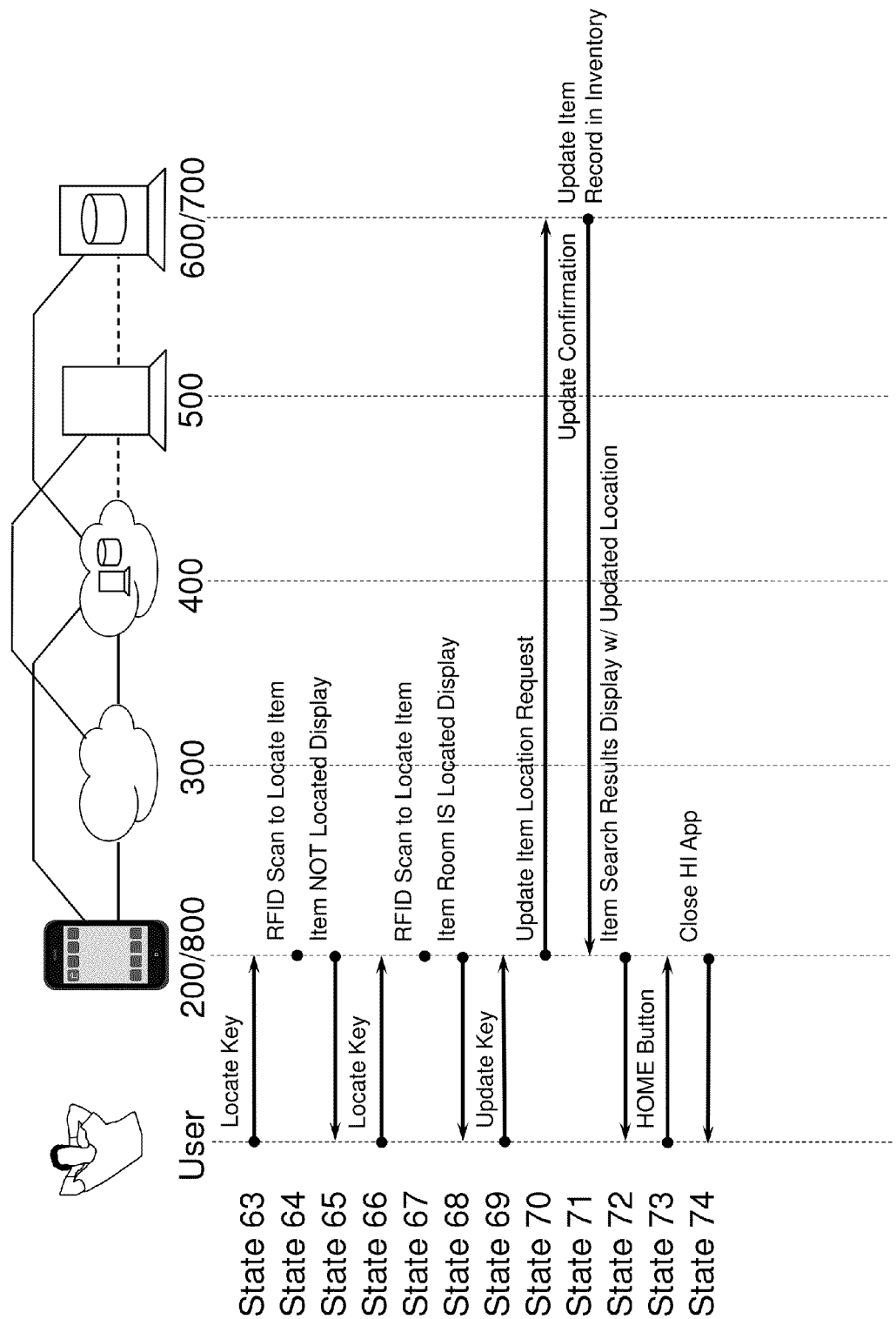

METHODS AND SYSTEMS FOR INVENTORY MANAGEMENT

CROSS REFERENCE TO RELATED APPLICATIONS

This application is a continuation of U.S. patent application Ser. No. 13/177,907, entitled "Methods and Systems for Inventory Management", filed on Jul. 7, 2011, which is a continuation-in-part of U.S. patent application Ser. No. 12/109,745, entitled "Methods and Systems for Inventory Management", filed Apr. 25, 2008 which is now a U.S. Pat. No. 7,899,823 which issued on Mar. 1, 2011, the contents of which are incorporated herein by reference in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

FIELD OF THE INVENTION

The present invention relates to inventory management using digital imaging, wireless communications, and voice and data networks.

BACKGROUND OF THE INVENTION

Homeowners would find it useful to have an organized record of their belongings. This organized record can be used in the event of an emergency. For example, an organized list can be used to file an insurance claim in the event of a burglary or a fire. An organized list with appropriate beneficiary assignments can also be used in personal estate planning.

Getting homeowners (homeowners in this document includes renters) to create a list of their belongings, and keep it updated, is difficult. Conventionally, homeowners have relied upon a combination of paper lists, receipts, and their memory to recreate a comprehensive list of their personal property after a disaster. In some cases, particularly with the advent of digital photography, homeowners have captured images of the items or personal property in their homes. More recently, software programs have been introduced (e.g., Quicken's Home Inventory Manager) to facilitate the list capture and organization process.

Even with recent advances, homeowner inventory management continues to be tedious and time consuming. Consequently, very few homeowners create an inventory of their belongings.

Homeowner's and businesses would also find it useful to determine quickly and easily the market price of homes/businesses for purchase or rent/lease in the event they decide to move.

SUMMARY OF THE INVENTION

Example embodiments listed simplify the data capture, organization, and secure storage of a list of an owner's belongings. In addition, embodiments are described facilitating the insurance claims process, reducing the cost to the insurance industry of claims management.

In addition, embodiments of the present invention provide methods and systems to enable a service provider to offer Home Inventory services that allow subscribers to store information about a collection of items (e.g., photos and photo renditions of the items). Certain methods and systems described herein facilitate the process of inventorying residence or office items using RFID techniques. Certain methods and systems described herein provide for the creation of a rendition of a user's residence. These renditions are optionally used to organize objects/items of interest to the user and are readily accessible to the user from various devices over various networks. The data/objects are retained indefinitely (or for an extended or designated period of time) in a reliable, secure, and accessible database and/or data store. In an example embodiment, this is achieved with large redundant data farms with geographic separation, using Redundant Arrays of Independent/Inexpensive Disks (RAID) technology, distributed peer-to-peer redundant data storage and/or other techniques. These objects of interest to the user are optionally updated as the user makes new acquisitions, sells, donates, and/or disposes of their personal property.

Certain methods and systems described herein provide for the separation of items within an image in the context of a Home Inventory system. Separable items from an image can be categorized or labeled using computer assisted pattern recognition techniques (e.g., pattern matching a lamp against a stored dictionary of household items). The terms, "for example", "e.g.", "optionally", as used herein, are intended to be used to introduce non-limiting examples. Optionally, Home Inventory service provider personnel can enhance the separation and identification process by auditing the output from the recognizer and making any necessary corrections.

Assigning labels to items helps the subscriber organize and search their personal property. In addition, labels can be used to categorize item types and their value. Determining value of household items has certain advantages for the user as compared to only providing a list or an inventory of photos. For example, labeled items with underlying values can help a user determine if s/he is over or under insured.

Certain methods and systems described herein provide for simplified means of determining the purchase and/or rental price of homes using imaging and/or location techniques.

A given embodiment may include some or all of the features, functionality, systems and methods described herein.

An example embodiment provides a method of determining the rental value of a residence or property, comprising: providing an inventory software program to a mobile device associated with a first user, wherein the inventory software program is: preinstalled on the mobile device, transmitted to the mobile device of the first user, or partially preinstalled on the mobile device and partially transmitted to the mobile device of the first user; receiving at the inventory system: a first image wherein the image is sent from the first user's mobile device, a camera lens direction and location of the mobile device at substantially the same time the first image was taken by the first user using the first user's mobile device, and, storing in computer readable memory the first image received from the first user's mobile device, the camera lens direction, and the geographic location associated with the first image; determining, the address of the residence or property in the first image based at least in part on the geographic location information and camera lens direction; storing in computer readable memory the property address; and, optionally, accessing a data store to determine the rental value at the residence or property address; and, optionally, providing a user interface via which the rental value of the residence or property can be viewed; and, optionally, providing a user interface control which sends a user offer to rent to the property owner; and, optionally, providing via the user interface additional details on the property including, for examples, the number of bedrooms and bathrooms, school district, square footage, whether pets are allowed and how many, average utility bills, pool access, other general or specific rental information; and, optionally, providing a user interface control over a data network which enables the user to forward the property information including the rental value to an email address; and, optionally, providing a nearby rental property user interface control; accessing a data store to locate nearby rental property wherein the located rental property is determined at least in part on the geographic location of the user's mobile device; providing via the user interface a listing of one or more nearby rental properties; providing via the user interface directions from the location of the user's mobile device to one or more of the nearby rental properties; and, optionally, wherein the offer to rent sent to the property owner is sent anonymously.

An example embodiment provides a method of recording an inventory of items, comprising: providing an inventory software program to a mobile device associated with a first user, wherein the inventory software program is: preinstalled on the mobile device, transmitted to the mobile device of the first user, or partially preinstalled on the mobile device and partially transmitted to the mobile device of the first user; receiving at the inventory system: a first image wherein the image is sent from the first user's mobile device, a geographic location of the first user's mobile device which corresponds to at least in part the geographic location of the mobile device at substantially the same time the first image was taken by the first user using the first user's mobile device, and, storing in computer readable memory the first image received from the first user's mobile device and the geographic location associated with the first image; receiving at the inventory system: a second image wherein the image is sent from the second user's mobile device, a geographic location of the second user's mobile device which corresponds to at least in part the geographic location of the mobile device at substantially the same time the second image was taken by the second user using the first user's mobile device, and, storing in computer readable memory the second image received from the second user's mobile device and the geographic location associated with the second image; providing a user interface via which the first user can search stored items information, geographic location information, or item and geographic location information associated with the first image; providing a user interface via which the second user can search stored items information, geographic location information, or item and geographic location information associated with the second image; providing a user interface via which the first user and second user can display a ranking of searched items; and, optionally, extending search to include information the user has associated with images including (a) purchase receipts, (b) warrantees, (c) notes, or any combination of (a), (b), and (c); and, optionally, providing a user interface via which the first user can designate a third user access to information related to one or more items in the first user's stored inventory of items; and, optionally, providing non-user access to aggregated item stored inventory with location information such that the non-user cannot determine the first user items or second user items; and, optionally, wherein the image is one or more pictures, one or more videos, or any combination of pictures and videos; and, optionally, wherein the image is a video of the some or all of the contents of rooms within the first user's first location.

An example embodiment provides a method for recording an inventory of items, the method comprising: providing an inventory software program to a mobile device associated with a first user, wherein the inventory software program is: preinstalled on the mobile device, transmitted to the mobile device of the first user, or partially preinstalled on the mobile device and partially transmitted to the mobile device of the first user; receiving an image wherein the image is from the first user's mobile device; substantially at the same time the first image was taken by the first user using the first user's mobile device: receiving a camera lens direction of the mobile device; detecting a radio frequency identification reflection identifying one or more object signatures; receiving a geographic location of the first user's mobile device; storing in computer readable memory the received image, the camera lens direction, any detected RFID(s), the geographic location; associating one or more item labels with the image based at least in part on pattern recognition, detected RFID, or pattern recognition and detected RFID; providing a user interface wherein the image and any associated label can be viewed, edited, or viewed and edited; and, optionally, providing a user interface via which the user can search stored items information; and, in response to a search request displaying the search results wherein the search results include an image of the item, location of the item, or image and location of the item; and, optionally, providing a user interface control which determines if a user item is in an area based at least in part on the detection of an RFID; and, optionally, wherein the user interface enables a user to view, edit, or view and edit the location of the item, name of the item, or location and name of the item.

An example embodiment provides a method for recording an inventory of items, the method comprising: providing an inventory software program to a mobile device associated with a first user, wherein the inventory software program is: preinstalled on the mobile device, transmitted to the mobile device of the first user, or partially preinstalled on the mobile device and partially transmitted to the mobile device of the first user; receiving an image wherein the image is from the first user's mobile device; substantially at the same time the first image was taken by the first user using the first user's mobile device: receiving a camera lens direction of the mobile device; detecting a radio frequency identification reflection identifying one or more object signatures; receiving a geographic location of the first user's mobile device; storing in computer readable memory the received image, the camera lens direction, any detected RFID(s), the geographic location; providing a user interface wherein the image and any associated label can be viewed, edited, or viewed and edited; and, optionally, providing a user interface via which the user can search stored items information; and, in response to a search request displaying the search results wherein the search results include an image of the item, location of the item, or image and location of the item; and, optionally, providing a user interface control which determines if a user item is in an area based at least in part on the detection of an RFID; and, optionally, wherein the user interface enables a user to view, edit, or view and edit the location of the item, name of the item, or location and name of the item.

BRIEF DESCRIPTION OF THE DRAWINGS

Example embodiments will now be described with reference to the drawings summarized below. These drawings and the associated description are provided to illustrate example embodiments of the invention, and not to limit the scope of the invention.

FIG. 5 illustrates an example user interface presented using a browser. The example interface enables a user to register a new account for a Home Inventory system.

FIG. 23 illustrates an example web display enabling a user to attach additional information about an item in an image, including a scanned receipt or warranty contract.

FIG. 39 illustrates an example home rental assistant MPHI web page presenting summary information about a rental properties that a user has previously expressed interest in.

FIGS. 67-70 illustrate the operating environment/process workflow of a fourth example user scenario

DETAILED DESCRIPTION OF THE PRESENT INVENTION

Figure 1:
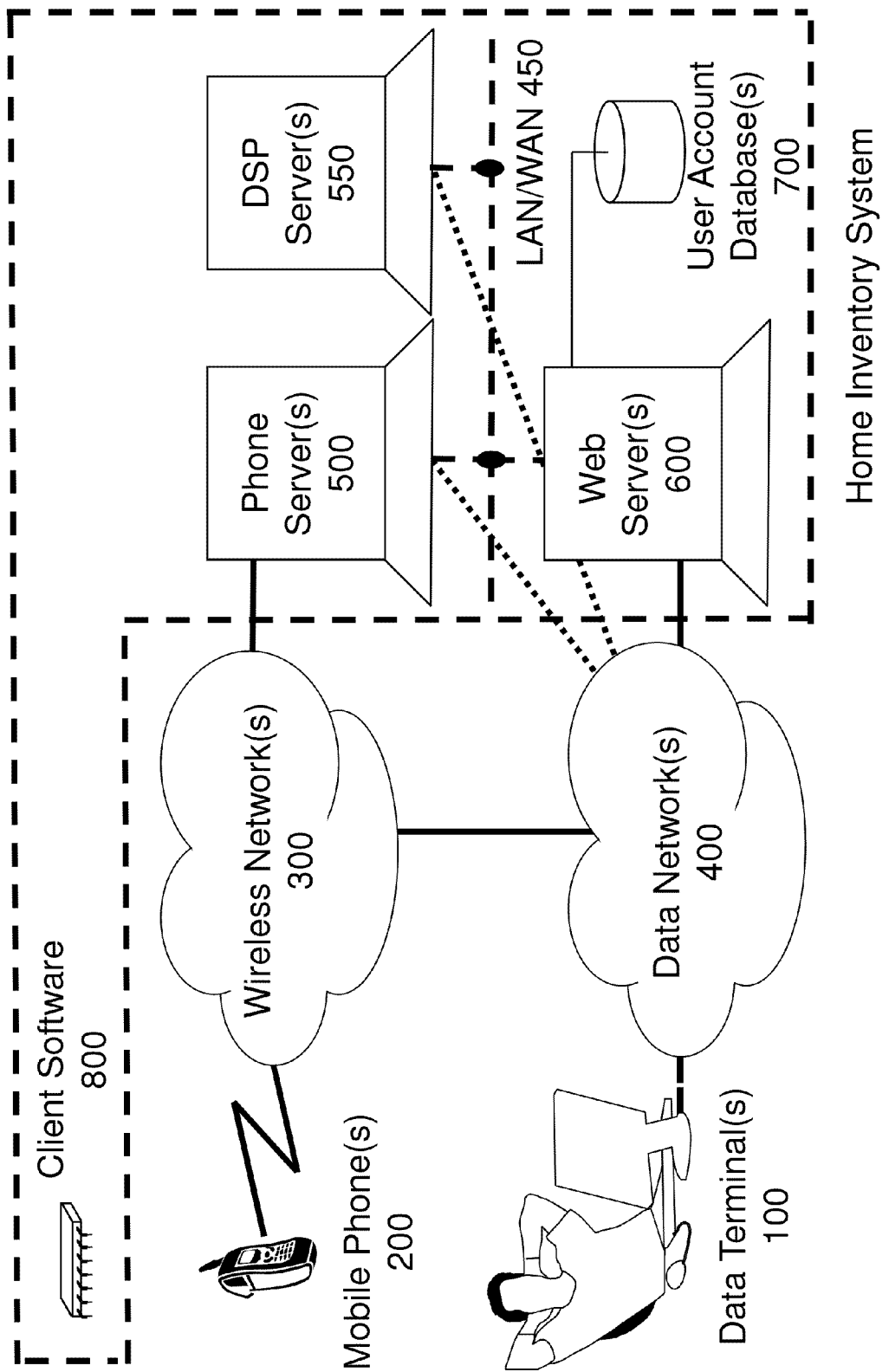
FIG. 1 illustrates an example network operating environment for a Home Inventory system.

The methods and systems of the present invention simplify and enhance home inventory data capture, organization, and secure storage.

GLOSSARY

Homeowner—an individual or family who rents or owns a residence and owns personal property.

Web Site or Web is a term used throughout the following description. It is used to refer to a user-accessible network site that implements the basic World Wide Web standards for the coding and transmission of hypertext documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following descriptions relates to an embodiment utilizing the Internet and related protocols, other networks and other protocols may be used as well.

Phone Identifier—Further, while the following description refers to example networks and telephony standards and protocols, other standards and protocols can be used as well. The term phone Identifier (phone ID) can include a Session Initiation Protocol (SIP) address, a Skype address (or other peer-to-peer Internet telephony network address), a wireless phone number, an International number, an E.164 phone number, a tElephone Number Mapping (ENUM) address, a Mobile Equipment IDentifier (MEID), an International Mobile Equipment Identifier (IMEI), an Electronic Serial Number (ESN), or other telephony address. While certain phone identifiers are referenced for purposes of illustration, other electronic addresses or locators can be used as well.

Image—while the following refers to images or pictures of personal property, the term should not be limited to photographic images taken from a mobile device. Images include for example scanned images, facsimiles, video, digital camera images, and other optical image capture which can be used to photograph items and transmit the images or pictures electronically.

Rendition—A rendition is an alternate (usually simplified) view of original information. Examples include line drawings derived from photographs and floor plans created from lists of room GPS coordinates.

In addition, while references may be made to the use of a mobile phone as an image capture device, other electronic image capture devices, e.g., a digital camera can be used as well.

Unless otherwise indicated, the functions described herein may be performed by executable code and instructions stored in computer readable medium and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system or data device, other computer or electronic systems can be used as well, such as, without limitation, an interactive television, a network-enabled personal digital assistant (PDA), a network game console, a networked entertainment device, a smart phone (e.g., with an operating system and on which a user can install applications) and so on. While certain references are made to certain example system components or services, other components and services can be used as well and/or the example components can be combined into fewer components and/or divided into further components.

In addition, while certain user inputs or gestures are described as being provided via phone key presses, data entry via a keyboard, or by clicking a computer mouse or button, optionally, user inputs can be provided using other techniques, such as by voice or otherwise. The example screen layouts, appearance, and terminology as depicted and described herein, are intended to be illustrative and exemplary, and in no way limit the scope of the invention as claimed.

Some or all of the information and functionality provided by the user interfaces discussed can be provided by a widget or a gadget. A widget can be in the form of portable code that can be installed and executed within a Web page (e.g. an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

The functionality, operation, and implementation for an example home inventory management service will now be described in further detail.

FIG. 1 illustrates an example Home Inventory system 900 that can be used in accordance with the present invention. As illustrated, the Home Inventory system includes a plurality of user mobile phones 200. The mobile phones 200 are connected to a wireless telephony and data network 300. Optionally, the mobile phones 200 are capable of receiving one or more software applications over a wireless network 300. Optionally, the mobile phones 200 are capable of taking pictures and these pictures can be downloaded over a wireless network 300 and/or data network 400 to a server 600. Optionally, web server 600 offloads image and speech processing to Digital Signal Processing (DSP) Servers 550 to assist in identifying items within pictures and with transcription of audio descriptions of items. Live operators can also serve to assist and/or replace the DSP servers 550 in carrying out these services.

As further illustrated, the Home Inventory system interacts with a plurality of computer terminals 100. The computer terminals 100 can be a personal computer having a monitor, keyboard, a disk drive, and a data communication interface. In addition, the computer terminal 100 can be an interactive television, a networked-enabled personal digital assistant (PDA) or the like. The computer terminals 100 are connected to a data network 400 (e.g., the Internet or a corporate LAN or WAN).

In an example embodiment, a downloadable, application software program 800 connects to and communicates with a phone server 500 and a web server 600 either directly via the wireless network 300 or indirectly by linking the wireless network 300 with the data network 400. The application program 800, executing on a subscriber's mobile phone 200 or other host, can interact with the optical scanning capabilities of the mobile phone to receive an image or the content of an image. Optionally, the application program 800 can be used to transmit data to the Home Inventory system 900 (e.g., by transmitting a message over the Internet). Optionally, the application program 800 can make the user's online presence known to the Home Inventory system 900 (e.g., by periodically transmitting a message over the Internet to the Home Inventory system 900). Optionally, the application program 800 can be used to receive and store in a computer readable medium a password from the user. For example, the user invokes the application (if the application is not already active) and enters a password (e.g., by key pressing or speaking a password). Optionally, the application program 800 can be used to receive and store in a computer readable medium a copy of a password from a Home Inventory service provider 600 that the user has previously registered with. For example, the Home Inventory system transmits a message over a wireless data connection to the application program 600 or via a Short Message Service (SMS). SMS is a wireless messaging service that enables the transmission of messages between mobile subscribers (and their phones) and external systems such as electronic mail services. Optionally, the application program 800 can display user instructions, status, success, and failure messages to the user. Optionally, the application program 800 provides a user interface through which a user can enter data and/or respond to messages. Optionally, the application programs functional capabilities can be integrated into and can be a part of another application (e.g., a telecommunications client or a contact management client).

The Home Inventory Servers 500, 550, and 600 are interconnected either through Data Network 400 (e.g. the public Internet—as depicted by the dotted line connections in FIG. 1) or via a private Local Area Network (LAN) or private Wide Area Network (WAN) 450—as shown by the dashed line connections in FIG. 1.

The Home Inventory system 900 in this example contains centralized databases and/or general-purpose storage area, optionally including, but not limited to, some or all of the following: a customer database 700, an image store, a dictionary of item image patterns and labels.

The Home Inventory system in this example contains a phone server subsystem 500 with call processing capabilities. These servers optionally provide interactive voice response, voice messaging, voice recognition, text-to-speech services and voice message transcription to natural-language text.

The Home Inventory system in this example contains a subsystem for creating a rendition of the user's residence. The subsystem receives a collection of locations and geographic data points (e.g., GPS coordinates) and optionally combines this with a database of other optional inputs (e.g. typical bedroom sizes, age of residence, city and county codes, user demographics, etc) to create floor plan renditions. These floor plan renditions can be used to help organize item/person property information received from the user.

The Home Inventory system in this example contains a subsystem for item recognition. The subsystem can perform pattern recognition by comparing items in an image against a database of item templates, and/or other techniques and/or algorithms (e.g., from simple Bayesian classifiers or more powerful neural networks). The subsystem includes various programs and/or devices including some or all of the following and/or additional and/or different programs and/or devices: a control program which submits photo images/files to an internal or independent device (e.g., a dedicated device including hardware and/or software) specialized for pattern recognition, and receives back a text file that consists of one or more labels/categorizations together with a set of values representing probability or confidence values relating to the item recognition and other features. Optionally, the item recognizer uses a different recognizer engine and/or item database/dictionary based on user specific characteristics including but not limited to: the geographic region of the user (e.g., determined from the user's mobile phone identifier and/or GPS coordinates); the location within a geographic region (e.g., city, rural, downtown); language; demographics, psychographics, etc. Optionally, the item recognizer can be personalized or tuned based on direct feedback from a user (e.g., user selecting a different name/label for an item) or indirect feedback (e.g., user item search requests). Optionally, the item recognizer can provide real-time and/or delayed feedback to the user regarding the quality of the image (e.g., to determine whether the user might need to retake one or more images) and whether the characteristics of the image environment need to be improved (e.g., enhanced lighting).

Optionally, the item recognizer can provide real-time feedback to the user regarding the items in an image. For example, a call can be placed to the user's mobile device 200 as s/he is taking pictures of a room and using text-to-speech play back a list of items, as recognized by the Home Inventory system, in the current room/location. Alternatively, a list of items can be downloaded from the Home Inventory system to the user's mobile device in near real-time for visual preview or text-to-speech playback from the handset. Optionally, the user can retake an image to improve the recognizer results. Alternatively, a user interface can optionally be provided (e.g., a screen-based user interface on the user's handset) to edit the real-time output produced by the recognizer (which optionally can be located on the user's handset or in a remote server connected over a wireless/data network).

In addition, the item recognizer may optionally use an underlying statistical model of the location of items in an image and/or the type of room (e.g. bathroom versus bedroom) to determine an identity of an item. For example, a picture is likely to be an item located in the upper half of an image whereas a rug would likely be in the lower portion of an image.

In addition, the item recognition system can pass the input image and associated output text file to a human for review for corrections and for improvements of accuracy. The Home Inventory system can further analyze the behavior of users when using or searching. The system may determine that users preferentially search or tend to search on particular items that represent important personal property (e.g., flat screen television). The system may use this information to prioritize the item identification of these items, to increase or decrease acceptable confidence levels, and/or to focus human review on these important aspects.

Through the imaging, item recognition, and user annotation/editing described in this application, the Home Inventory system creates a complete or approximately complete inventory of the user's entire possessions. The HI system optionally provides one or more user interfaces which allow the user to view or search their inventory to determine what they own and where it is stored. For example, the user can optionally search for an item and the HI system can provide the item's location. Optionally, the item's location is presented using user assigned or created location labels (e.g., a room label). Optionally, the item's location is presented to the user using raw location data (e.g., GPS coordinates) or using relative location data (e.g., the item is located 20 ft. to the north of your present location). For example, the user could search for an item using a HI application running on a mobile tablet device with GPS. The HI application could query the mobile device GPS for the user's current location and then compare that with the item's stored location. From this comparison the HI system could provide distance/directions information for the user.

Creating a complete or approximately complete inventory of a user's possessions using the HI system enables a user to also approximately determine the value of the user's household possessions as was mentioned earlier in the specification. Further, it is well known that changes in market conditions has an effect on both the replacement value (e.g., for insurance reasons) and selling value (e.g., if one were to have an estate sale). For example, following the recession of 2007-2010, the value of household items dropped in resale value as the market was flooded with items for sale items attributed to baby-boomers downsizing, familys needing cash or bread winners out of work. Optionally, the HI system accesses one or more internal or external databases to provide the user with up-to-date valuations. For many homeowners/renters, their home and possessions are their largest value asset.

These example usage scenarios of the user's home inventory illustrate the value of the data captured and stored in a HI system. The data recorded by the HI system becomes a strategic platform for a plethora of applications and the illustrative usage examples described in this specification are not meant to be limiting.

The data store of user items and associated information (e.g. receipts, warranties, notes, etc.) can optionally be made available to a network of users. Optionally, access to the data store of a user's items could be made available to those users whom the user communicates with on a frequent or infrequent basis. For example, the user can optionally make all or some of their Home Inventory data store accessible to selected individuals, their email contacts, Skype contacts, Social Networking friends/visitors, etc. Take for example, an HI system user who has a network of associates s/he regularly contacts using Skype and they regularly compare purchases in their conversations. The HI system simplifies this product search/inquiry process as illustrated in the following example. If John is interested in purchasing a printer and has an associate, Tom, who is an HI system user who has had a positive experience with his printer, John can optionally query the HI system data store associated with Tom to determine the make/model of the printer used by Tom. In another example, if Tom knows that John, an HI system user, is a knowledgeable shopper of electronics and if John has allowed read access permissions for Tom, then Tom can optionally browse John's possessions, e.g., John's inventory of home electronics. Optionally, the HI system categorizes household items into sub-lists using one or more techniques including image detection and recognition, user notes and attachments, etc. Optionally, access to some sub-lists and/or associated information about selected items is restricted. For example, the household items location information is not available to the user's associates.

The data store of user items and associated information can also be made accessible to 3rd parties not directly associated with the user. The item information can be annonomyzed and aggregated across some or all users in order to determine summary marketing/statistical data of interest to market researchers (e.g., how many flat screen TV's per household). In addition, the location information can be associated with the aggregated data to allow 3rd parties such as market researchers or retailers to determine the number and types of possessions in a specific area (e.g., zip code, area code, square mile, etc.). For example, commercial retailers might use this data in determining if and what type of store they might locate in a particular area. Optionally, users of the HI system are compensated for the release of their data in aggregate. Optionally, HI system users having a relationship with specific retailers might agree to release their private data. For example, the release of some or all of the user's private data to a local merchant might allow the merchant to determine if they are a good candidate for a new item (e.g., a universal remote or a specific appliance) and might target an advertisement to the user at a below market introductory price. Optionally, a retailer might notice that the user is acquiring items over time from other competitor retailers and may need to offer the HI system user more attractive pricing or an alternate selection of products to purchase. Merchants can also promote new items coming to the market which might be of interest to the user based at least to some degree on the items a user currently possesses. Merchants can use the CRM subsystem described in this specification or their own marketing platform.

Third party researchers can also use the household data to determine certain characteristics of the user. For example, the researchers can use the household value to determine the relative affluence of the household. Optionally, the household items may shed light on the psychographics of the home occupants. For example, the number of types of items might indicate the household members are spenders or frugal. Another example, might be the determination as to whether the household likely runs a business out of their house based on the location of electronic equipment and/or labels assigned to rooms.

Certain methods and systems described herein provide for the creation of an inventory of a user's household items in their home and/or on-site and off-site storage using a combination of Radio-Frequency Identification (RFID) and Global Positioning System (GPS) technology. As an optional alternative or in addition to image capture, item recognition, and/or user edits, user's items and their locations can be inventoried as described below.

Mobile devices (e.g., smartphones, tablet computers, iPods, etc.) are becoming increasingly sophisticated. Many mobile devices today include GPS and camera technology as described above. Most mobile devices also have one or more data ports (e.g., Universal Serial Bus). It is anticipated that RFID readers will be integrated into these mobile devices as GPS and camera technology have been integrated. Optionally, compact, mobile RFID readers will optionally be connectable/dockable to a user's mobile device using one or more of the mobile devices data ports. For example, a Texas company called DeviceFidelity has purported to have developed a microSD card which when inserted into a mobile phone can be used as an RFID reader. A person having ordinary skill in the art of RFID reader technology can anticipate the integration of RFID into mobile devices as described above if it has not already happened at the drafting of this patent specification.

Over the past 10 years there has been a drastic reduction in the cost of RFID tags. RFID tags are in some cases less than $0.05 per label. This drop in cost of RFID tags has expanded the application and use of RFID technology. Today, RFID technology is replacing bar code technology, for example, in asset management. It is anticipated that over time, given the low cost, that RFID tags will optionally be included or embedded in household items purchased by users. In addition, RFID tags, optionally with adhesive backings, will be commercially available to user for retail purchase. A person having ordinary skill in the art of RFID technology can anticipate the integration of RFID tags into household items as described above if it has not already happened at the drafting of this patent specification.

Optionally, user's have purchase from a merchant (e.g., online, big box store, etc.) a package of adhesive backed RFID tags. Optionally, there is space on the tag for a user to note a room label (e.g., Garage). Optionally, the RFID tags are color coated wherein the color coating is identifiable to the RFID reader (e.g., RFID tags in orange end or begin with the number "3").

In an example embodiment, an application software program downloadable to a user's mobile device (e.g., smartphone, tablet, digital camera, etc.) optionally connects to and communicates with one or more servers as discussed above. The application program 800, executing on a user's mobile device (e.g., smartphone) 200 or other host, can interact with the RFID reader x00 capabilities of the mobile device (or connected device) to activate the reader and receive the reader's scan results. Optionally, the application program 800 can be used to transmit data to one or more HI servers 900 (e.g., by transmitting a message over the Internet).

In an example embodiment, a user registers a newly purchased household item in the HI system by attaching an RFID tag to the purchased item. Optionally, the user selects an RFID tag corresponding to the room the user intends to keep the household item (e.g., Orange/Garage). Optionally, the user logs into the HI system and creates an association or binding between the RFID tag group or class (e.g., Orange) and the room (e.g., Garage). Optionally, the user creates an association between the item and the items location in the room. For example, the user can register the household item in the HI system at the location the item is generally to be kept. Optionally, the HI system alerts the user when one or more items detected in a room by the RFID reader appear to be misplaced (e.g., was previously registered in another room). Optionally, the HI system alerts the user to the item misplacement and enables the user to reregister the item's new location in response to a user interface control. Optionally, RFID tags are assigned to an area (e.g., cabinet drawer). Optionally, the user captures an image of the items within an RFID tag area (e.g., cabinet drawer) and there is an association created between the RFID tag and the one or more items in the RFID tag area. Optionally, item recognition technology described within this specification is used to enumerate the one or more items located in the RFID tag area. Optionally, the user types in or enumerates the one or more items located in the RFID tag area.

Optionally, the RFID reader capabilities and/or passive RFID tags are calibrated to read only those tags within a given room. Optionally, this can be accomplished by adjusting the signal strength of the reader by using tags that are not readable through room walls and open doorways within the room. Optionally, the signal strength is dynamically adjusted based on the size of the room, the location of the mobile device at the time the scan is performed, and/or interaction with the user. For example, optionally, the dimensions of the room are captured by directing the user to walk around the room as the mobile device is capturing a series of location data points. The user then might be asked to take several RFID scans at different locations in the room (e.g., center, corners, middle of N, S, E, and W wall) wherein the application also collects a location data point with each scan. A combination of location data and detected RFID tag Electronic Product Codes and, optionally, their associated signal strengths can be used to place (and later determine) the stored location of household items in a particular room (e.g., Garage). In a simple example, if there are two items in a room on the West wall, one in the center and the other in the Northern corner you might get the following:

|  | Location | Item 1 | Item 2 |
| --- | --- | --- | --- |
| Measurement 1 | West Wall - North | Weak Signal | Not Detected |
| Measurement 2 | West Wall - Center | Strong Signal | Weak Signal |
| Measurement 3 | West Wall - South | Weak Signal | Strong Signal |

In this simple example, from the RFID Tag signal strength measurements and GPS phone location, the application would infer that the location of item 1 is near the center of the West Wall and that item 2 is near the West Wall in the Southern corner.

The Home Inventory system 900 optionally assists the user (or service provider personnel) by marking labels/names of items in the output whose identification is of low certainty or confidence. Low certainty can result from many sources including poor image lighting, items clumped together, items without a distinctive shape, etc.

In an example embodiment, the marking of low confidence/certainty is signaled to the user by a variety of textual modifications to the assigned label including, by way of example: inserting a qualifier such as "?" before (and/or after) the best label candidate; offering two or more candidate labels (e.g. picture/flat screen television); typographical modifications such as italics, color, highlighting, etc; and/or other indicators. Optionally, the number of low certainty labels may cause the output to be routed to humans for review and/or manual item recognition.

The user interfaces for access to the stored/archived information are optionally device specific. By way of example, the user interface for a computer may be provided via a widget/gadget, a more traditional web portal, and/or an executable client. For a handset, the interaction is optionally tailored to the available display space and interaction mechanism, where the functionality is similar although optionally reduced in scope. For example, for a handset, certain logos, menus, images, and the like can be reduced in relative size or eliminated.

The Home Inventory system 900 optionally includes a Customer Relationship Management (CRM) subsystem. The CRM engine can mine certain information with respect to a user associated with the usage of the Home Inventory system. For example, the Home Inventory system can promote certain insurance policies/companies based on the number of items, appraised value of the user's items, and/or location information. Another example, the Home Inventory system can detect the lack of a certain item and promote to the user those missing items.

Figure 2:
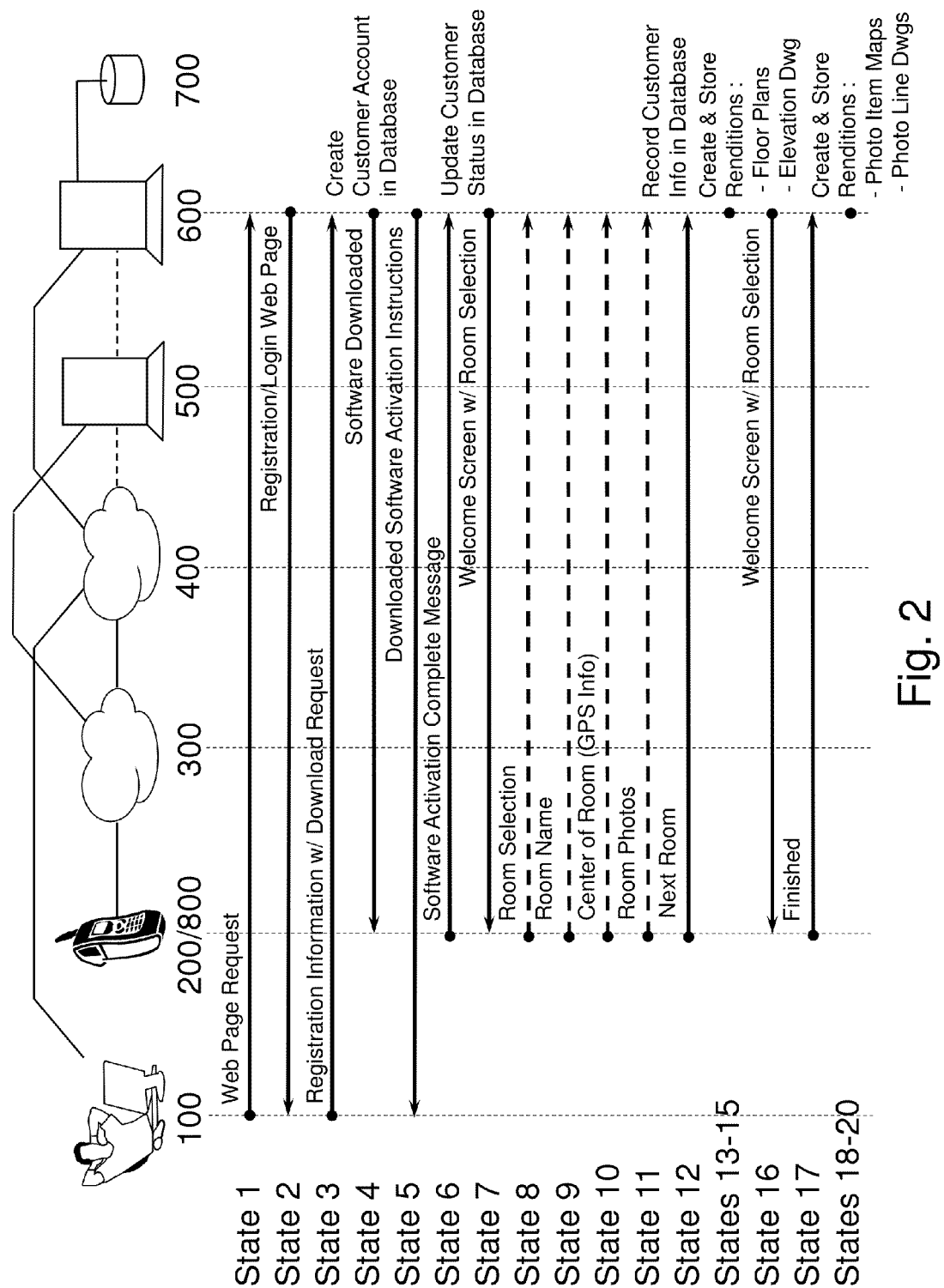
FIG. 2 illustrates an example operating environment/process for a Home Inventory system.
Figure 3:
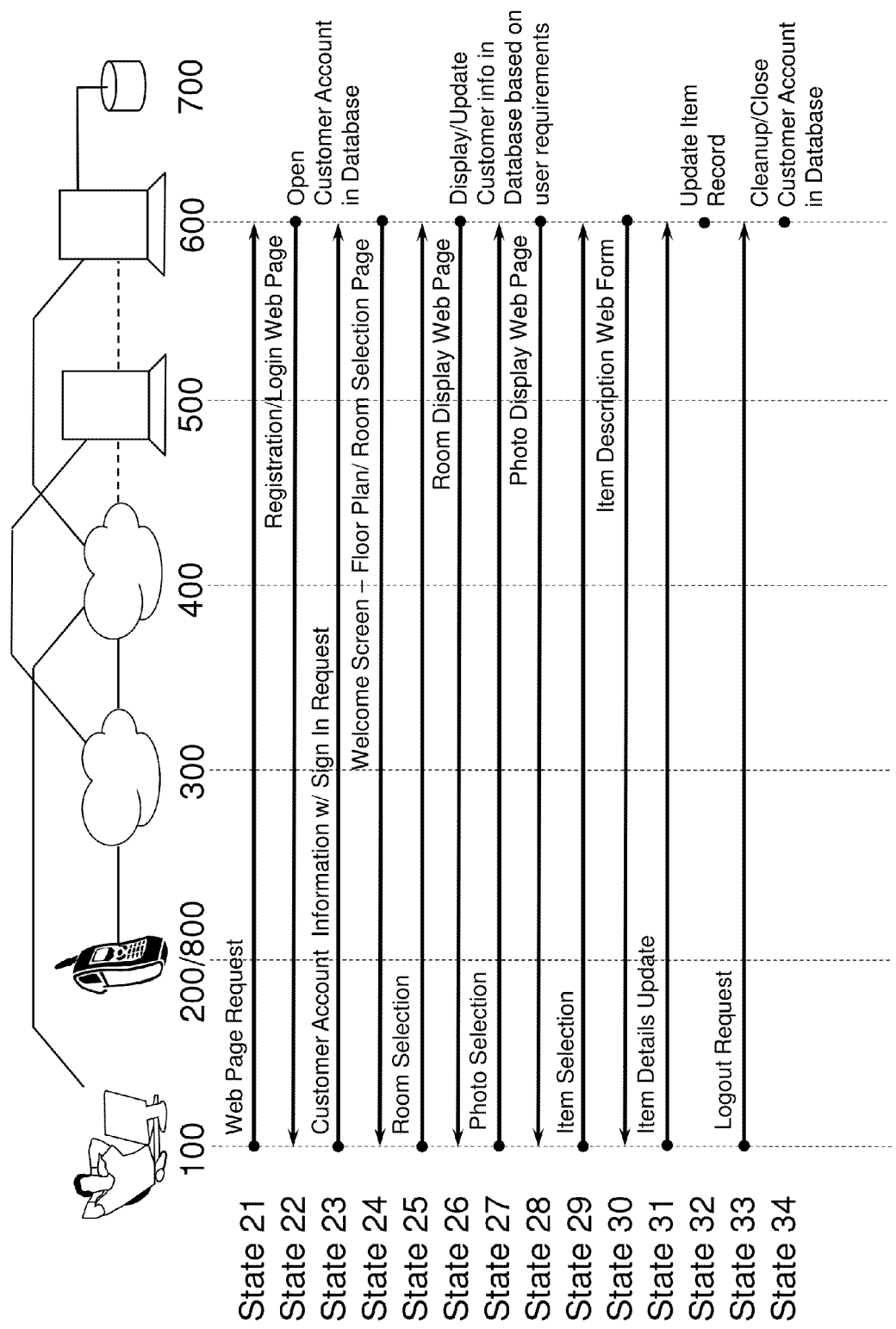
FIG. 3 illustrates a continuation of the example operating environment/process for a Home Inventory system.

FIGS. 2 and 3 illustrate an example workflow of a new user registration and software installation process and ongoing user operation of a Home Inventory system described in detail later in this document. Process states are listed on the left and major elements of the operating environment of FIG. 1 are listed across the top. Using solid lines with arrows to signify the direction of information flow, the diagram pictorially represents process flow and interactions between the elements in an example embodiment. Dashed lines depict optional information flow/interactions between the elements.

Figure 4:
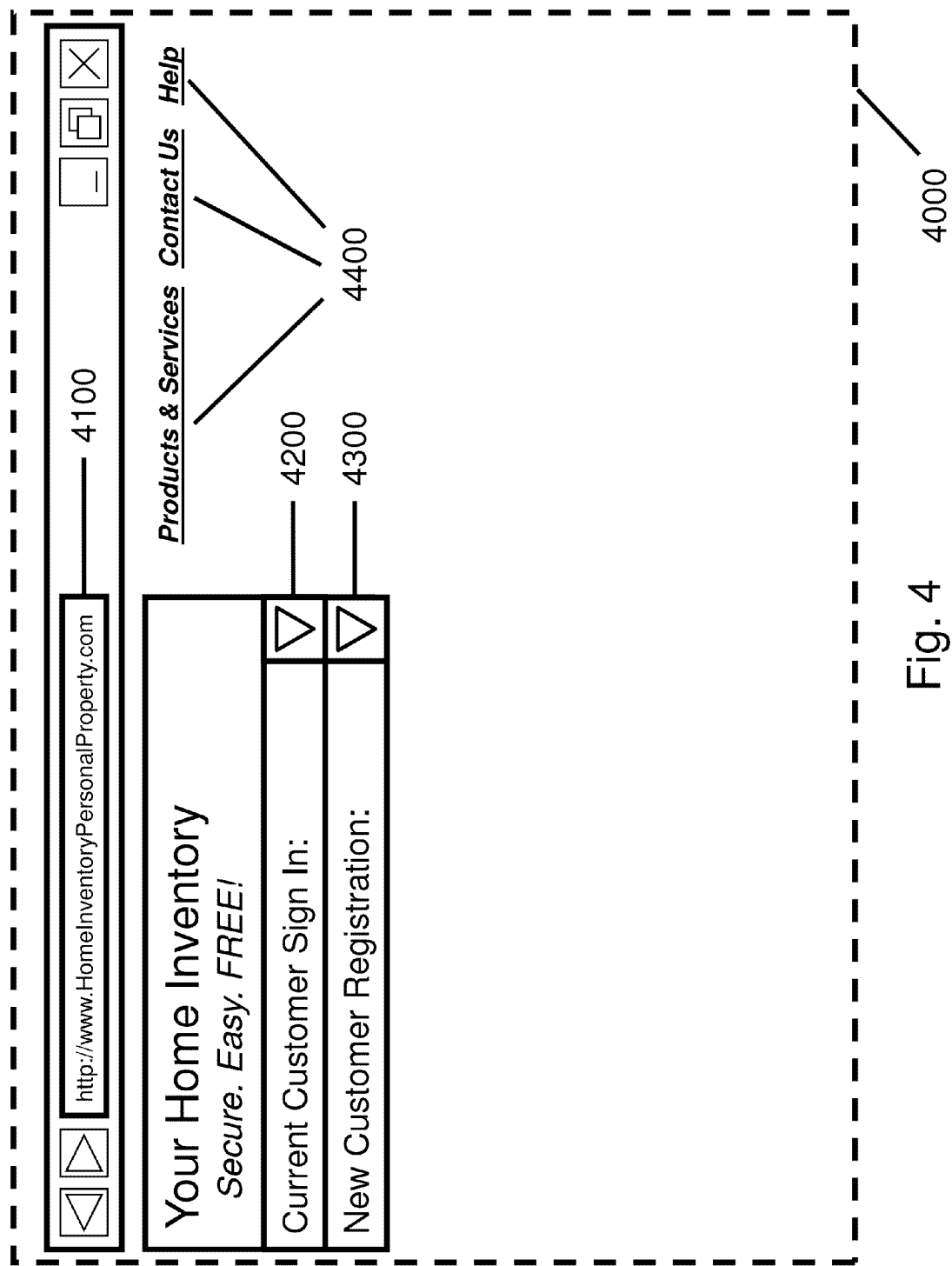
FIG. 4 illustrates an example user interface presented using a browser. The example interface enables a user to create/register a new account or to login to an existing account.

FIG. 4 illustrates an example Home Inventory system home page user interface 4000 presented via a browser (or other interface application) to a user. The browser can be, by way of example executing on a computer terminal 100, such as a personal computer, a Wireless Application Protocol (WAP) or browser-enabled phone, a PDA or the like. The web page can optionally be accessed by supplying the appropriate Uniform Resource Locator (URL) to the browser 4100, by selecting a link in response to a search query, or the like. The example user interface includes links for other information services 4400. The example user interface also includes a link for existing customers to login 4200 and a link for new customers to register 4300. Upon user selection of the New Customer Registration pull down menu link 4300, an additional menu pane 5500 is displayed. As illustrated in FIG. 5, this pane 5500 includes a name entry field 5510, a mobile phone number entry field 5520, a password entry field 5530, a yes or no radio button 5540 to specify if the residence has more than one level, and a number of residence levels field 5550 which becomes illuminated when the yes radio button 5540 has been specified. Lastly, the interface includes a download now button 5560, which when clicked by the user, causes the entered information to be transmitted to the web server 600 over the data network 400 for additional processing.

Once the information is received by the web server 600 the received phone number and/or identifier is authenticated. Optionally, a text message with a unique password is sent to the user which must be entered at the web site before proceeding. In another example, a call processing system places a call to the user and the user is requested to confirm their registration request. In yet another example, the Home Inventory system includes access to other databases for additional levels of user authentication. For example, the Home Inventory system accesses name information from an SS7 Caller Name (CNAM) database and the hosting telecommunications carrier from the SS7 Local Number Portability database. The accessible information optionally includes phone identification information (e.g., from an SS7 LIDB (Line Information Data Base) or ENUM (Telephone Number Mapping) database). Optionally, the system queries the mobile device provisioning database of the hosting telecommunications carrier to determine the make and model of the user's cell phone and from this determine if the mobile device has camera capabilities. Alternatively, the user may have to specify whether the mobile device is camera capable during or following the registration steps.

In this example, upon successful authentication, a user account is created in the user account database 700 and the information transmitted from the user is stored in the database.

Figure 6:
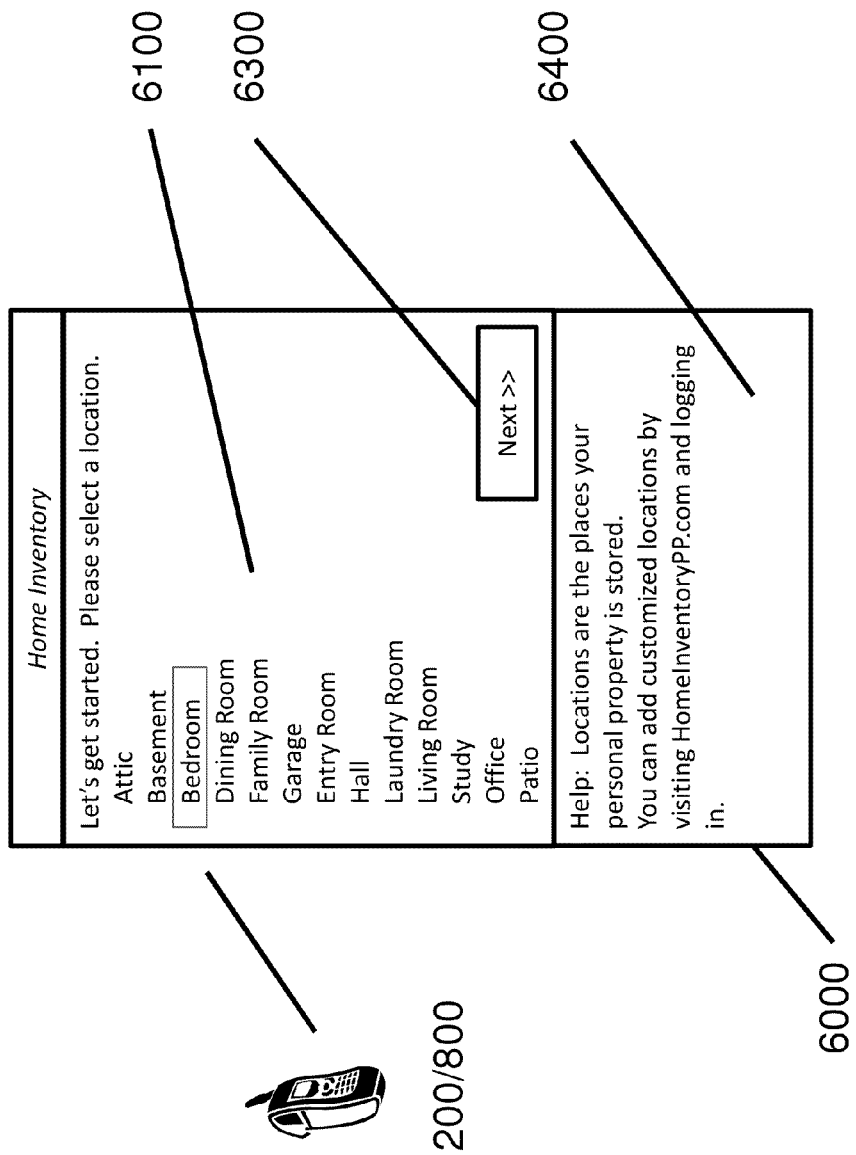
FIG. 6 illustrates an example user interface presented on a mobile device. The example interface enables a user to select a first location to inventory items.

FIG. 6 illustrates an example mobile device 200 user interface screen 6000 displayed by software application program 800. The user interface screens can be presented via a custom software application or by way of a browser or the like. The screen presents a list of locations 6100 which can be scrolled through by the user. In this example user interface, items can be selected via a double click or by scrolling to the item of interest and selecting the "next" control 6300. The user selection is optionally stored by the application program 800 and/or transmitted to web server 600 over the wireless network 300 and/or data network 400. In this example user interface, the screen has a "help" section 6400 which provides the user with additional instructions.

Figure 7:
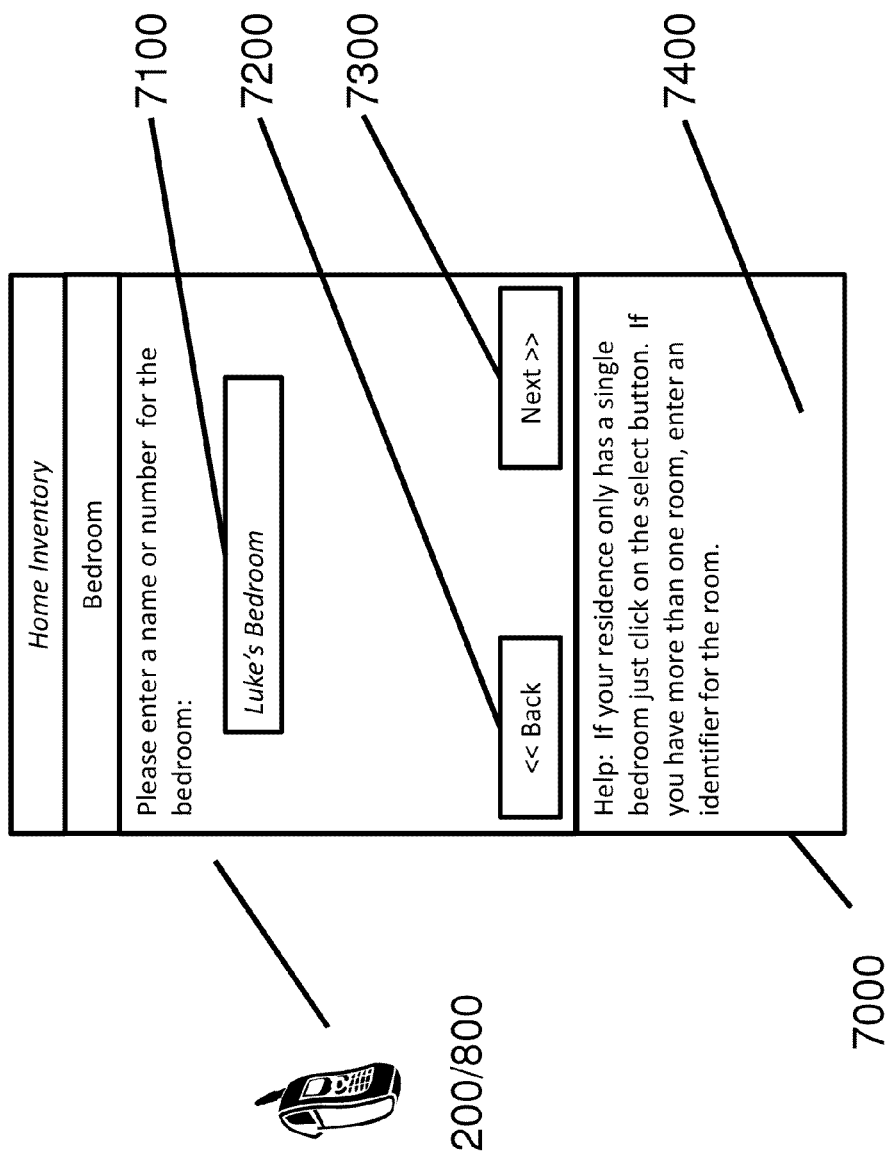
FIG. 7 illustrates an example user interface presented on a mobile device. The example interface enables a user to assign a name to a first location.

FIG. 7 illustrates another example mobile device 200 user interface screen 7000 displayed by software application program 800. The screen enables the user to customize the name of a location via a data entry field 7100. After a name is entered, the user advances to the next screen by selecting the "next" control 7300 (optionally no name is provided by the user). Optionally, the name and location (determined from the previous screen) entered by the user are transmitted substantially immediately to the web server 600 over the wireless network 300 and/or data network 400. Optionally, the selected location and entered name are temporarily stored on the mobile device and transmitted at a later period such as at the end of the user session or later. Optionally, an identifier (e.g., the user's mobile device phone number or other uniquely assigned identifier) and/or password are included in the transmission to the web server 600. The location and name are stored in the user account database 700. In this example user interface, the screen has a "back" control 7200 which when activated transitions the user to the previous viewed screen. Lastly, this example user interface also includes a "help" section 7400 which provides the user with additional instructions.

Figure 8:
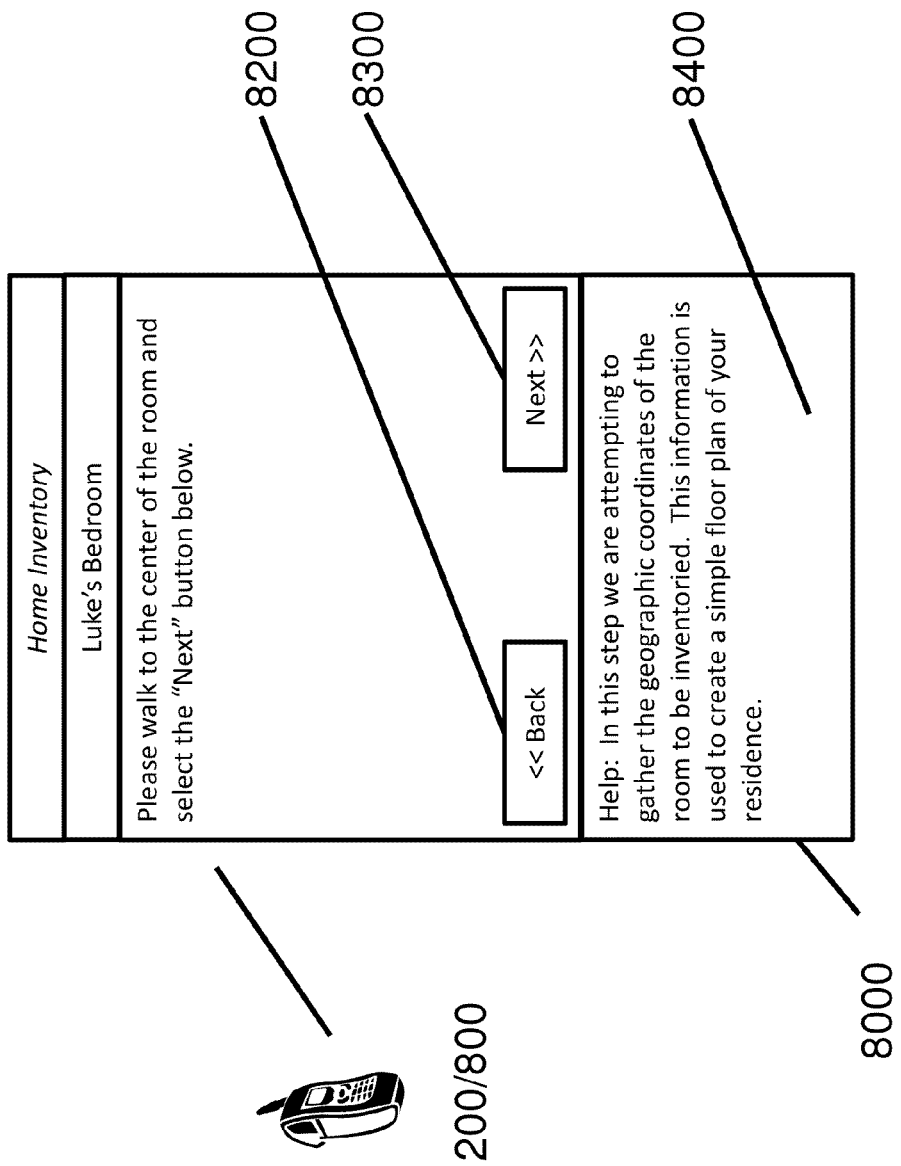
FIG. 8 illustrates an example user interface presented on a mobile device. The example interface facilitates the capture of geographic coordinates for a location.

FIG. 8 illustrates another example mobile device 200 user interface screen 8000 generated by software application program 800. In this example, the screen assists in the capture of the Global Positioning System (GPS) Coordinates of the current location. (Although GPS is used in this example, other methods of location identification could be used, e.g., cell tower triangulation). The user advances to the next screen by selecting the "next" control 8300. As is discussed in additional detail below, when the user selects "next", the application program 800 queries for the GPS coordinates of the current location. These coordinates are transmitted substantially immediately to the web server 600 over the wireless network 300 and/or data network 400. Optionally, the GPS coordinates are temporarily stored on the mobile device and transmitted at a later period such as at the end of the user session or later. Optionally, the GPS information is encrypted. Optionally, a time and date stamp is recorded and/or transmitted with each set of GPS coordinates/Location information.

Optionally, an identifier (e.g., the user's mobile device phone number or other uniquely assigned identifier) and/or password is included in the transmission to the web server 600. The selected location, GPS coordinates, and/or time are stored in the user account database 700. In this example user interface, the screen has a "back" control 8200 which when activated transitions the user to the previously viewed screen. Lastly, this example user interface includes a "help" section 8400 which provides the user with additional instructions.

As discussed later in the document, the location information is optionally used by the Home Inventory system to create a floor plan of the user's residence for web-site navigation. This location information is not limited to this single purpose. For example, the location information can be used to query real estate databases to determine the estimated value of a user's residence.

In most cases, a homeowner's home and contents make up the bulk of an individual's wealth. Inventorying the contents of the home helps a user of the HI system estimate and manage the value of these items. The HI system is also intended to facilitate the value of the user's home itself, as well as other homes the user might be interested in purchasing and/or is just curious about the real estate value. Alternative pricing models could be reviewed by the user. For example, the estimate could differentiate the cost of new construction versus the price a buyer would likely be willing to offer for the purchase of the user's home, associated land, and fixed contents.

The HI system, after determining the user's location with minimal user assistance, for example from GPS or cell tower triangulation, provides an estimate of the value of the user's residence for immediate and/or later retrieval. For example, an HI system smartphone application can query a user's mobile device to determine the user's GPS location. The GPS location information can be used to query one or more internal or external data stores to determine the estimated value of the selected residence. For example, the HI system can optionally determine the value of the residence by querying an external data store which provides comparable home price values from recent sales, market conditions, square footage, etc. Optionally, the HI system provides the owner's published listing price from one or more internal or external data stores if the owner has placed his/her home on the market (e.g., if the owner is testing the HI system or the data stores used to publish/advertise his/her rental property). Optionally, this market value is stored with the user's account and is available for display to the user via a data connection on a user interface display (e.g., web browser access on a desktop device). Optionally, the market value is updated each time the user accesses his/her account. Optionally, the market value is updated on a periodic basis (daily, weekly, monthly, annual, etc.).

The HI system also provides a user with the value of real estate the user has expressed interested in. For example, a user might be interested in purchasing a new home in a different neighborhood from the one he/she currently lives in. The user may have identified one or two desirable neighborhoods/school districts that they may desire to purchase a new home. In this scenario, the HI system can be used by the user to determine the value of homes in the neighborhood without having to type in physical address location information (which may or may not be known by the user). For example, in one scenario, the HI system user could take a picture or video (e.g., image) using their smart phone of a desired home from, say, the street directly in front of the home. The HI system can then determine the estimated value of the home using location data of the smart phone, the direction the lens of the camera was pointing, and access to internal/external databases. In addition to value, a collection of information regarding the property is optionally provided to the user including for example, number of bed rooms, number of bath rooms, property size, structure square footage, property tax (e.g., current and expected), homeowner's association fees, expected utility bills, sewer connections, satellite/aerial view of the property, etc. In general, any information that is publically available or can be derived from publically available information can be made available to a user or a user's account. Optionally, the user profiles what information is available immediately on request (or displayed in a limited screen size) and what information is stored for later retrieval. Optionally, one or more controls are provided in a user interface to communicate interest in the property to an associate of the user (e.g., real estate agent, broker, rental agency, etc.) or to the owner of the property. Optionally, personal information is available from the home owner including for example the owner's current mortgage balance, specific or aggregate utility bills, original purchase price, etc.

If image capture is not taken within the target property boundaries, additional location information may be required from the requesting application/device/user. If the HI system cannot unambiguously determine the specific property of interest, additional information from the image capture device may be required. For example, if the user is directing their image capture/mobile device at a property from a street adjoining the property (but not within the property itself), the HI system may require additional information including but not limited to, for example, the direction the image capture device is pointed. To determine the specific property of interest, the HI system may optionally use the "item" detection/identification techniques described in this document. The HI system can optionally compare previously recorded images of properties in the proximity to the image capture/mobile device when the new image was taken. An approximate pattern match within a threshold confidence value can be considered a match by the system and the results provided to the user. Other methods of determining the property of interest are optionally provided or used by the HI system. For example, the property closest to the user in the direction the camera was pointing when the image was taken can be used as the property of interest. Optionally an input provided from the user in response to a prompt from an application executing on the image capture/mobile device can facilitate the determination of the property of interest. For example, if the system cannot determine the precise property, the system can optionally prompt the HI system user to respond to a user interface control (e.g., selecting a command on the mobile device keyboard or touch screen, or alternatively speaking a command). The HI system might optionally prompt the user to select from a menu of commands to narrow the choice of properties. For example, if the HI system determines the user is taking a picture from the street adjoining the property, the HI system might, for example, prompt the user "are you taking a picture across the street to the property or from a location on the street immediately adjacent to the property—please answer yes or no". Optionally, the HI system provides a listing of one or more local/adjoining properties for the user to review and choose from, optionally including an image of each property to simplify the user property selection.

Optionally, the images captured by the user from the image capture/mobile device and associated data retrieved by the HI system are automatically stored in the user's account in the cloud for later review and retrieval.

In a similar fashion, the HI system can be used to provide users with an approximate rental value of their home and/or rental value of homes or apartment's they might like to relocate to. Where rental value is, for example, the price (typically a monthly dollar amount) a willing renter (e.g., individual, group of individuals, or family) would likely be willing to offer for the rent or lease of the home and use of the associated land.

The HI system, after determining the user's location with minimal user assistance, for example from GPS or cell tower triangulation, provides an estimate of the rental value of the user's residence for immediate and/or later retrieval. For example, an HI system smartphone application can query a user's mobile device to determine the user's GPS coordinates. The GPS location information can be used to query one or more internal or external data stores to determine the rental value of the user's home residence (in this example, assuming the user is within the user's residence). For example, the HI system can optionally determine the rental value of the residence by querying an external data store which provides comparable rental values from current or recently available rentals in the same locality, market conditions, square footage, etc. Optionally, the HI system provides the owner's published rental value from one or more internal or external data stores if the owner is currently renting his/her home (e.g., if the owner is testing the HI system or the data stores used to publish/advertise his/her rental property). Optionally, this rental value is stored with the user's account and is available for display to the user via a data connection on a user interface display (e.g., web browser access on a desktop computer). Optionally, the rental value is updated each time the user accesses his/her account. Optionally, the rental value is updated on a periodic basis (daily, weekly, monthly, annual, etc.).

The HI system also provides a user with the rental value of real estate the user is interested in. For example, a user might be interested in renting a new home or apartment in a new neighborhood. The user may have identified one or two desirable neighborhoods/school districts where the user would like to rent a home. In this scenario, the HI system can be used by the user to easily determine the rental value of homes in the neighborhood without even having to type in physical address location information (which may or may not be known by the user). For example, in one method, the HI system user can take a picture or video using their smart phone of a desired home from, say, the street directly in front of the home. The HI system can determine the rental value of the home using location data of the smart phone at the time the image was taken, the direction the lens of the camera was pointing at the time the image was taken, and access to internal/external data stores to compare the store home images with the user captured image(s) of the selected property. In addition to rental price, a collection of information regarding the property is optionally presented to the user including for example, number of bed rooms, number of bath rooms, characteristics of the garage, structure square footage, property size, additional fees, expected utility bills, satellite/aerial view of the property, typical leasing time period, whether pets are allowed, security deposit requirements, etc. In general, any information that is publically available or can be derived from publically available information can be made acessable to a user or a user's account. Optionally, the user creates an HI system user profile which filters what information is available (e.g., displayed in a limited screen size) immediately (e.g., when the image is taken) and what information is stored for later retrieval (e.g., displayed in a larger screen size). Optionally, the HI system determines, given the device type, how much information is to be displayed to the user and in what form factor. Optionally, one or more controls are provided in a user interface to direct interest in the property to an associate of the user (e.g., real estate agent, broker, etc.) or to the owner of the property or their representative. Optionally, private information is available from the owner including for example, how much of the security deposit was withheld from the previous tenant. Optionally, if the home or apartment is furnished and if there isn't a privacy concern on behalf of the landlord, the HI system provides the prospective tenant with a listing/inventory of the contents of the apartment/home that are included in the rental agreement. This inventory of the home/apartments is created optionally using the techniques described in this specification. Optionally, the landlord uses this inventory of the contents to determine if one or more items has been damaged or removed from the property when the tenant's lease expires.

As discussed above, optionally the system provides a rental offer to the property owner (e.g. via email or postal mail). Optionally, the offers are initially provided to the property owner anonymously to protect the privacy of the potential lessor and lessee (e.g., the HI system acts as a mail proxy between lessor and lessee). Optionally, the system facilitates unsolicited offers which are presented to home owner's whom do not have their house currently listed for rent or may have never rented their home. Optionally, the system provides information and tools which will help the property owner determine whether to rent or not. For example, the HI system provides the owner with comparable rental prices and/or estimated rental value. The HI system optionally provides the property owner with a business model calculator which can determine the expected cash flow given inputs from the owner (or as determined from internal or external databases) such as mortgage payment, property taxes, utilities, depreciation, etc. The HI system optionally provides the property owner with estimate of moving costs for their area and optionally based at least in part on the HI system inventory of items in their home, home size (inference from size how much stuff a property owner is likely to have), etc. Optionally, the HI system, using comparable market values and trends for a locality generates an estimates expected appreciation or depreciation of the property over the expected rental period (are periods configurable by the homeowner) to facilitate the decision to rent or not rent. Further, the HI system can provide a tool to a property owner that enables a property owner to determine the net asset value of the property after the rental period where the asset value includes appreciation/depreciation and expected cash flow over the rental period.

An example use of the HI System is in the area of moving and storing. An Inventory of user items can be made accessible or transmitted to a 3rd party moving company. The data provided to the moving company can be optionally used to determine a budgetary or final quotation on the cost of moving a homeowner's items to a new location. In addition, the recorded inventory of items can be used to list any items lost or damaged during the loading, transit, and/or unloading period.

Optionally, the HI system described can also be used to inventory those items retained in an on-site or off-site storage location. The list of stored items can include any subset of the items from the complete list of the home owner's household goods. The record of items can be used to determine, for example, the value, quantity of items, etc. as previously discussed in this specification. The HI list can also be updated to specify where items are stored (e.g. a specific storage "pod" number) to facilitate access to specific items during the storage period.

Another example use of the HI system is in the area of landscaping. In some cases, it is advantageous for a homeowner to maintain an inventory of their property and, for example, their property and vegetation. In the event of a catastrophic flood or fire, for example, if the landscaping is insured, a recorded inventory of the plantings can be used to note the number, type, and maturity of the plants. The "floor Plan" rendition of the entire property can also be used to assist in planning landscaping upgrades. Additionally, an option could be provided to generate an alternate landscaping view which "ages" the plantings to facilitate planting location selection. For example, the aging can illustrate how the variety of mature trees clash with each other or will encroach on the buildings or driveway and hence will likely require removal in the future.

In another embodiment, the location information and/or date/time can be used by an insurance company to prevent fraud. In this example, an insurance inspector can query the HI database 700 to use the location and/or time/date information to confirm the personal property inventoried belongs to an individual (or at least was photographed at a given location) at the time of purchasing the insurance policy. The location information could also be used in conjunction with other applications and databases.

Figure 9:
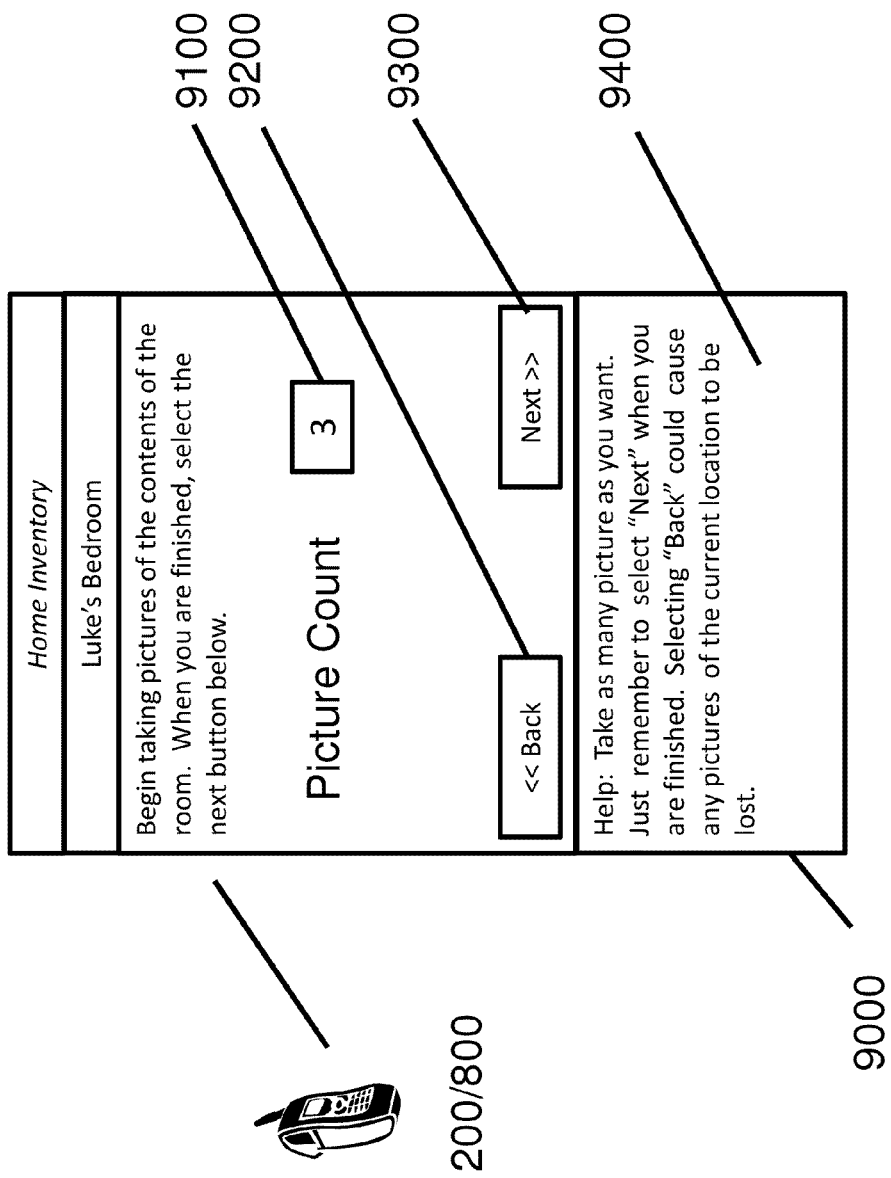
FIG. 9 illustrates an example user interface presented on a mobile device. The example interface visually tracks the number of images for a location.

FIG. 9 illustrates another example mobile device 200 user interface screen 9000 displayed by software application program 800. The software program 800 interfaces with the camera capabilities of the mobile device and the screen tracks the number of pictures 9100 taken at a given location. Optionally, a geographic location (e.g., GPS coordinates) and time/date is recorded with each picture/image. This location information can be used to enhance the floor plan rendition described below. In addition, the software application 800 user interface can optionally instruct the user to take pictures from different positions in a room/location. For example, the software program can instruct the user to take the first four pictures in a room/location with the user's back against each wall in order for the Home Inventory system to better ascertain the rooms/locations boundaries.) In this example, a user signifies the completion of the photography session at a given location and advances to the next screen by selecting the "next" control 9300. Optionally, the location, picture(s), and time/date taken by the user are transmitted substantially immediately to the web server 600 over the wireless network 300 and/or data network 400. Alternatively, the entered data is temporarily stored on the mobile device and transmitted at a later period such as at the end of the user session or later. Optionally, an identifier (e.g., the user's mobile device phone number or other uniquely assigned identifier) and/or a password are included in the transmission to the web server 600. The picture(s), location information, and/or time/date are stored in the user account database 700. In this example user interface, the screen has a "back" control 9200 which when activated transitions the user to the previous screen. Optionally, a warning message is displayed to the user if the user selects the "back" control that any images of the current location will be lost. Optionally, a different warning message is displayed prompting the caller to save or delete images of the current location. Lastly, this example user interface includes a "help" section 9400 which provides the user with additional instructions.

Figure 10:
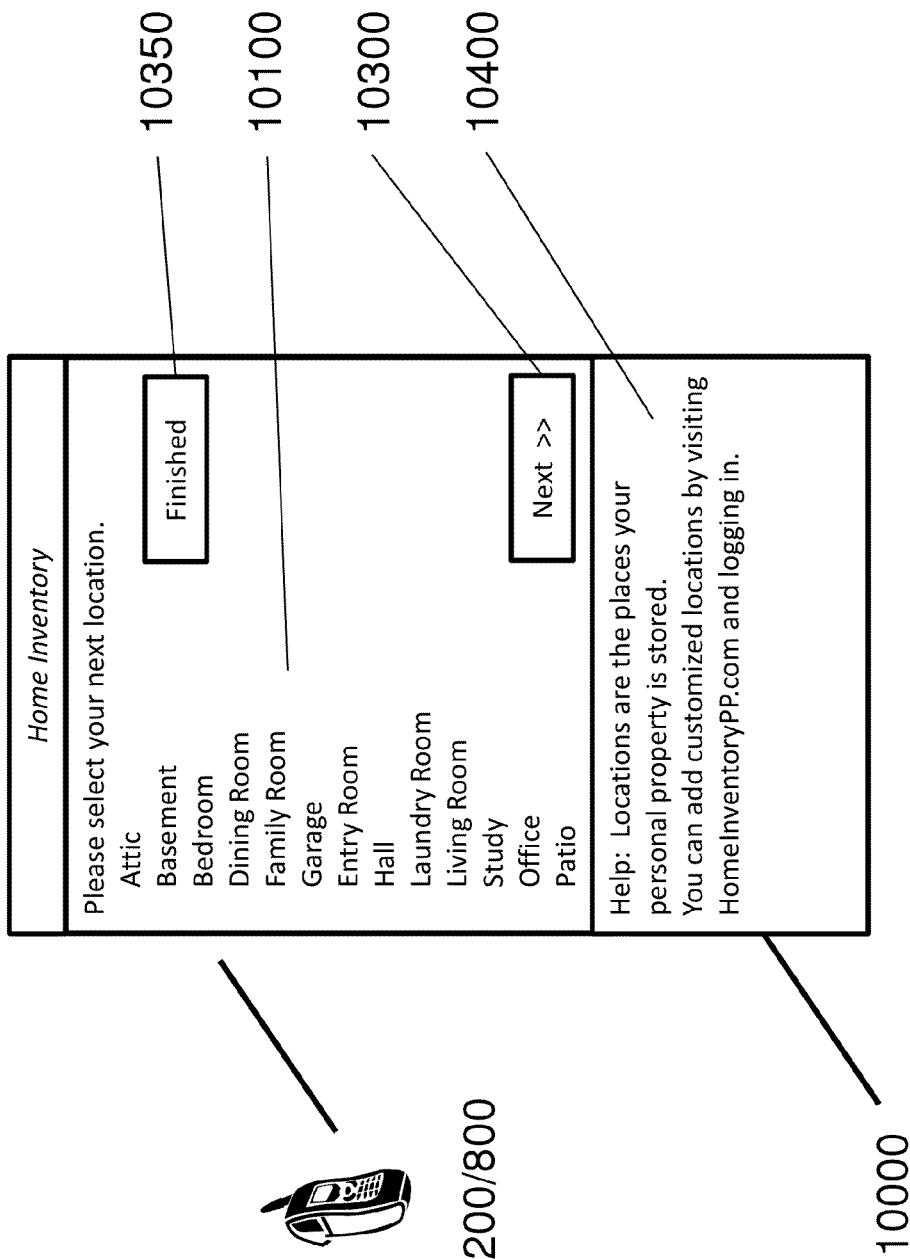
FIG. 10 illustrates an example user interface presented on a mobile device. The example interface enables a user to select a next location.

FIG. 10 is similar to FIG. 6. In this example, a mobile device 200 user interface screen 10000 is displayed by software application program 800 once a user has completed imaging a location. If the user selects the "finish" control 10350, the application program 800 begins or completes the transmission of any remaining user selections, locations names, geographic location coordinates, time/date, and images to the web server 600 over the wireless network 300 and/or data network 400. Optionally, an identifier and/or password are included in the transmission. Optionally, a notice is displayed to the user that the application is closing and the application is terminated.

The screen optionally presents a list of next locations 10100 to be imaged. In this example user interface, items can be selected via a double click or by scrolling to the item of interest and selecting the "next" control 10300. The user selection is optionally stored by the application program 800 and/or transmitted to web server 600 over the wireless network 300 and/or data network 400. In this example user interface, the screen has a "help" section 10400 which provides the user with additional instructions.

Figure 11:
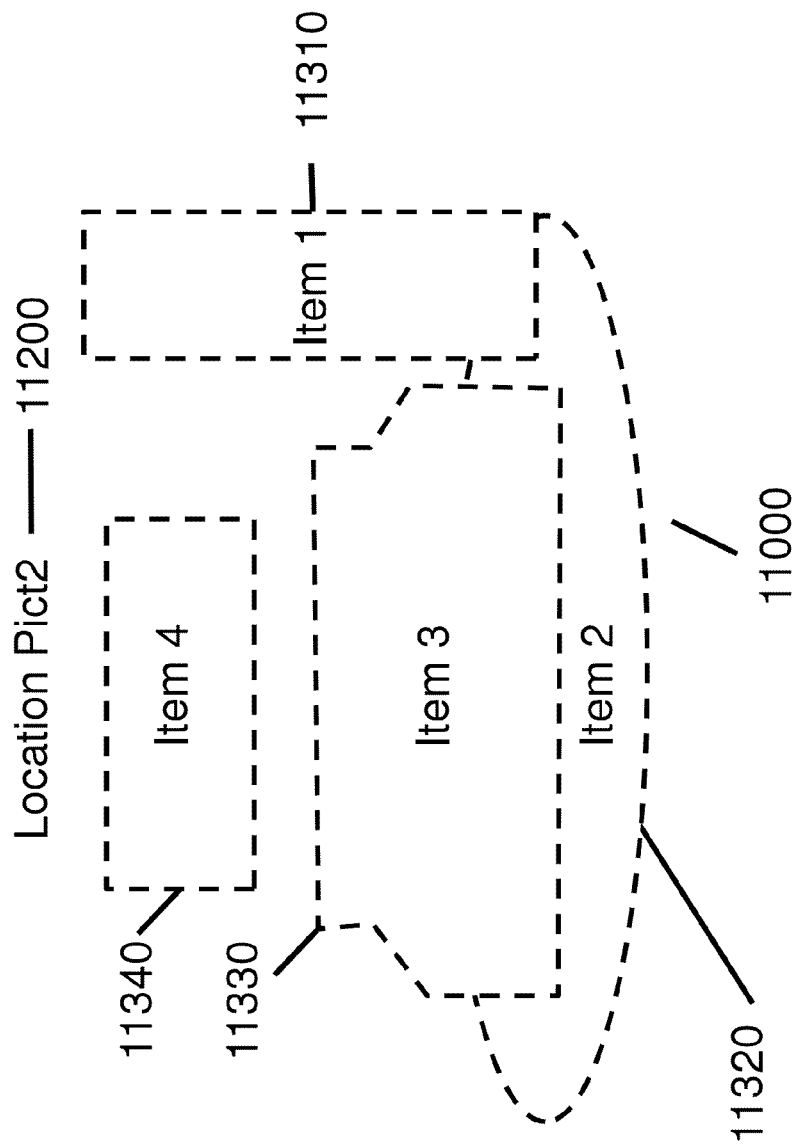
FIG. 11 illustrates an example photo item map rendered by a Home Inventory system using an image taken by a user.

Upon receipt of the room photo images, the Home Inventory system 900 creates an initial list of items depicted in each photo. Manual and/or automatic methods of item separation and identification are used including a combination of image filtering, color change detection, item outline detection, etc. FIG. 11 illustrates an example item map 11000 rendered from a user's photo image by the HI system 900. An outline of each item (11310, 11320, 11330, and 11340) is depicted along with a sequentially number item name. The original photo label 11200 is also depicted on the rendition. This will later be used to enable users to view location images and append additional information with each item in an image.

Optionally, the Home Inventory system next uses pattern recognition techniques in combination with a predefined library of household items to label each item in the selected item map. For example, in FIG. 12, the Home Inventory system attaches the label "lamp" 12310 to outline 11310 in FIG. 11. Similarly, the outlines 11320 and 11330 in FIG. 11 are labeled Area Rug 12320 and Loveseat 12330 respectively in FIG. 12. Lastly, the outline 11340 in FIG. 11 is labeled ?Picture? 12340 in FIG. 12 where the "?" delimiters signify that the image recognition algorithm has not been able to make a good match and recommends that the user (or service provider) more closely review the associated label 12340. In some cases the recognizer may not even be able to suggest a label and would flag the unknown label with a "?item <number>?" designation. These labels can be accepted or rejected by a user by selecting the designated label and renaming the item. These user edits are downloaded to the Home Inventory system and stored in the customer database 700. In addition, user edits are used to train the recognizer to improve the overall accuracy of the Home Inventory system. Optionally, the label attached to items by the recognizer is initially distinguished from items named by the user (e.g., by using italics or {brackets} to designate user modifications). Optionally, only those items with a configurable, low confidence value, from the recognizer are identified as tentative or temporary. Optionally, the recognizer may have difficulty determining whether the object is an item A or B. In this case, the Home Inventory system might display two labeled items with question marks. For example, In FIG. 12, the Home Inventory system might display item 12340 as label "?Picture? or ?TV?" (as in flat screen television) and prompt the user to choose one. Optionally, there is a picture map pallet 21400 (see FIG. 21) which guides the user in the labeling of items.

Optionally, the Home Inventory system transmits or makes available to live operators the results of the image item recognition step. The live operators can optionally audit the results and/or make changes to the labels assigned by the Home Inventory system before the Home Inventory system makes the results available to a user. Thereby, further enhancing the quality of the system performance. As described above, any changes by the live operators and/or end user can be used to further improve the quality of the item recognizer. In an alternative embodiment, the entire process is performed by live operators including separating items within the image, identifying and labeling each item, replacing the identified item outline with an appropriate generic line drawing of the item, and reviewing/auditing the resultant image rendition for accuracy and clarity.

Figure 13:
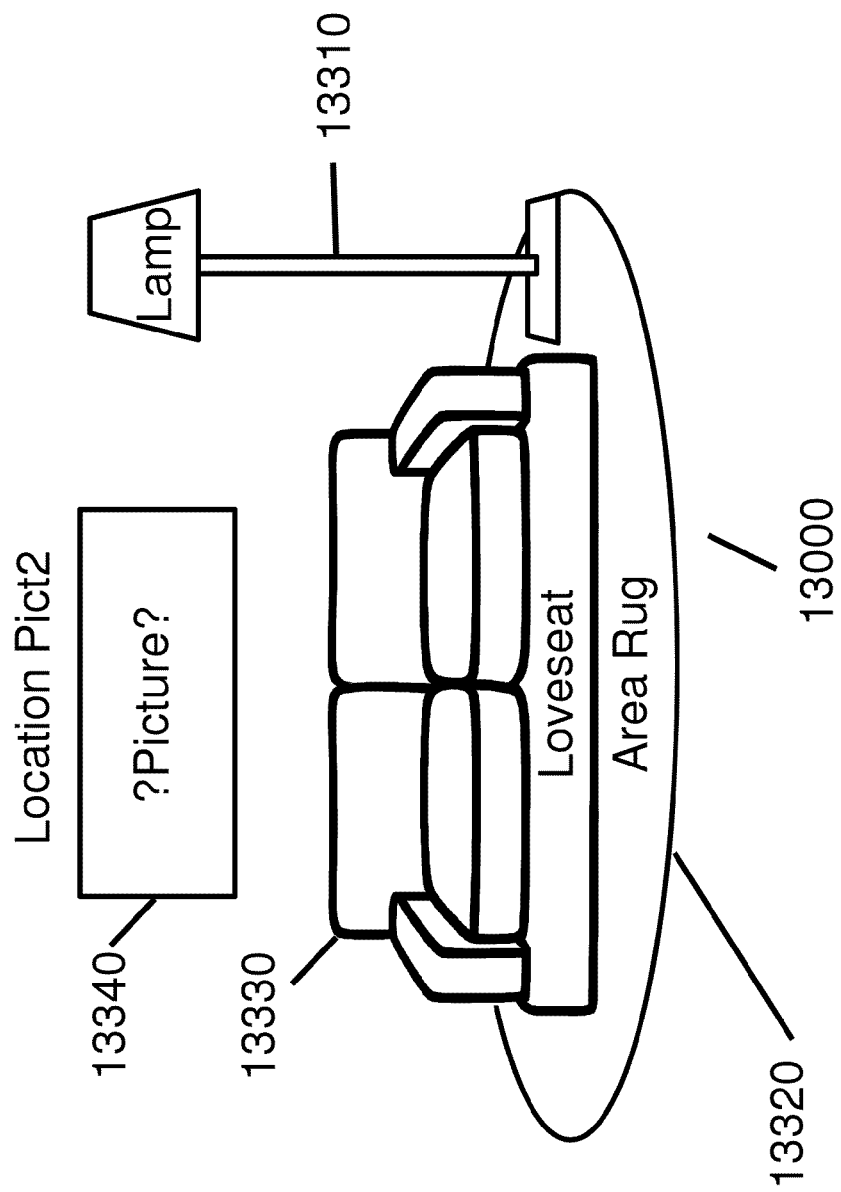
FIG. 13 illustrates an example photo item line drawing with item labels generated by a Home Inventory system.

Optionally the user requests the Home Inventory system replace the item outline rendition 12000 with a generic line drawing version 13000 of the items in the photo (see FIG. 13). The user can configure their service to automatically perform this step or wait for user interface gestures to change the presentation between these two alternate views.

Labels and drawings of the user's personal property improve the overall quality of the system as perceived by the user. Furthermore, labeling items allows the Home Inventory system to create or query an external database for appraisal and replacement value of equivalent items.

In addition, in some instances the recognizer is not able to distinguish certain items from other items in the image in order to create the optional outline view. Optionally, editing tools are provided to enable the user to edit the rendition. For example, new lines can be added and existing lines extended to separate items. Optionally, lines can be erased to couple multiple items together. Optionally, multiple items can be joined (e.g., by selecting multiple items with the shift key held down) into a single item. Optionally, the user can replace items from the list of pallet items. Optionally, the user can define their own pallet item. Optionally, a user can toggle between an enlarged view of the actual image and a reduced view of the rendition whereby the image rendition is displayed in the thumbnail and the actual image is displayed in the larger area of the web page.

Figure 14:
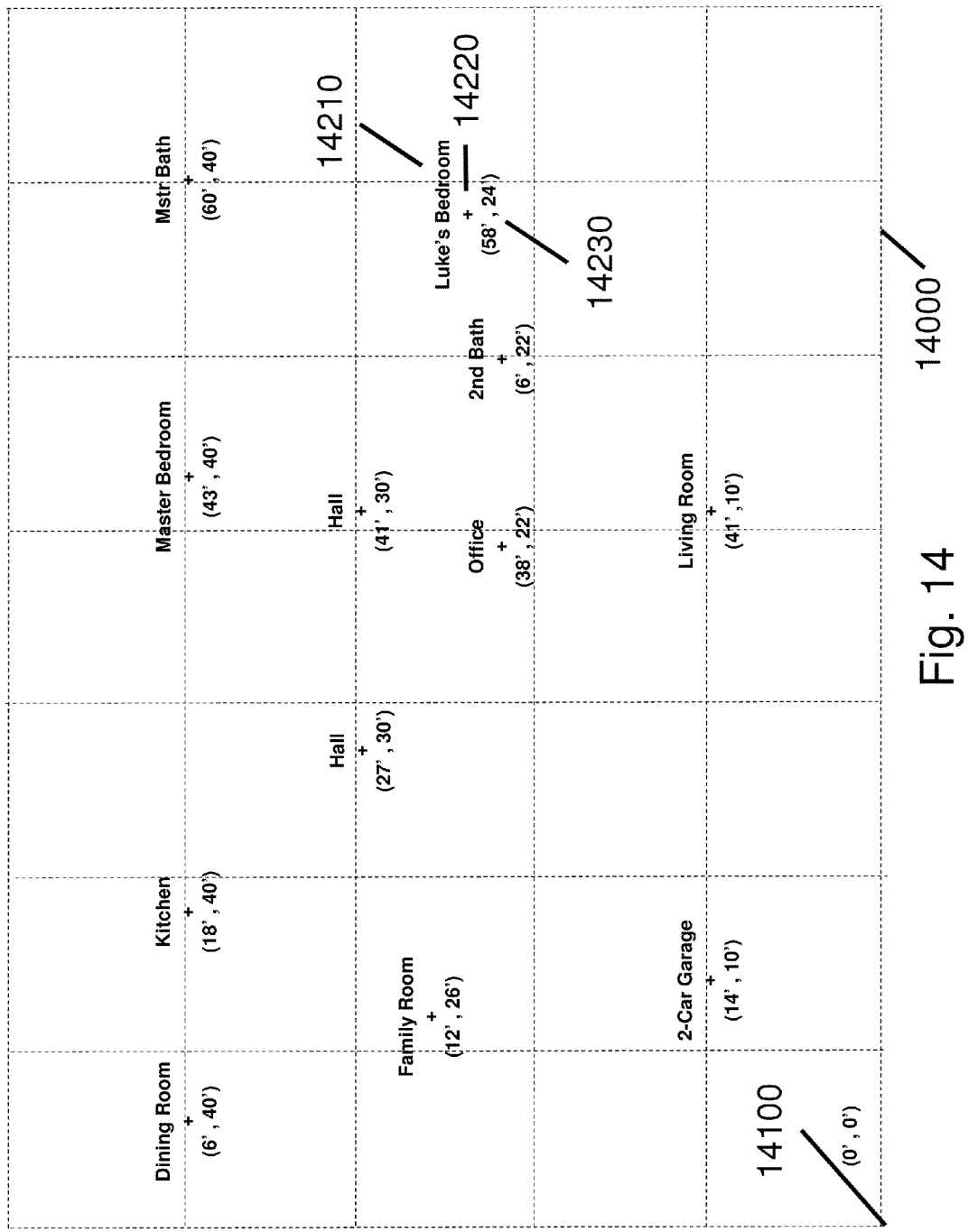
FIG. 14 illustrates an example gridded plot of a user's room locations generated by an example Home Inventory system.

In this example, upon completion of user entry of room photos and associated locations, the Home Inventory system 900 stores the information in the database 700 and creates a plot 14000 of the room center points on a 10'×10' grid 14100 (see FIG. 14). Recorded information includes the room label 14210, the room center point marking 14220, and the room center point coordinates 14230 relative to the 0'×0' origin 14100 of the grid.

Figure 15:
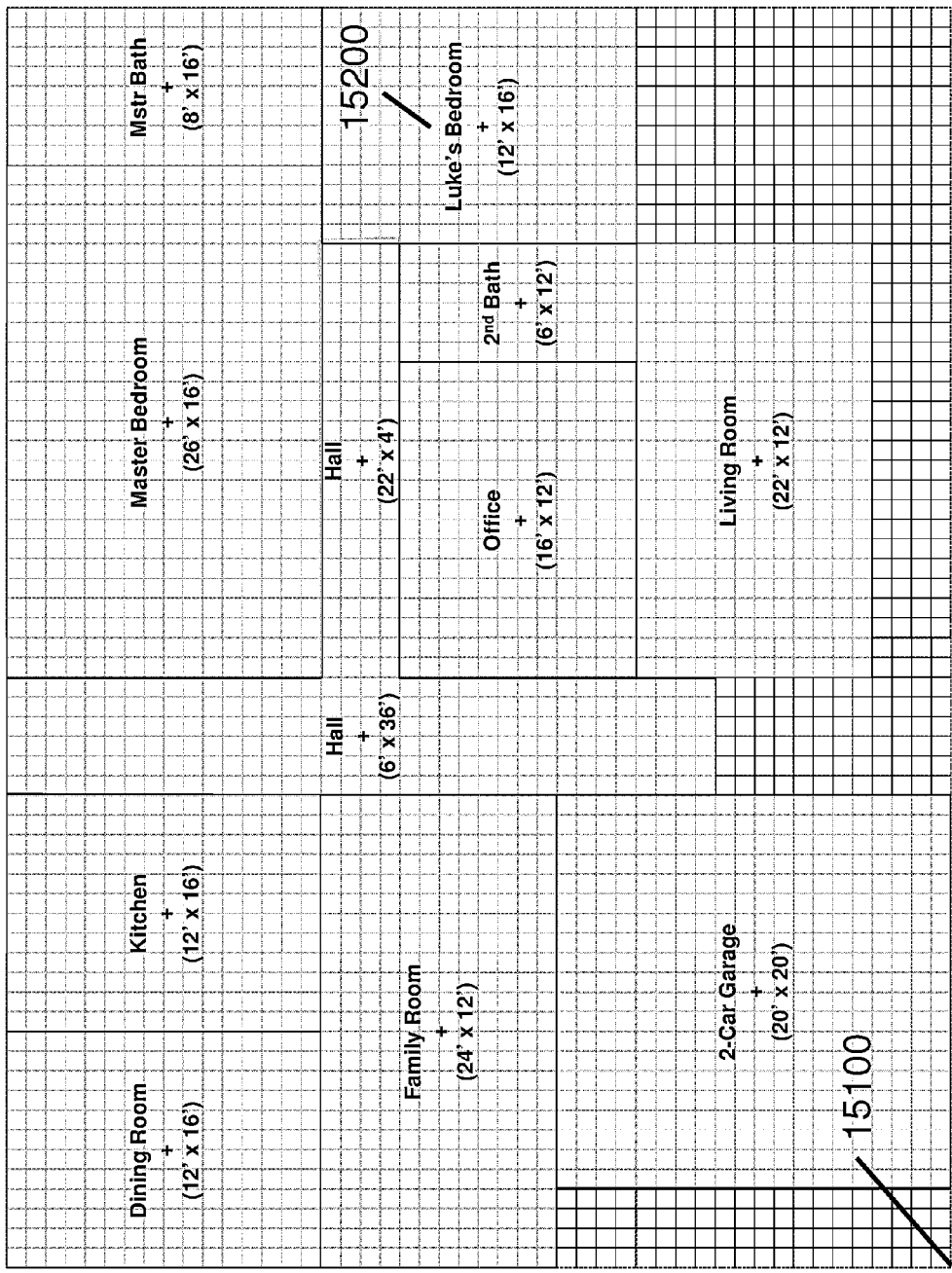
FIG. 15 illustrates an example rendition of a user's floor plan generated by an example Home Inventory system.

The HI system 900 then creates a floor plan of the user's residence from the room center point plot above. FIG. 15 illustrates an example floor plan 15000 generated by the Home Inventory system using the locations selected by a user from their mobile device 200 and the GPS coordinates (or other geographic location information) received at the web server 600.

The rendition of a user's residence is created, by example, using a combination of user selected locations together with the downloaded GPS coordinates (or other geographic location information). As described in the state flow below, a user centers himself/herself in a room and enters a gesture on mobile device 200 which causes their current GPS coordinates to be downloaded to the Home Inventory system 900. The Home Inventory system uses the collection of coordinates downloaded to create an initial rendition. The Home Inventory system may end up with a very simplistic rendition if the user only selects bedroom locations. However, more rooms, hallways, bathrooms, patio, garage, etc. selected by the user and downloaded with GPS coordinates allows the Home Inventory system to improve the floor plan rendition. In addition, certain characteristics of the location selected by the user can be used to position and/or size a room/element in the rendition. For example, the size of bathrooms can be estimated to be one-quarter the size of an associated bedroom. In another example, a bathroom situated between two bedrooms can be interpreted to be a Jack-And-Jill bathroom with slightly larger dimensions than a traditional bathroom. A collection of heuristics including location area, age of the residence, city and county codes, etc. can be used as input into the Home Inventory system 900 to improve the quality of the generated rendition. In addition, other geographic location data points (e.g., associated with images) can be used to further enhance the quality of the rendition. Optionally, a graphics editing package can be incorporated in the Home Inventory system enabling users to further enhance the drawing (e.g., resize and rotate rooms, modify layout, etc.).

Figure 16:
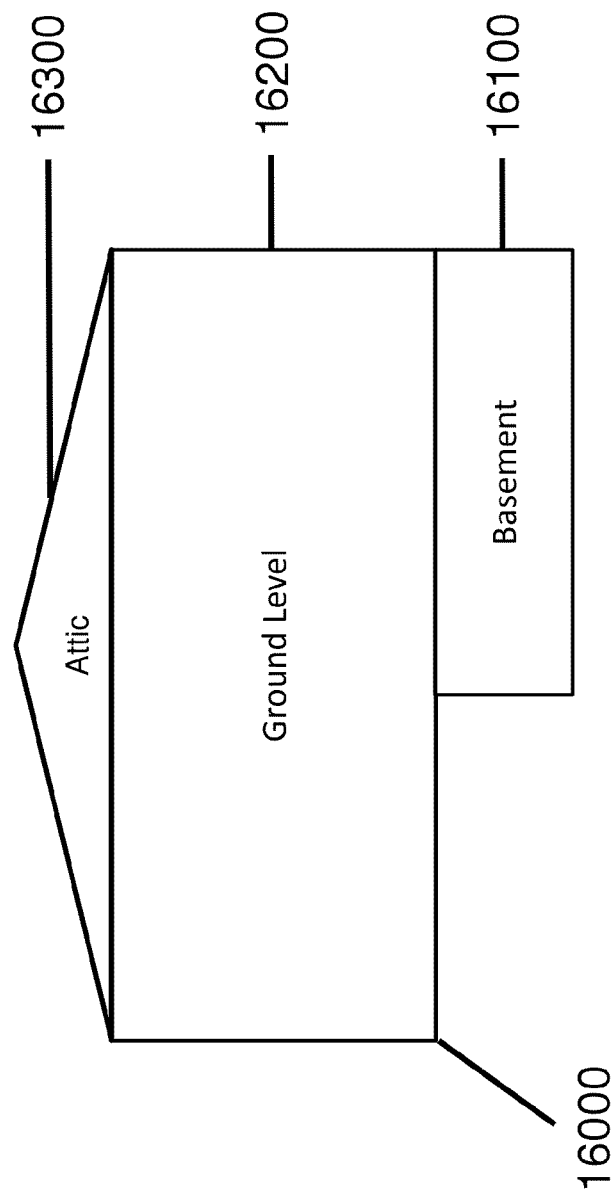
FIG. 16 illustrates an example side view drawing of elevation levels of a user's residence generated by an example Home Inventory system.

FIG. 16 illustrates an example side view of the user's residence 16000 created by the Home Inventory system. In this example, the user designated a single level residence during registration and selected basement 16100 and attic 16300 locations during the location and imaging steps (e.g., if the user selects the line items basement and/or attic in the locations list 10100 in FIG. 10 the Home Inventory system adds these elements to the side view).

Figure 17:
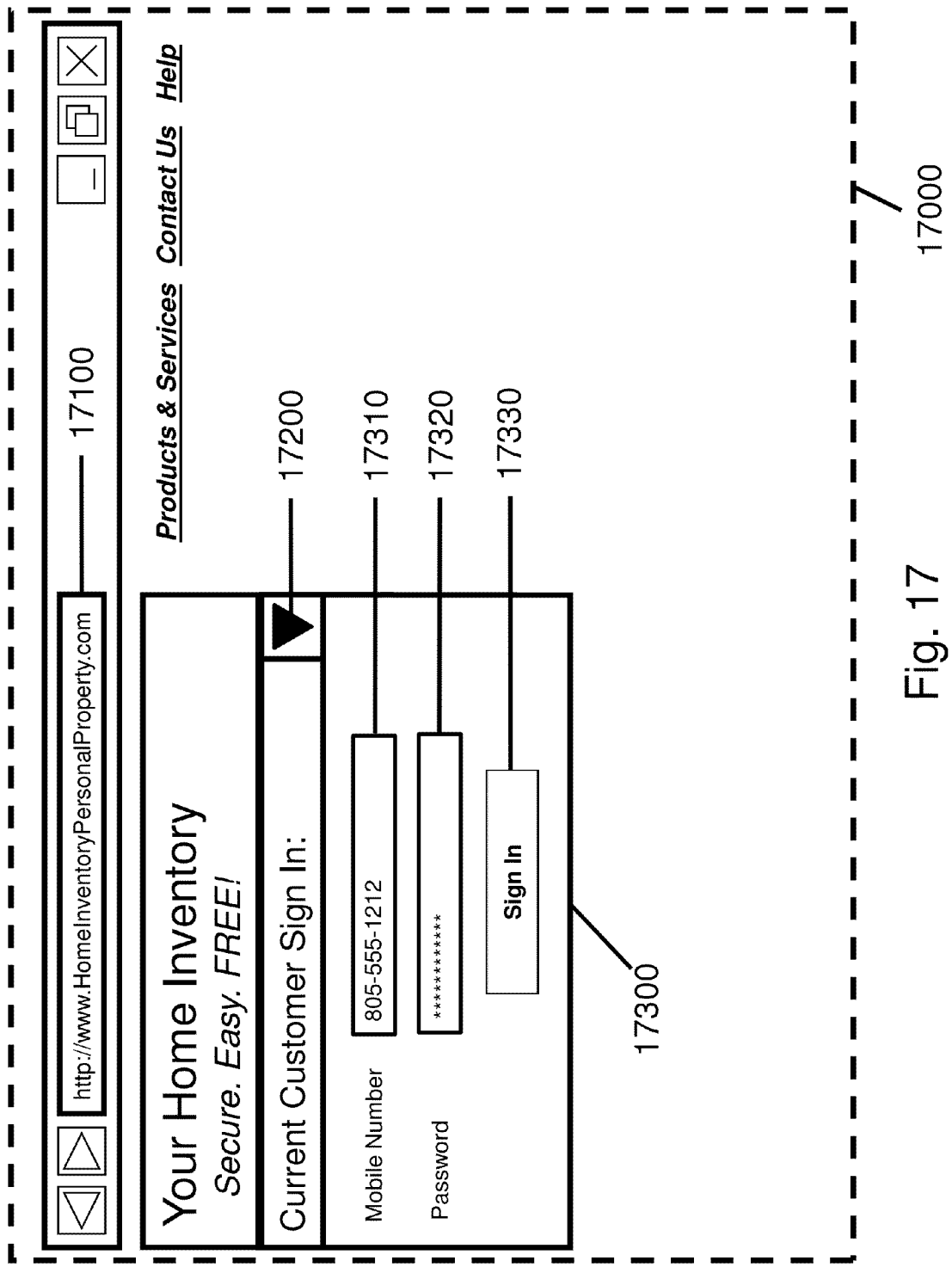
FIG. 17 illustrates an example login user interface presented to a returning user of the Home Inventory system.

FIG. 17 illustrates an example login user interface 17000 presented via a browser (or other interface application) to a user. The browser can be, by way of example executing on a computer terminal 100, such as a personal computer, a Wireless Application Protocol (WAP) or browser-enabled phone, a PDA or the like. The login/registration web page can optionally be accessed by supplying the appropriate URL 17100 to the browser, by selecting a link in response to a search query, or the like. In this example, the returning user can reach this web page by selecting the current customer login control 4200 shown in FIG. 4. The example user login pull down menu pane 17300 includes a mobile phone number entry field 17310 and a password entry field 17320. When a user clicks on the Sign In control 17330, the entered mobile number and password are transmitted to the web server 600 over the data network 400 for authentication.

Figure 18:
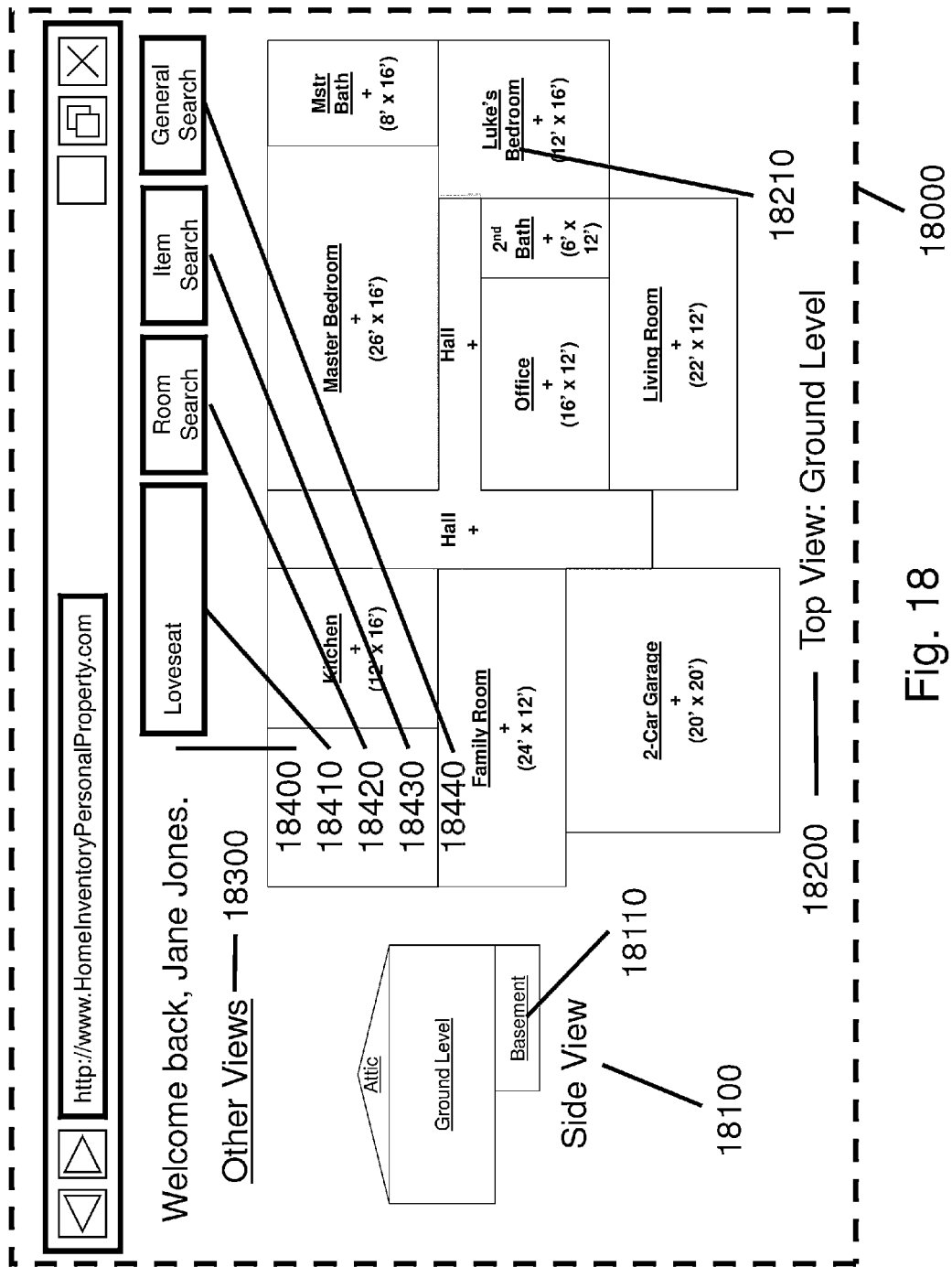
FIG. 18 illustrates an example welcome page and web display of a user's floor plan.

FIG. 18 illustrates an example rendition of a user's residence 18000 presented via a browser (or other interface application) after the user has completed a series of imaging and location selection steps and successfully logged in as described in FIG. 3 states 21-24. The Home Inventory system side view 18100 of the residence is displayed in the left side of the page. An illustration of the top view of the ground level floor 18200 generated by the Home Inventory system is displayed in the center to right hand side of the page. The user can change the main view in this example from attic, to ground level, to basement by selecting the named areas in the side view 18100. In addition, in this example, each of the locations identified on the top view floor plan of the selected elevation level (in this example, the ground level) is an active URL/link that can be clicked through to display another web page which provides a user interface to organize items at that selected location. For example, selecting the link representing Luke's Bedroom 18210 displays a listing of the items currently inventoried there (see FIG. 19 and its description below). Optionally, the Home Inventory system presents additional other views 18300. For example, the Home Inventory system could present an ordered list of locations.

Additionally, the web page 18000 also includes a search capability 18400 to further assist the user navigation to view selected inventory details. The user enters search terms in the search key word field 18410 and then clicks either the Room Search button 18420, the Item Search button 18430, or the General Search button 18440 (for a default search through all customer records). Each user account includes a personalized search term dictionary linked to their account in the customer HI database 700. This personal dictionary is initially populated with default parameters from a global system wide dictionary when the account is first registered. As the user creates new item names, the personal dictionary is automatically updated. Room and photo names/labels are also entered into the personal dictionary. The Home Inventory system 900 periodically (e.g., daily) mines personal user dictionaries to refine the global dictionary contents.

Figure 19:
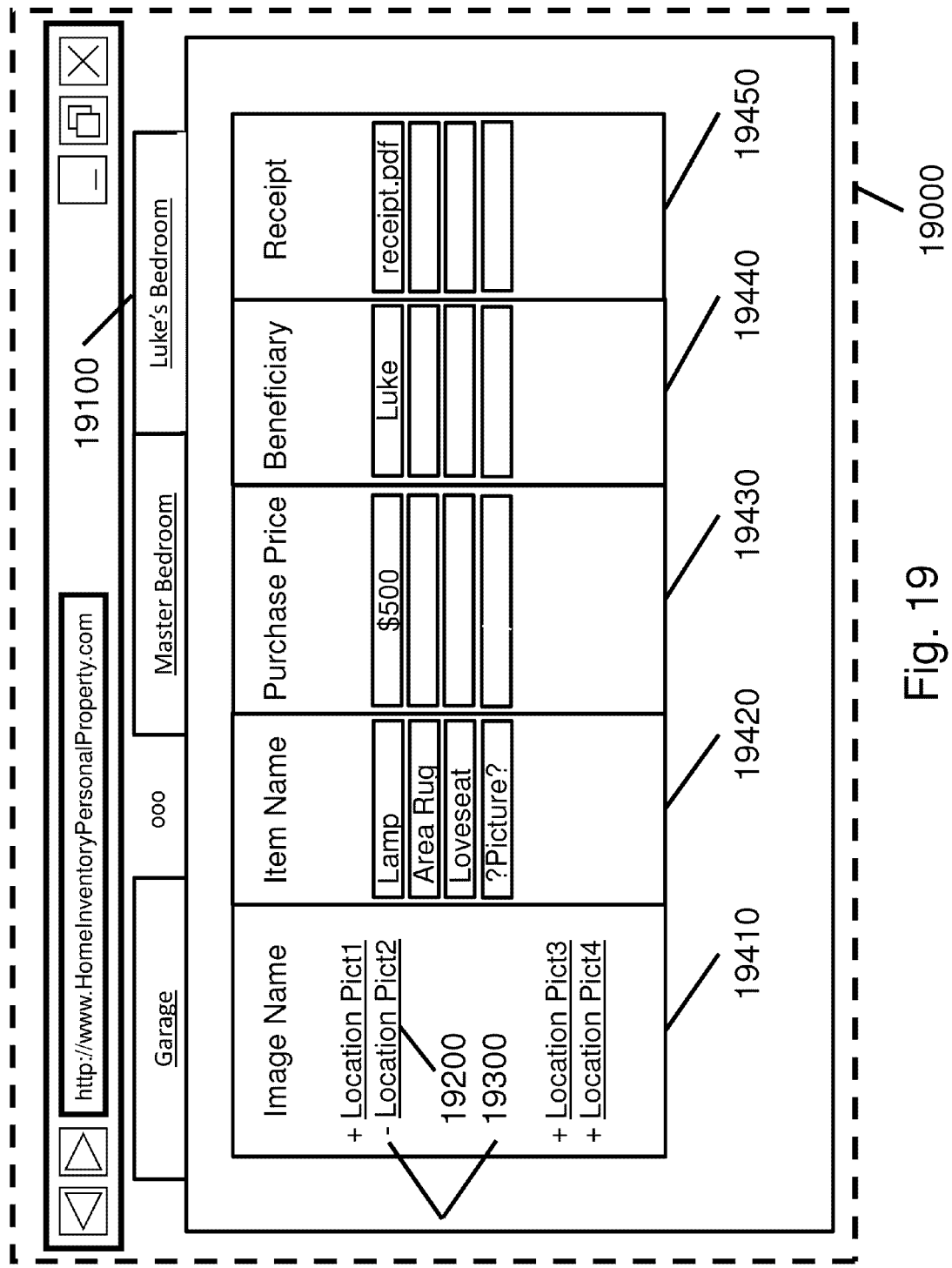
FIG. 19 illustrates an example web display of the contents of a location in a tabular list view.

FIG. 19 illustrates another example user interface 19000 presented via a browser (or other interface application). This user interface enables a user to further enumerate and itemize their household belongings. In this example, this user interface is accessed by a user selecting a location, such as Luke's Bedroom 18210 from FIG. 18. A tabbed user interface 19100 is shown in FIG. 19 although other user interfaces can be used. Optionally, other tabs across the top include all of the locations (depending upon the number of locations), or the higher-level abstraction of the different floor levels.

Labels of the camera images 19200 for each room are listed for the user. In this example, a default name is assigned to each image; Location Pict1 for the first camera image taken by the user, Location Pict2 for the second camera image, etc. Optionally, the user can edit the image name. In this example, the user has selected Location Pict2 and the items within the image are listed. Each image contains no items, one item, or multiple items. A user can edit the labels/names 19420 and number of items associated with an image as will be described in further detail below. In this example, each item within an image can also be assigned an actual or estimated purchase price value. A user can assign an original purchase price and/or estimate the current dollar value of an item 19430. In addition, a user can associate a beneficiary 19440 to each listed item. Lastly, in this example, a user can attach a scanned in receipt, warranty contract, and/or other forms of notes for an item 19450. The user selects the field corresponding to the item or picture in the receipts column 19450 and then requests to specify the path name or browse to the scanned in receipt. In this example, the specified file is downloaded from the user's PC across the data network 400 and stored in the user account database 700.

An image is not required to create a list of items for a location. In this example, four camera images were captured for "Luke's" bedroom. Optionally, the user can manually type in a list of items for "Luke's" bedroom.

In this example web presentation, each of the labeled images has an associated URL 19200 to the image and an image item list minimize[−]/maximize[+] button 19300. The list of image items is displayed when in the maximized[+] mode and is suppressed when in the minimized[−] mode. Clicking on the image label causes the stored image to be displayed to the user.

Figure 20:
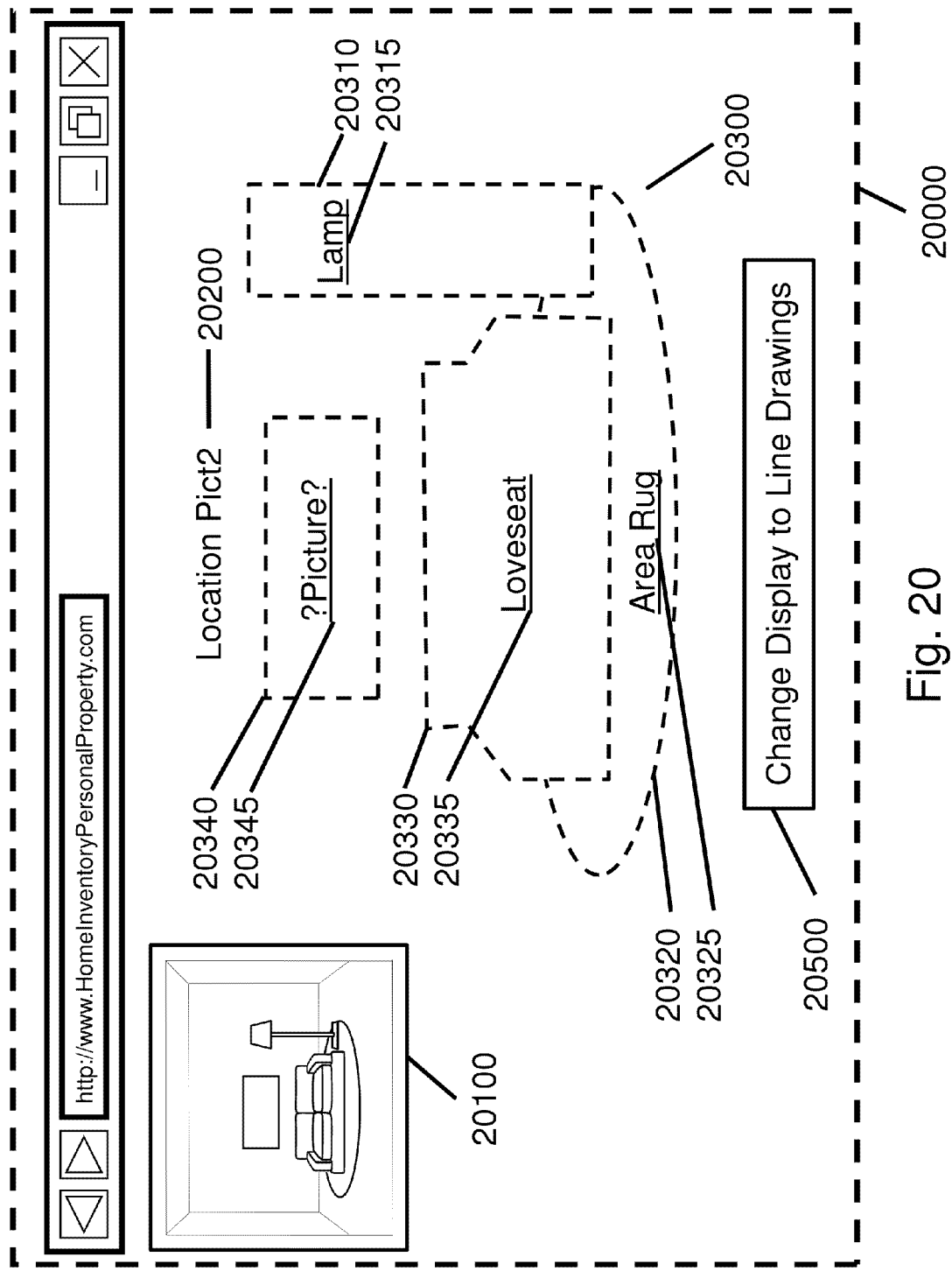
FIG. 20 illustrates an example web display of an image taken by a user and a rendition of the image created by a Home Inventory system. The example includes an item map and labels assigned by a Home Inventory system to individual items.

FIG. 20 illustrates another example user interface 20000 presented via a browser (or other interface application). This example user interface enables a user to view location images and append additional information with each item in an image. Optionally, other manual or automatic methods of item separation and identification can be used including a combination of image filtering, color change detection, item outline detection, etc.

In this example illustration, the web page contains three major elements: a thumbnail view of the actual image 20100, the photo title or label 20200 assigned to the image, and an outlined rendition of the labeled items in the camera image 20300 (the elements 20310, 20320, 20330, and 20340 and associated item labels 20315, 20325, 20335, and 20345). The item outline rendition is a processed image by the Home Inventory system wherein individual items become individual elements of the picture with each element having an associated item outline and item label with an associated clickable link. In this example embodiment, the individual elements appear in the rendition as outlined items. For example, in FIG. 20, image processing and link embedding techniques are applied to create an image rendition which includes four separate items: item 1 (the lamp) 20310, item 2 (the area rug) 20320, item 3 (the loveseat) 20330, and item 4 (the picture) 20340.

Figure 21:
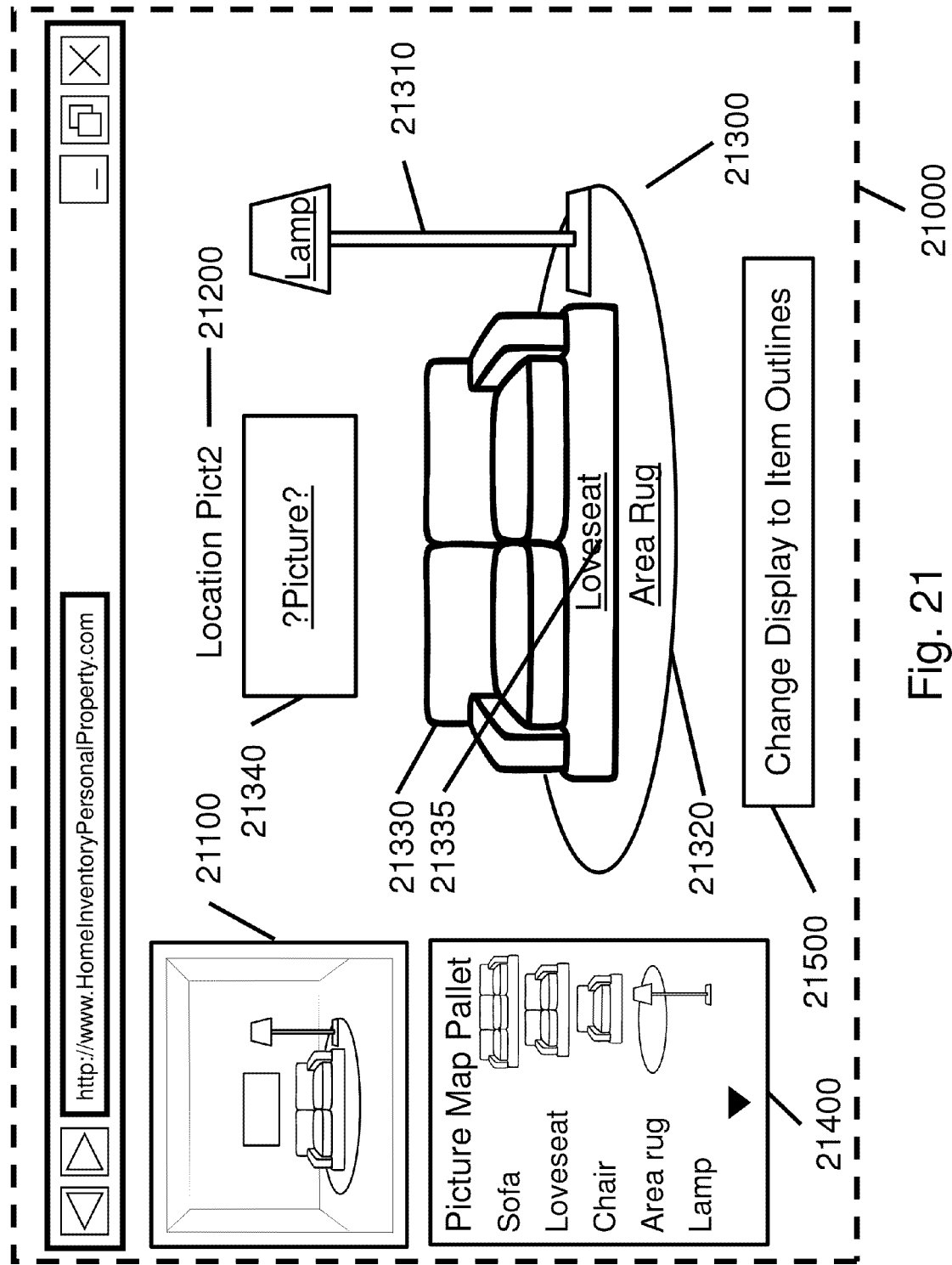
FIG. 21 illustrates an example web display of a second rendition of an image taken by a user. In this example rendition, generic line drawings have replaced outlined items.

Optionally the user requests the Home Inventory system change the display from the item outline rendition to a generic line drawing version of the photo image. The system could automatically replace the items after a user modifies a label, upon entry to the web page, or in response to the user selecting a web control option such as 20500 in FIG. 20. FIG. 21 illustrates the resultant view 21000 in which all of the outlined items have been replaced with generic template drawings to further enhance the rendition. For example, in FIG. 21, the Home Inventory system replaces the outline 20310 in FIG. 20 with a generic drawn lamp 21310. Similarly, the outlines 20320-20340 in FIG. 20 are replaced with generic drawn items Area Rug 21320, Loveseat 21330, and Picture 21340 respectively. The user can return to the item outline view 20000 by clicking the Change Display to Item Outlines button 21500.

Figure 22:
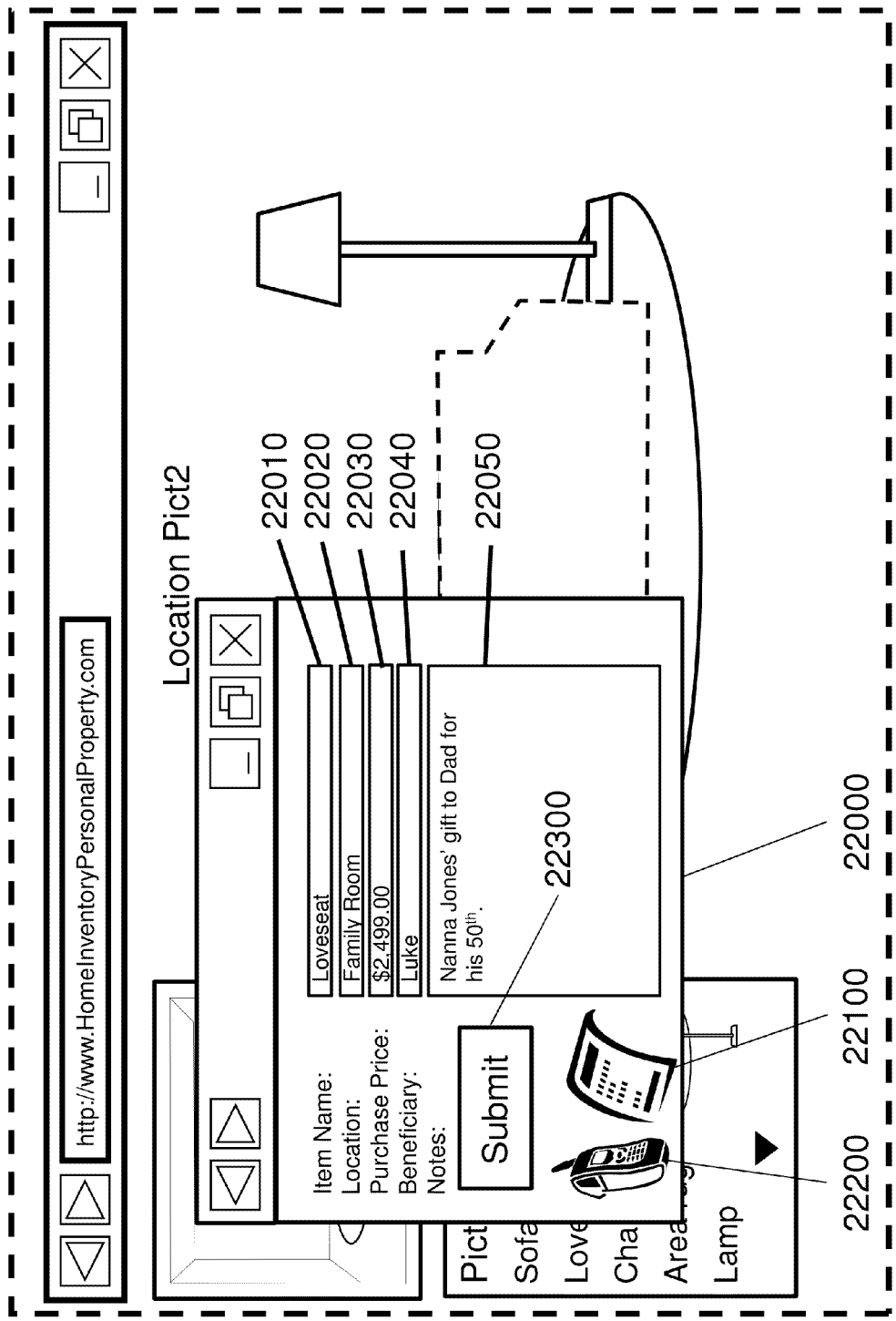
FIG. 22 illustrates an example web display enabling a user to edit fields to provide additional information regarding an item in an image.

FIG. 22 illustrates another example user interface 22000 presented via a browser (or other interface application). This example user interface enables a user to select an item within a picture rendition and include additional information about the item. This example web page was presented in response to a user clicking on the "Loveseat" item link 21335 in FIG. 21.

In this example, the pop-up web form 22000 prompts the user to enter a structured set of information. The user can enter a name or title 22010 for the item. The user can enter an item value 22030 (e.g., the purchase price). The user can designate a beneficiary for the item 22040. The user can also attach a purchase receipt or warranty to the item as described below. In this example, there is also a note field 22050 for general information to be detailed by the user about the selected item. Optionally, the user can change the location 22020 by retyping a new location and/or selecting from a menu list of locations (e.g., when an item is moved from one room to another).

Optionally, to simplify the data capture user experience, the user can speak the information related to the item rather than manually entering the information. In this example, the user can select the phone icon 22200 which can optionally invoke the software program 800 running on the mobile device 200 and visually prompt the user to speak information related to the items (e.g., item name, item value, etc.) The recorded speech is downloaded to the network-based server 600 over the wireless network 300 and/or data network 400. Automatic speech recognition techniques and/or transcription operators can convert the speech to text. The text is stored in the customer data base 700 and optionally displayed to the user through a web interface (or the software program 800 on the mobile device) for final approval and/or editing. Optionally, selecting the phone icon 22200 can cause a call to be placed to the user's cell phone. From this point, an interactive voice response session occurs between the user and the network-based Phone Server 500. Recorded speech at the phone server 500 is similarly transcribed using automatic speech recognition or manual transcription.

Figure 23:
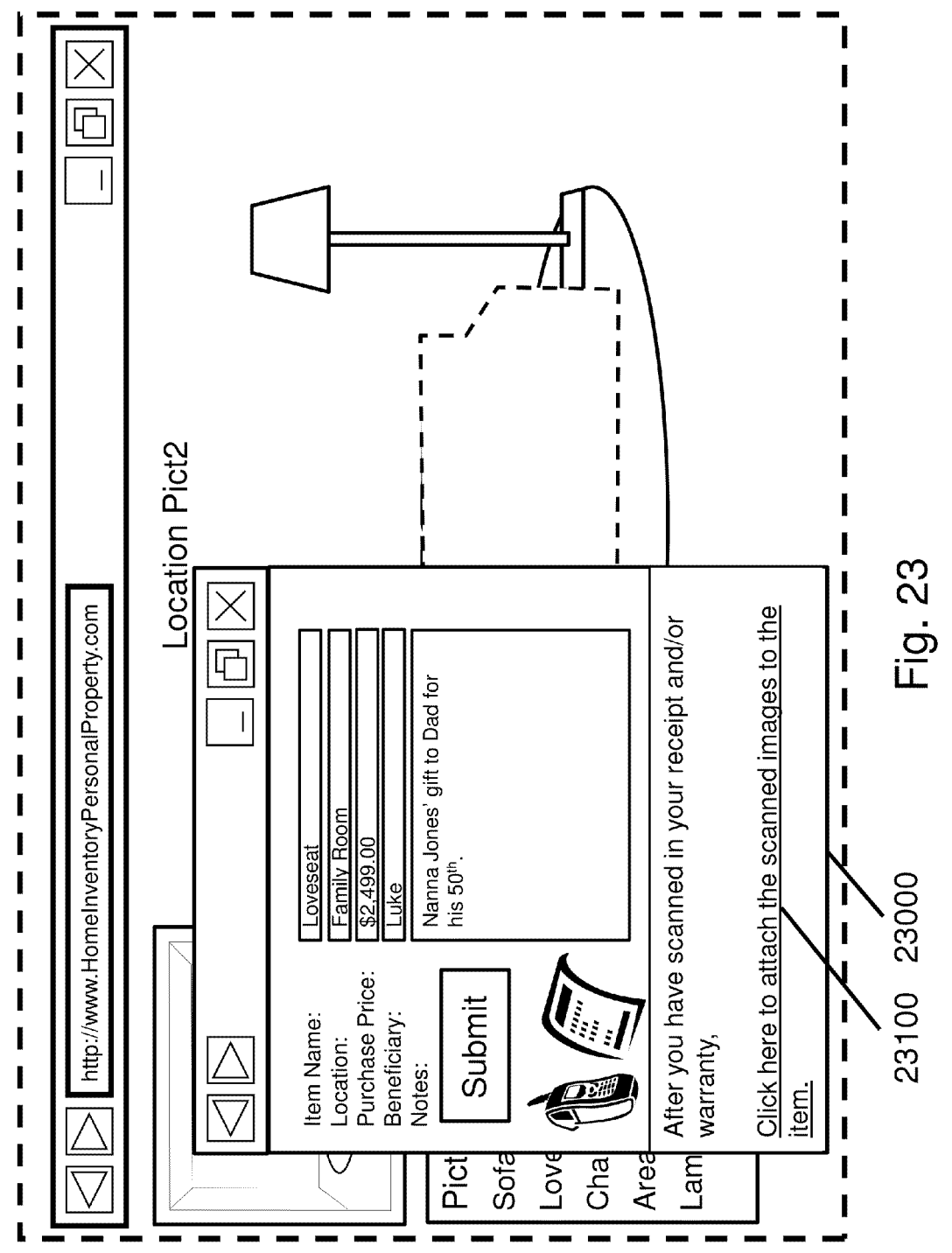

FIG. 23 illustrates another example user interface 23000 presented via a browser (or other interface application). This example user interface enables a user to attach a scanned receipt or warranty to a selected item. This example web dialog box is presented in response to a user clicking on the receipt icon 22100 of FIG. 22.

The user is instructed to scan in the desired item and then to click link 23100. The user is next requested to specify the path name or browse to the scanned in stored receipt. In this example, the specified file is then downloaded across the data network 400 and stored in the user account database 700

Optionally, the user can invoke the program 800 on their mobile device and take a picture of the receipt/warranty information. The program 800 optionally prompts the user to enter the location and item name. Optionally, the Home Inventory system assigns a unique identifier to each location/item combination. Optionally, the user can enter this unique identifier before or after taking a picture of the receipt/warranty information. The receipt/warranty image(s) is transmitted to the web server 600 over the wireless network 300 and/or data network 400 and stored in the customer database 700.

In this example, the Home Inventory servers 500, 550, and 600 are optionally centralized at a given location, or distributed to a number of locations. The Home Inventory system 900 can be a standalone system (e.g., a Home Inventory system used by a number of service providers) or the Home Inventory system is integrated into a service provider's internal systems (e.g., those systems employed to provide users online information services). Optionally, the Home Inventory system is provided by a telecommunication carrier (e.g., Verizon) to service providers (e.g., Google or Intuit). Optionally, there are no charges to use the Home Inventory service. Optionally, the voice and/or data transactions between a user's mobile device and one or more Home Inventory servers are not charged to the user but to the service provider or telecommunication carrier. Optionally, the Home Inventory system 900 is connected to a data communication network 400 and a wireless network 300. The Home Inventory system interconnects with the wireless network 300 using telecommunication interfaces (e.g., SS7) and via data communication networks using a secure router subsystem and an SMS server subsystem which optionally serves as a mail relay to transmit and receive SMS and MMS messages via a Short Message Service Center (e.g., an SMSC operated by a network carrier). These subsystems of the Home Inventory system are optionally interconnected via a Local Area Network (LAN), a Private Wide Area Private Network (WAN), and/or a Public Wide Area Network (e.g., Internet).

The Home Inventory system in this example contains centralized databases and/or general-purpose storage areas, optionally including, but not limited to a customer/user database(s) 700. Optionally, the database(s) is not centralized and may be distributed geographically and/or over different systems. The database is optionally interconnected to the authentication system via a Local Area Network (LAN), a Private Wide Area Network (WAN), and/or a Public Wide Area Network (e.g., Internet).

Optionally, the Home Inventory system includes a presence management subsystem. Presence managers optionally authenticate and track an application's online presence and interact with a given application (e.g., a application hosted on a user's mobile phone) as information (e.g., passwords, location information, photos) is synchronized with the centralized databases to provide the user secure, reliable, and timely data transmissions and synchronized user interactions.

In this example embodiment and others, if the user changes their mobile device number (e.g. by purchasing a new phone from a new provider and don't port their device number), they contact their Home Inventory service provider via the web or phone and re-register their new phone identifier.

Figure 24:
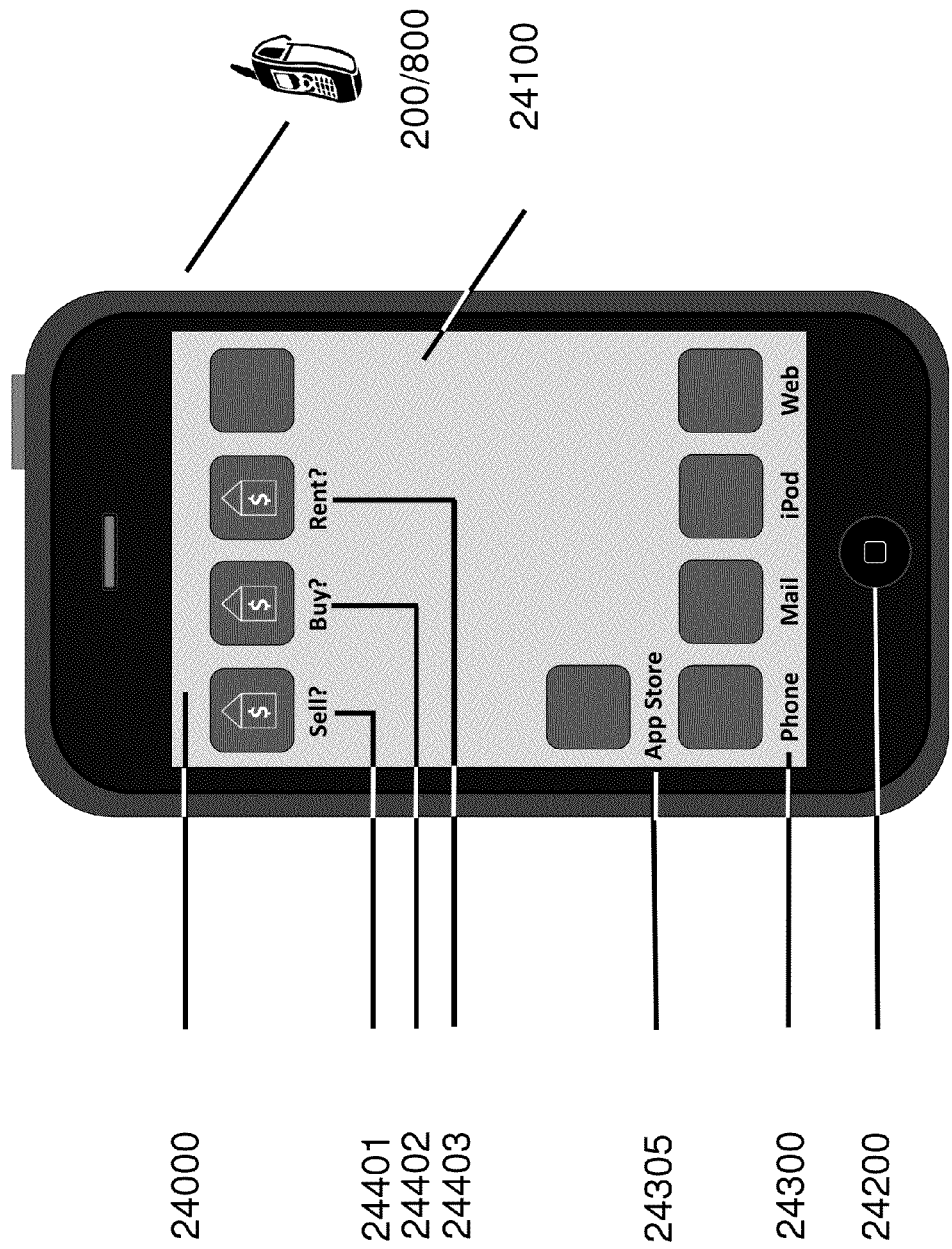
FIG. 24 illustrates an example smartphone User Interface with Market Price Home Inventory (MPHI) application icons.

FIG. 24 illustrates an example mobile smartphone device 200 that runs various user selected application programs 800. The mobile device display 24000 identifies one or more of the software applications previously pre-installed at the time of purchase or downloaded by the user. In this example, the mobile device displays user downloaded software applications 24401-24403 and preinstalled or fixed applications 24300. Further in this example illustration, the mobile device displays an icon/user interface control 24305 that can be selected by the user to access a marketplace/store to access free and paid downloadable applications to the user's mobile device. The list of applications in the figure includes the Mobile Phone Home Inventory (MPHI) applications 24401-24403 described in the second and third example embodiments below. The mobile device illustrated includes a touch sensitive screen 24100 which enables a user to open, close, and navigate applications/services with a touch or stroke of a finger. The mobile device display 24000 in FIG. 24 also includes a home buton user control 24200 which when selected by the user exits any open mobile device application.

Figure 25:
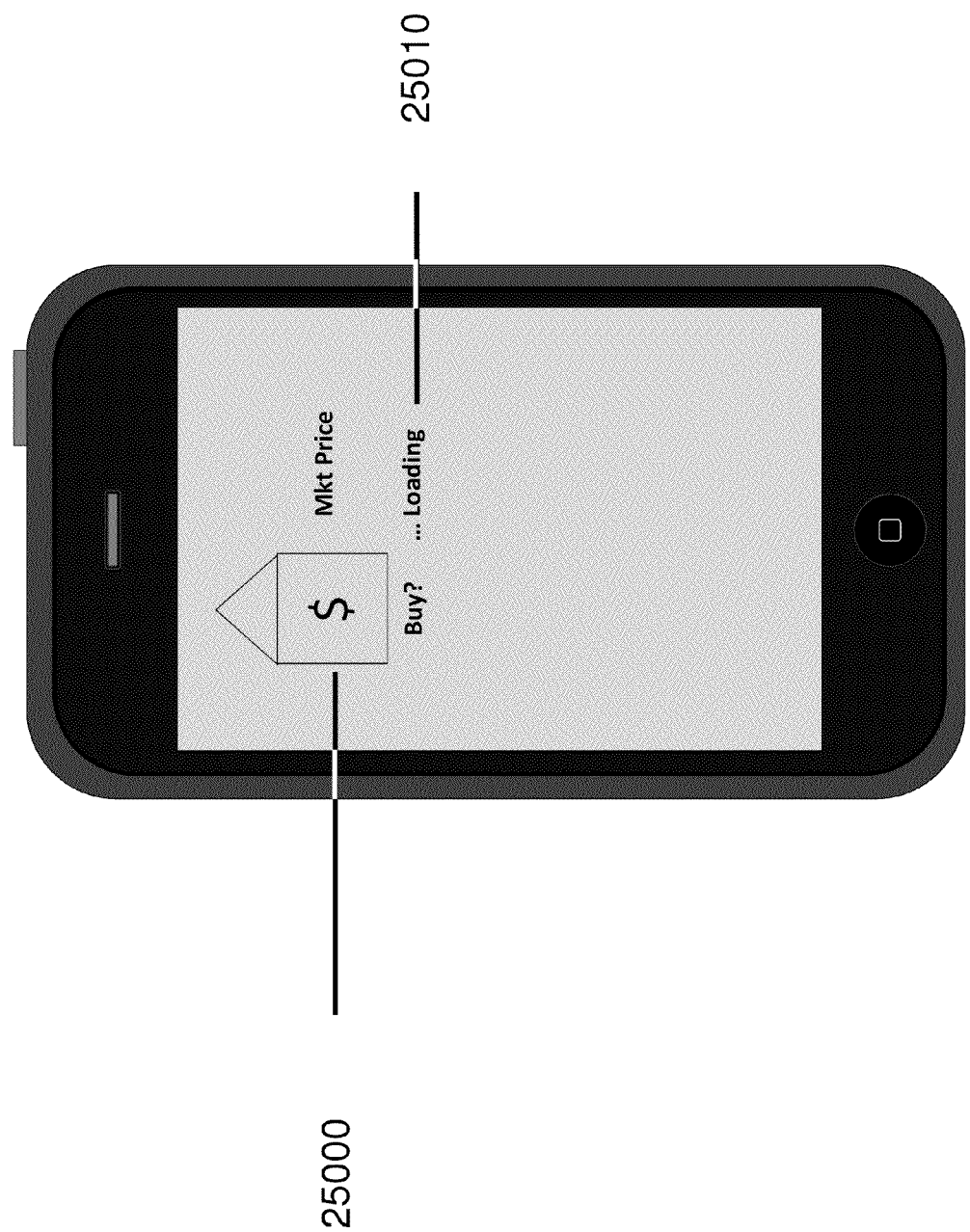
FIG. 25 illustrates an example smartphone MPHI application startup/welcome display for a service to help users make wise home buying decisions.

FIG. 25 illustrates an example mobile device 200 and application presentation following a user selection of the MPHI Buy? application icon 24402, see FIG. 24. The MPHI application user interface screen 25000 displays a welcome message and/or loading application transition message 25010.

Figure 26:
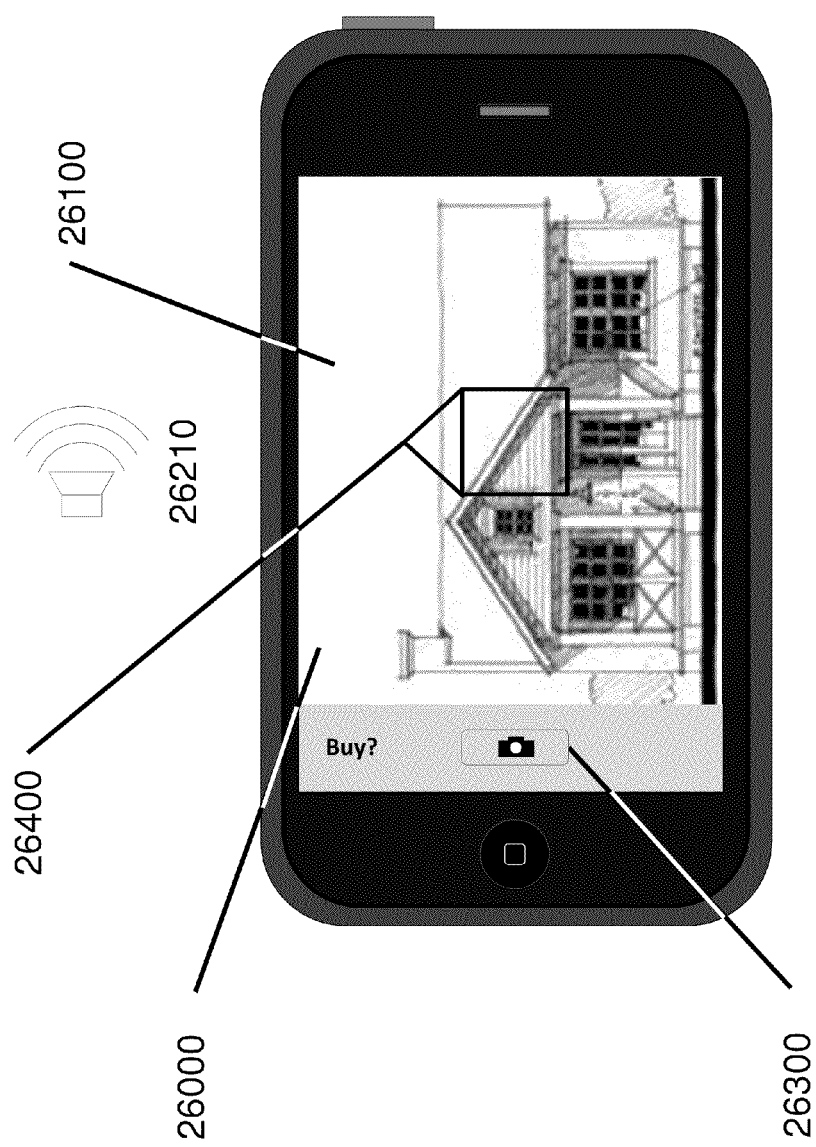
FIG. 26 illustrates an example home buying assistant smartphone MPHI application display in home selection image capture mode.

FIG. 26 illustrates an example mobile device 200 MPHI user interface screen 26000 displayed by MPHI software application program 800. In this example, this screen is displayed/accessed in response to a user selecting the MPHI Buy? application 24402, see FIG. 24. In this example user interface screen, the application is indicating to the user that the mobile device is in camera photo taking mode. The mobile device displays on the user interface screen the view through the camera lens 26100 or the image that would be captured if the user were to select the "Take Photo" soft key/control 26300. In this example, the MPHI software application program 800 audibly prompts 26210 the user to select the "take photo" and/or provide any additional user guidance. Optionally, the application supports a picture focus assist feature 26400. This feature draws around or highlights the likely item of interest for the user. For example, picture assist is available and used in digital camera technology to locate individual faces. In this example, the picture focus assist technology attempts to identify structures pertaining to homes and buildings since the MPHI is assisting the user in determining the market value of a home or building and associated land.

Figure 27:
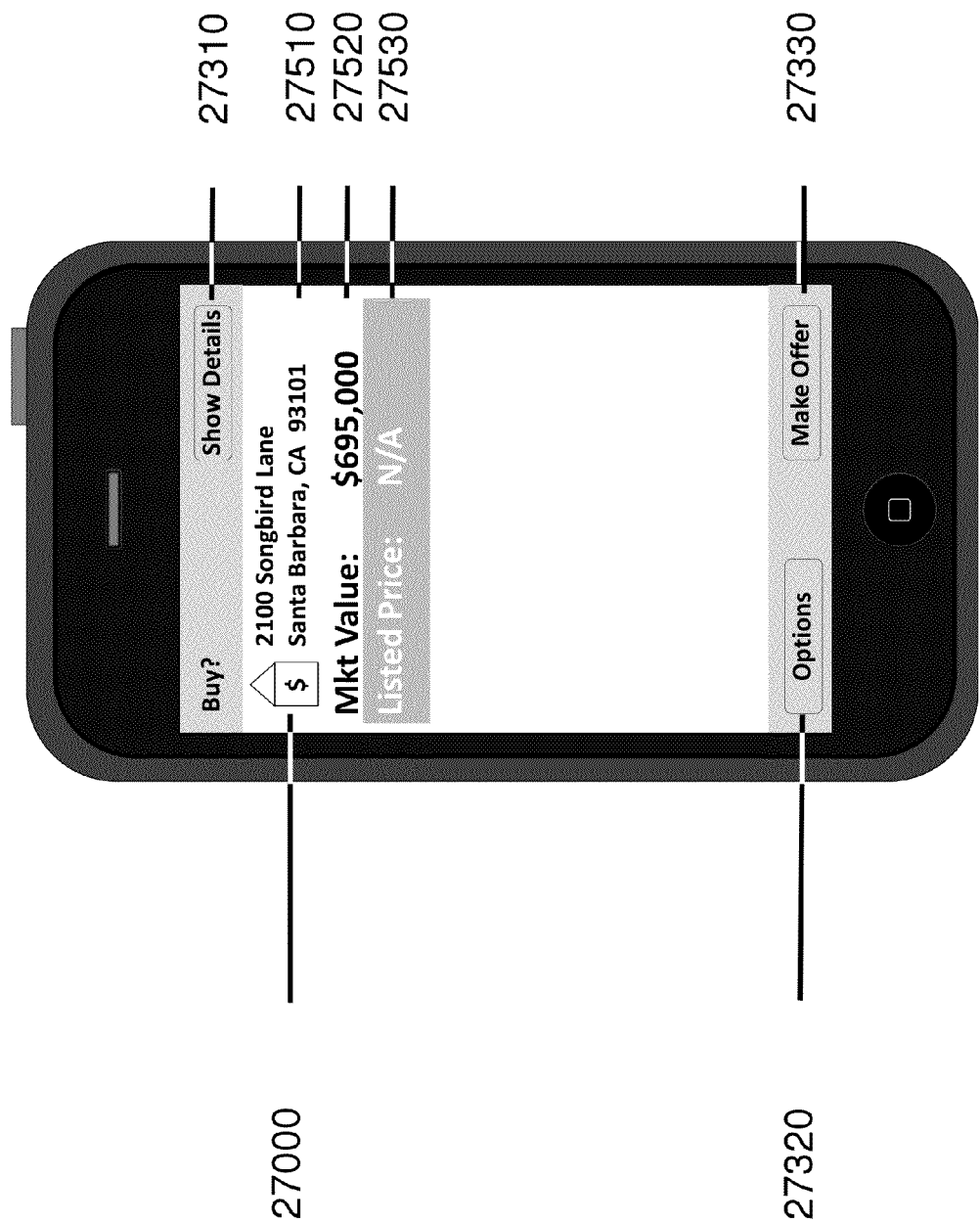
FIG. 27 illustrates an example home buying assistant smartphone MPHI application display depicting summary information about a selected home.

FIG. 27 illustrates an example mobile device 200 MPHI user interface screen 27000 displayed by software application program 800. This user interface screen is displayed/accessed in response to a user imaging (e.g., takes a picture or video) of the property of interest by selecting the "Take Photo" control 26300, see FIG. 26. The application displays a summary of information 27000 about the home. The home (or building) information displayed to a user includes, for example, home address 27510, home current market estimated value or price 27520, whether the home is currently listed for sale 27530 by owner or another a listing service such as a multiple listing service or Craig's list, a homeowner's willingness to receive purchase or rental offers, etc. Optionally, the MPHI buy application user interface screen includes a "Show Details" soft key/control 27310 which when selected by the user provides additional detail regarding the imaged property (see also FIG. 28 description). Optionally, the MPHI user interface screen includes a "Make Offer" soft key/control 27330 which when selected by the user enables the user to make an offer, optionally, anonymously to the homeowner (see also FIG. 29 description). Optionally, the MPHI user interface screen includes an "Options" soft key/control 27320 that when selected displays a list of additional options available to the user, see FIG. 31 description.

Figure 28:
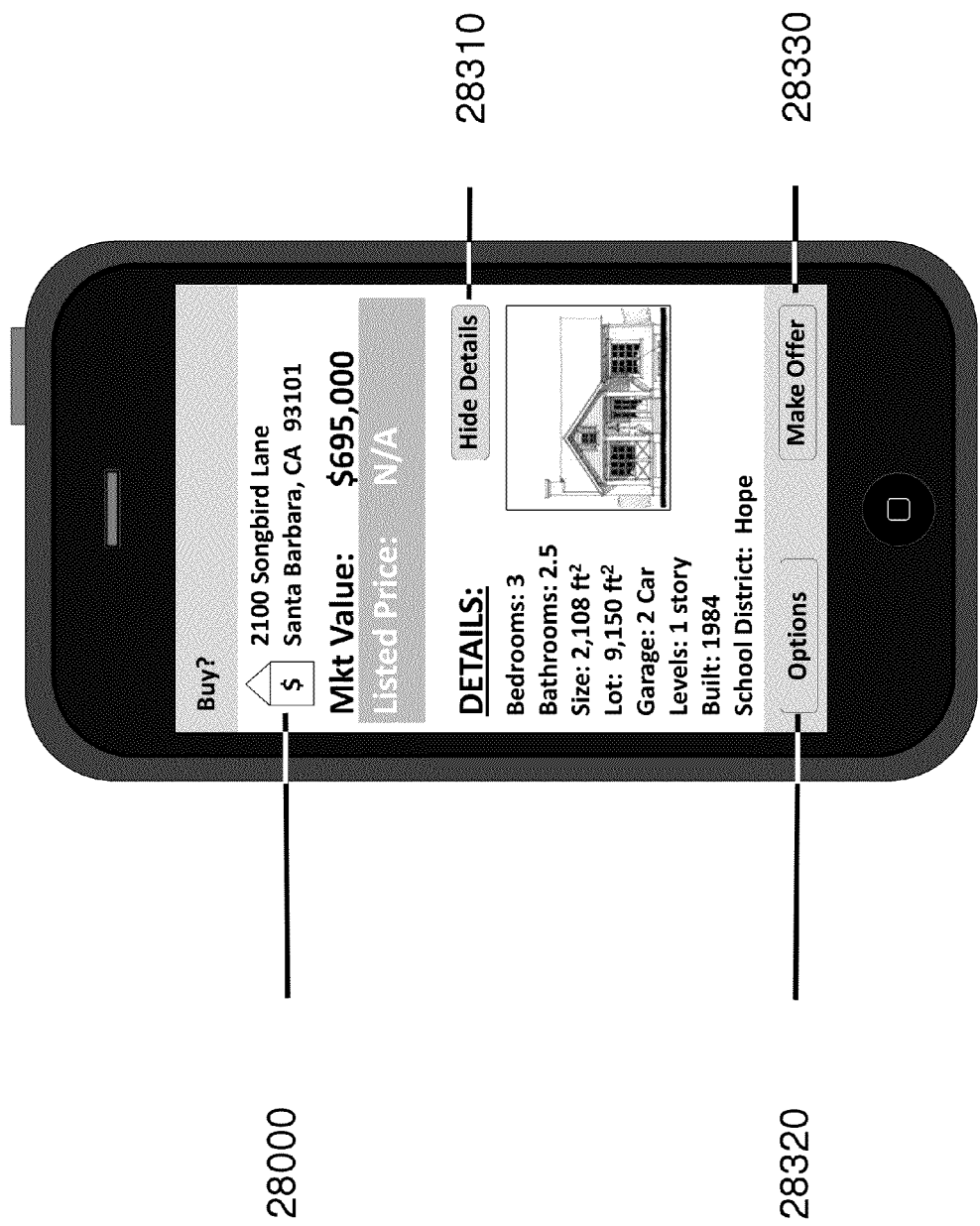
FIG. 28 illustrates an example home buying assistant smartphone MPHI application display depicting detailed information about a selected home.

FIG. 28 illustrates an example mobile device 200 MPHI user interface screen 28000 displayed by software application program 800. This user interface screen is displayed/accessed in response to a user selecting the "Show Details" soft key/control 27310, see FIG. 27. The MPHI application displays a list of information 28000 regarding the imaged property. In this example, the MPHI application accesses one or more external databases to collect the information to be displayed. Optionally, the MPHI application connects to an MPHI server 600 over a wireless network 400 to request that the server collect the information from one or more internal and/or external databases. Optionally the property information displayed to the user includes, for example, number of bedrooms, number of bathrooms, attached garage (or not), number of car garage, home style (e.g., Ranch), number of levels, square footage, School District, etc. Optionally, the MPHI service provider determines how much and which information is to be displayed to the user when viewed on a mobile device. Optionally, the user, through a set of configuration controls (not shown) specifies what information is displayed. Optionally, all of the information is displayed to the user and they use a scroll control (not shown) or a stroke of the finger across the mobile device touch screen (e.g., South to North) to access additional information. Optionally, the MPHI user interface screen includes a "Hide Details" soft key/control 28310 which if selected by the user hides the additional detail regarding the property of interest and transitions the user interface to a state illustrated in FIG. 27 or a state similar to FIG. 27 with a listing of additional application options. Optionally, the MPHI user interface screen includes a "Make Offer" soft key/control 28330 which when selected by the user enables the user to make an offer, optionally, anonymously to the homeowner. Optionally, the MPHI user interface screen includes an "Options" soft key/control 28320 that when selected displays a list of additional options available to the user, see FIG. 31 description.

Figure 29:
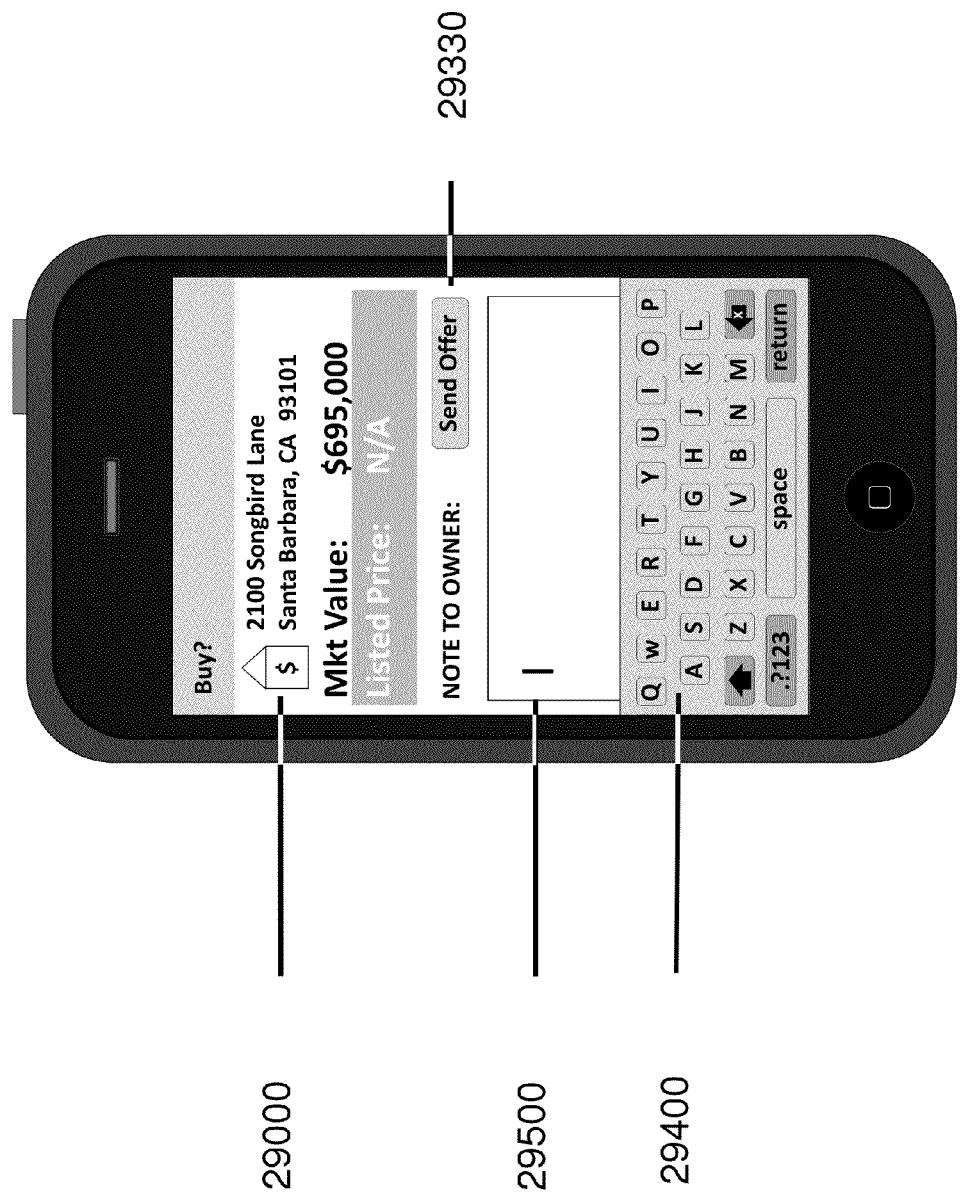
FIG. 29 illustrates an example home buying assistant smartphone MPHI application display detailing a form that a user can fill-in to compose a purchase offer to be presented to the owner of a selected property.

FIG. 29 illustrates an example mobile device 200 MPHI user interface screen 29000 displayed by software application program 800. This user interface screen is displayed/accessed in response to a user selecting the "Make Offer" soft key/control 28330, see FIG. 28. In this example user interface, in response to the user selection, the MPHI application displays a text field 29500. Optionally, the user can type, for example using a soft keypad 29400, a specific or personal note to the owner of the imaged property in the text field 29500 which will be sent to the property owner using electronic or U.S. Postal mail. Optionally, the system populates the text field with standard text typically used in making offers on property. Optionally, the user can configure and/or edit any text which is populated automatically in the text field. Optionally, if the MPHI server is unable to determine a means to contact the owner or if the owner has explicitly requested the non-solicitation of offers, a return message is displayed to the user to that effect. Optionally, if no electronic means of communication is available to the system (e.g., the property owner's email address is not know or property owner's phone number is unlisted) the MPHI user interface will optionally prompt the user if they would like the message to be sent via U.S. Postal Service (optionally for a service charge to the user). Optionally, the MPHI user interface screen includes a "Send Offer" soft key/control 29330 which when selected by the user sends an offer communication, optionally including the note from the user, to the property owner.

Figure 30:
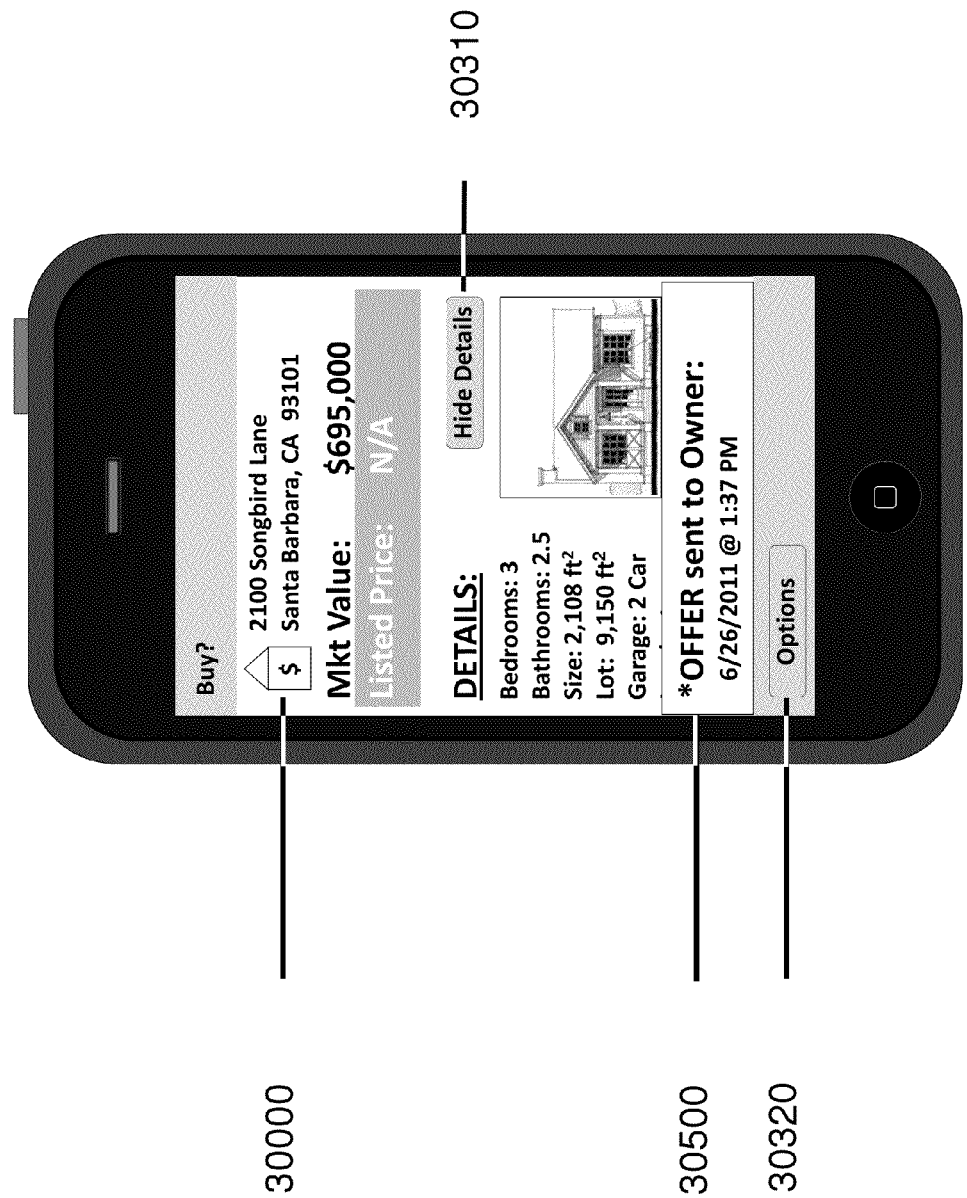
FIG. 30 illustrates an example home buying assistant smartphone MPHI application display depicting detailed information about a selected home including a confirmation that the user's purchase offer has been sent.

FIG. 30 illustrates an example mobile device 200 MPHI user interface screen 30000 displayed by software application program 800. This user interface screen is displayed/accessed in response to a user selecting the "Send Offer" soft key/control 29330, see FIG. 29. In this example user interface, in response to the user selection, the MPHI application displays a user confirmation message 30500 that the message has been sent to the property owner. In this example, the confirmation message includes the date and time the message was sent. In this example, the MPHI user interface screen includes a "Hide Details" soft key/control 30310 which if selected by the user hides the additional detail regarding the property of interest and transitions the user interface to a state illustrated in FIG. 27 or a state similar to FIG. 27 with a listing of additional options. Optionally, the MPHI user interface screen includes an "Options" soft key/control 30320 that when selected displays a list of additional options available to the user, see FIG. 31 description.

Figure 31:
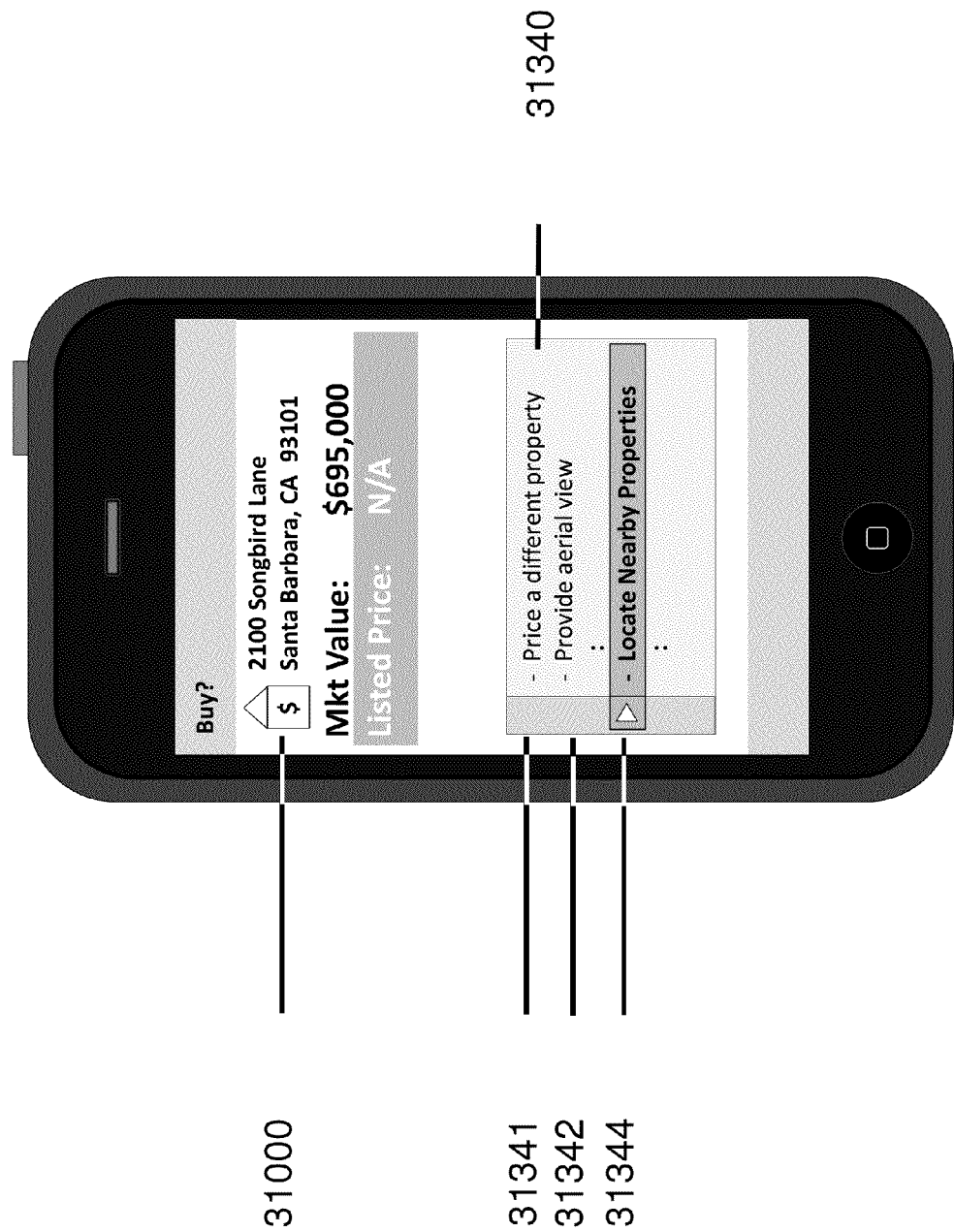
FIG. 31 shows an example home buying assistant smartphone MPHI application display which lists a menu of user option choices.

FIG. 31 illustrates an example mobile device 200 MPHI user interface screen 31000 displayed by software application program 800. This user interface screen is displayed/accessed in response to a user selecting the "Options" soft key/control 30330, see FIG. 30. In this example user interface, in response to the user selection, the MPHI application displays, for example, a list of other actions the user can perform within the MPHI buy application 31340. For example, the user might want to image/price another property, menu choice 31341. Or, the user might instruct the application to display an aerial view (e.g., satellite view of the property) of interest, menu choice 31342. Optionally, if an aerial view is requested by the user, the MPHI buy application queries directly or through an MPHI server for a satellite image which is zoomed to the property boundaries of the imaged property and is displayed on the screen size of the user's device (e.g., smart phone, lap top, tablet computer, etc.). In this example, the user has selected the "locate nearby properties" control 31344 (e.g., by touching the selection) indicated by the darkened selection.

Figure 32:
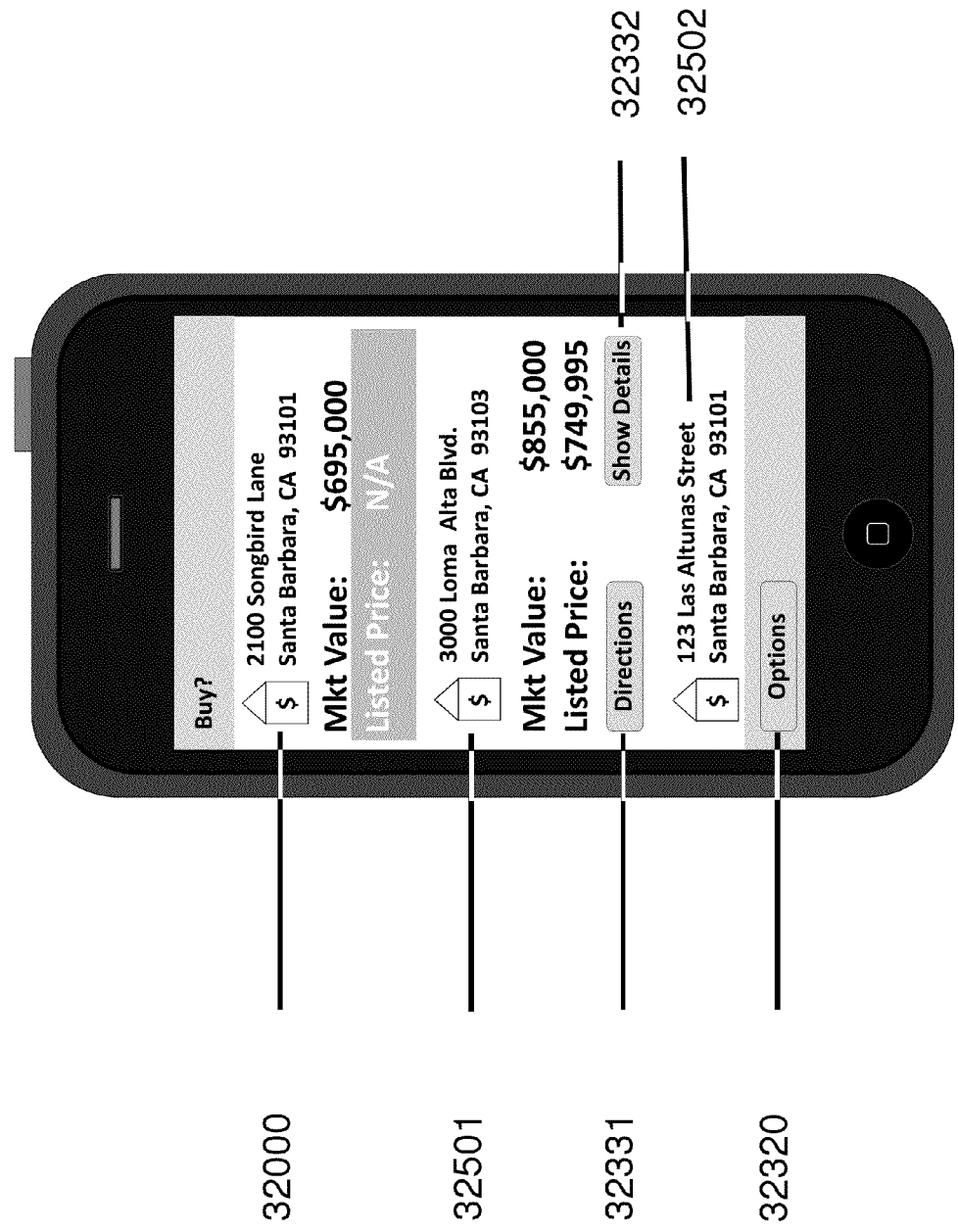
FIG. 32 illustrates an example home buying assistant smartphone MPHI application display depicting summary information about properties located nearby a user selected property.

FIG. 32 illustrates an example mobile device 200 MPHI user interface screen 32000 displayed by software application program 800. This user interface screen is displayed/accessed in response to a user selecting from the list of available options soft key/control 31340, see FIG. 30. In this example user interface, in response to the user selection, the MPHI application displays, for example, a list of properties (32501 and 32502) near to the user which meet certain criteria. Optionally, the criteria are configured by the MPHI application service provider. Optionally, the criteria are configured by the user. In this example, there are two criteria configured by the MPHI application service provider which are homes for sale by owner or homes for sale through a listing service. Optionally, a user can scroll through the list of properties by selecting a scroll control (not shown) or by a stroke of the finger against the touch screen (e.g. bottom of device to top stroke). In this example user interface, for each property in the list, two soft keys/controls are displayed, "Directions" 32331 and "Show Details" 32332. The "Show Details" control 32332 provides additional information on the selected property, see FIG. 28 description above. The "Directions" control 32331, when selected by the user, optionally provides precise driving directions from the user's current location (e.g., using GPS location and mapping technology) to the selected property (not shown in this or other Figures). Optionally, the MPHI application 800 accesses one or more internal or external data stores directly or via the MPHI server 600 to include in the list of nearby properties the estimated market value and the property list price. Optionally, the MPHI application includes in the summary list of properties the distance from the user's current location to the listed property. Optionally, the MPHI user interface screen includes an "Options" soft key/control 32320 that when selected displays a list of additional options available to the user, see FIG. 31 description.

Figure 33:
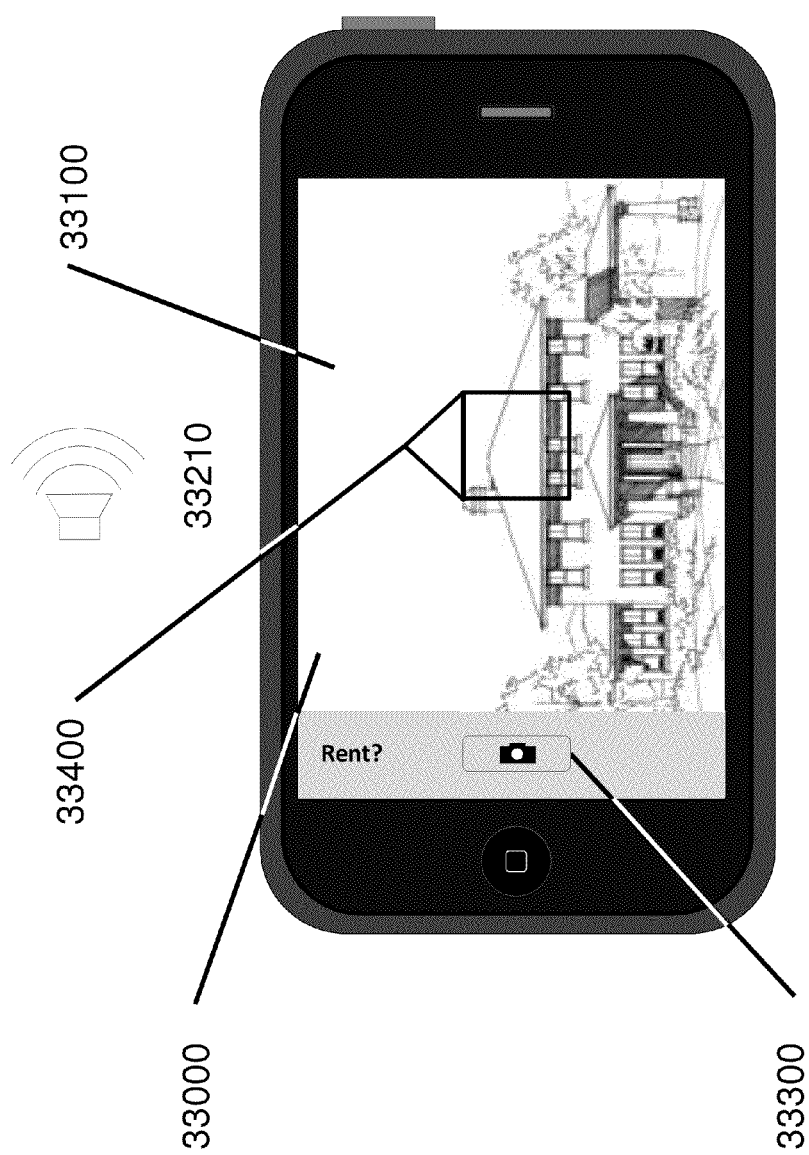
FIG. 33 illustrates an example smartphone MPHI application display for a service to help users make wise home renting decisions. The display depicts the user experience when selecting a possible rental property by taking a photo of selected residence.

FIG. 33 illustrates an example mobile device 200 MPHI rent application user interface screen 33000 displayed by software application program 800. In this example, this screen is displayed/accessed in response to a user selecting the MPHI Rent? application 24403, see FIG. 24. In this example user interface screen, the application is indicating to the user that the mobile device is in camera picture taking mode. The mobile device displays on the user interface screen the view through the camera lens 33100 of the image that would be captured if the user were to select the "Take Photo" soft key/control 33300. In this example, the MPHI software application program 800 audibly prompts 33210 the user to select the "take photo" and/or provide any additional user guidance. Optionally, the application supports a picture focus assist feature 33400. This feature draws around, centers, or highlights the likely item of interest for the user. For example, similar picture assist technology is available and used in digital camera technology to locate individual faces in a field of view. In this example, the picture focus assist technology attempts to identify structures pertaining to homes and buildings since the MPHI rent application is assisting the user in determining the market rental value of a home or building and associated land.

Figure 34:
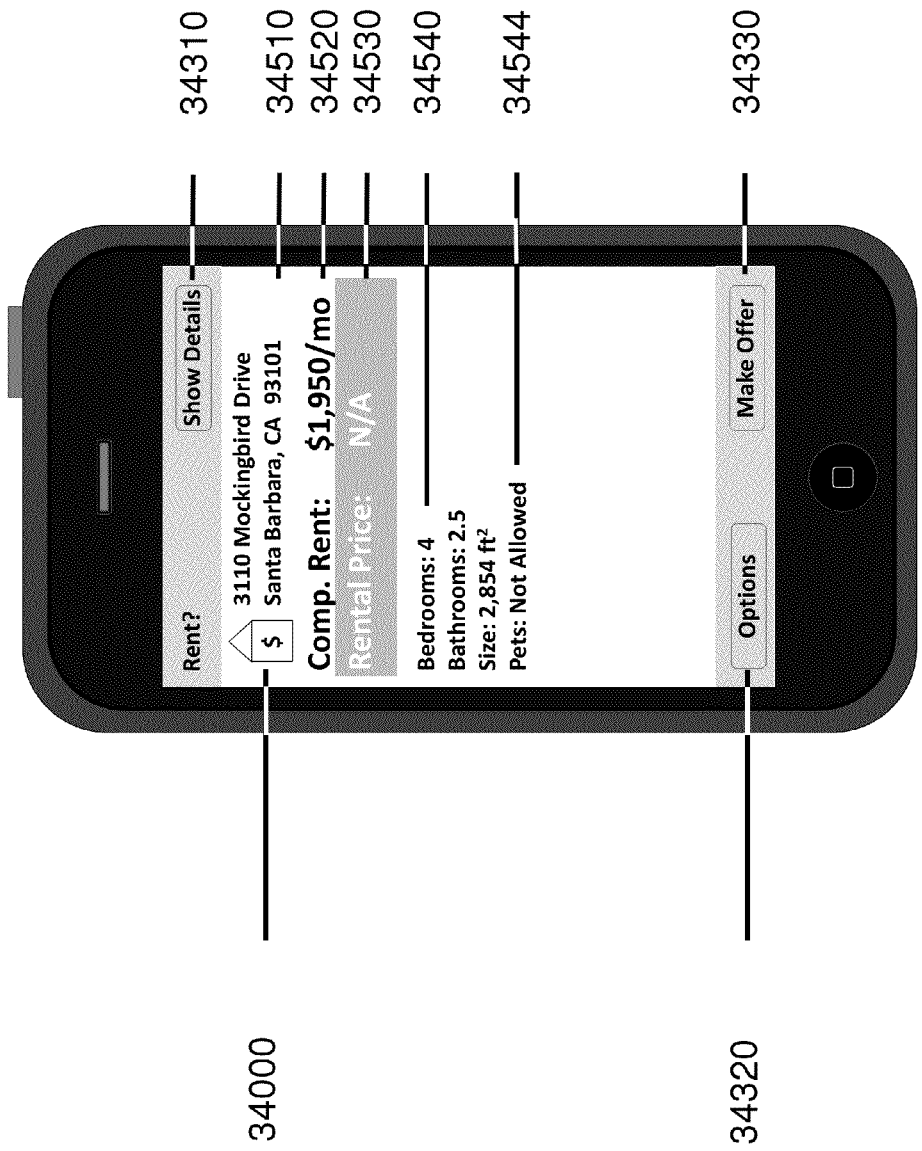
FIG. 34 illustrates an example home rental assistant smartphone MPHI application display depicting summary information about a selected home.

FIG. 34 illustrates an example mobile device 200 MPHI user interface screen 34000 displayed by software application program 800. This user interface screen is displayed/accessed in response to a user imaging (e.g., takes a picture or video) of the property of interest by selecting the "Take Photo" control 33300, see FIG. 33. The application displays a summary of information 34000 about the home. The home (or building) information displayed to the user includes, for example, home address 34510, home current market estimated rental value or price 34520, whether the home is currently listed for rent 34530, either by the owner or by another listing service such as a multiple listing service or Craig's list, a homeowner's willingness to receive rental offers, etc. Additional property information 34540 can also be presented to the user for review. Optionally, the summary rental information on this screen is configured by the service provider by default to include the basic property highlights and selected additional details. Optionally, the summary rental information on this screen is configured by the user. For example, the default summary view may not display whether pets are allowed in the rental property. In this scenario, the user can configure the application to display information on whether pets are allowed 34544 whenever a property of interest is imaged. Optionally, the MPHI rent application user interface screen includes a "Show Details" soft key/control 34310 which when selected by the user provides additional detail regarding the imaged home. Optionally, the MPHI rent application user interface screen includes a "Make Offer" soft key/control 34330 which when selected by the user enables the user to make an offer, optionally, anonymously to the homeowner. Optionally, the MPHI user interface screen includes an "Options" soft key/control 34320 that when selected displays a list of additional options available to the user.

Figure 35:
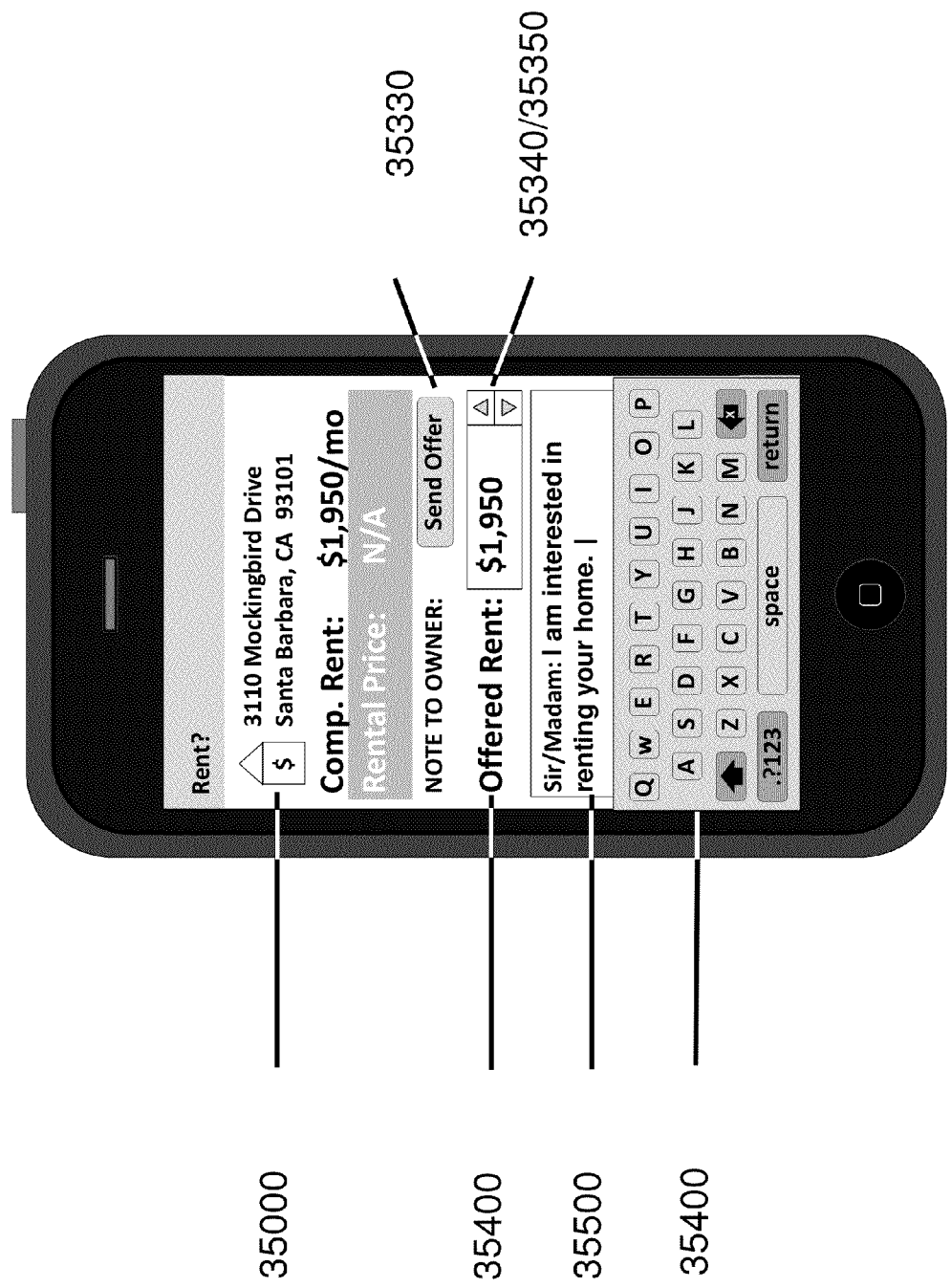
FIG. 35 illustrates an example home rental assistant smartphone MPHI application display detailing a blank form that a user can fill-in to compose a rental offer to be presented to the owner of a selected property.

FIG. 35 illustrates an example mobile device 200 MPHI user interface screen 35000 displayed by software application program 800. This user interface screen is displayed/accessed in response to a user selecting the "Make Offer" soft key/control 34330, see FIG. 34. In this example MPHI rent application user interface, in response to the user selection, the application displays an editable text field 35500. Optionally, the user can type, for example using a soft key pad 35400, a specific or personal note to the owner of the imaged property in the text field 35500 which will be sent to the property owner using electronic or U.S. Postal mail. Optionally, the system populates the text field with standard text typically used in making a rental offer on property. Optionally, the user can configure and/or edit any text which is populated automatically in the text field. Optionally, if the MPHI server is unable to determine a means to contact the owner of if the owner has explicitly requested the non-solicitation of offers, a message is displayed to the user to that effect. Optionally, if no electronic means of communication is available to the system (e.g., the property owner's email address is not know or property owner's phone number is unlisted) the MPHI user interface will optionally prompt the user if they would like the message to be sent via U.S. Postal Service (optionally, for example, with a service charge to the user). Optionally, the MPHI rental application user interface screen includes a rental offer price display 35400 which, in this example, displays by default, the estimated market rental price of the property. If the user selects the up arrow control 35340, the offer price is increased (e.g. in increments of $10, $50, $100, etc.). If the user selects the down arrow control 35350, the offer price is decreased (e.g., in increments of $10, $50, $100, etc.). In this example, the current rental market price (or the price the owner is willing to rent the unit, home, building, etc.) is displayed with a white background. If the user increases the offer price above the current rental market price, the background is shaded green. If the user decreases the offer price below the current rental market price, the background is shaded red. This color coding warns the user re. user modified offers and enables the user to further modify their offer but still return to the current estimated rental market price before submitting their offer. The MPHI user interface screen includes a "Send Offer" soft key/control 35330 which when selected by the user sends the offer communication, optionally including the note from the user, to the property owner.

Figure 36:
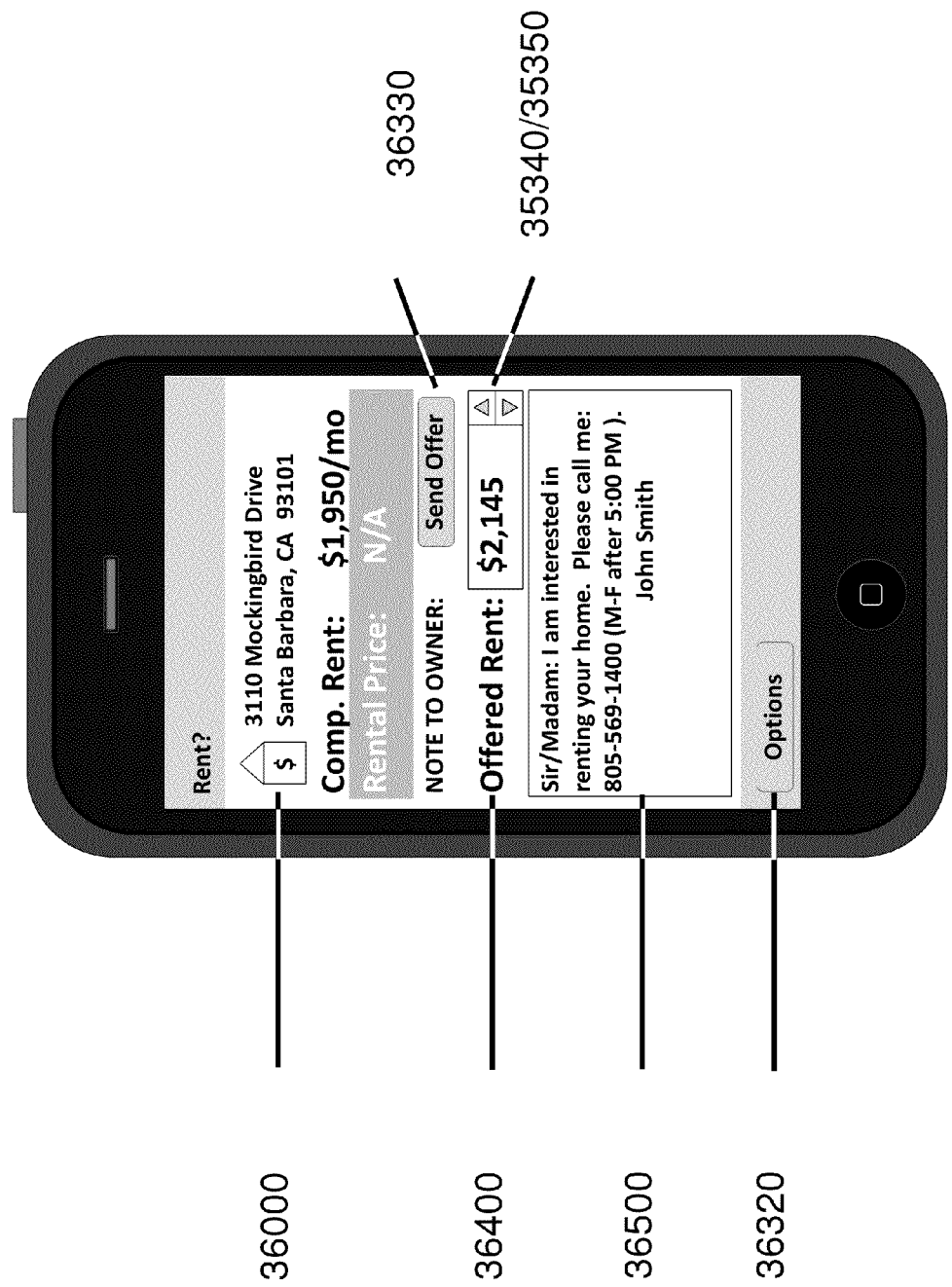
FIG. 36 illustrates an example home rental assistant smartphone MPHI application display detailing a completed form that a user has filled-in to compose a rental offer to be presented to the owner of a selected property.

FIG. 36 illustrates an example mobile device 200 MPHI user interface screen 36000 displayed by software application program 800. This user interface screen is displayed as the user is reviewing/composing a rental request offer for the property owner, see FIG. 35. In this example MPHI rent application user interface, the application displays the system or user composed/edited note 36500 and the offered rental price 36400. In this example, the user is making a rental offer of $2,145 per month, which is a price greater than comparable rental prices. Optionally, the system detects a rental price offer in the text entered by the user and automatically sets the offer adjustment price in the 36400 display/control. In this example, the offered rent price can be adjusted by using the soft keys/controls 35340/35350 (see FIG. 35 description).

Optionally, the MPHI user interface screen includes a "Send Offer" soft key/control 36330 which when selected by the user sends an offer communication, optionally including the note from the user, to the property owner. Optionally, the MPHI user interface screen includes an "Options" soft key/control 36320 that when selected displays a list of additional options available to the user.

Figure 37:
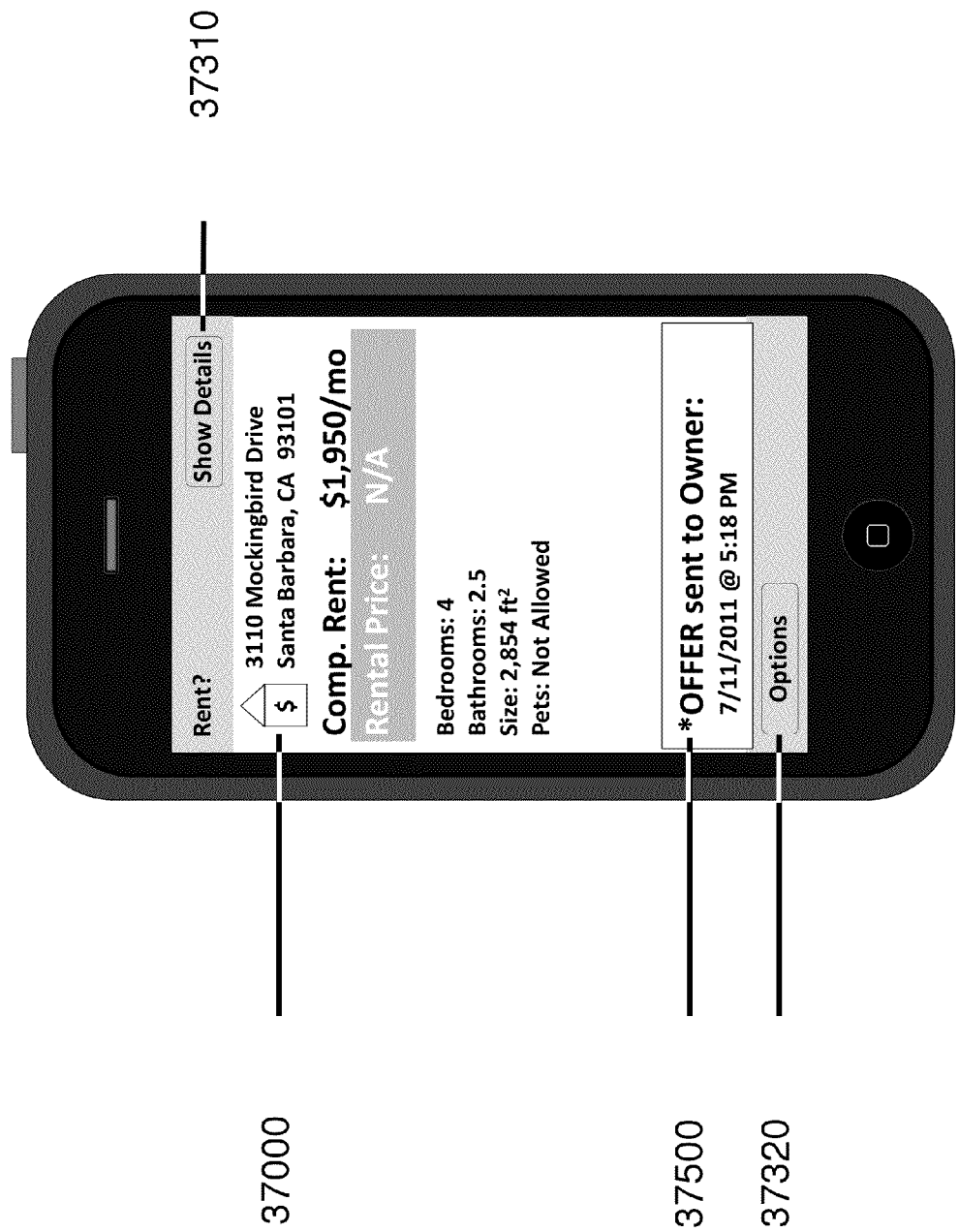
FIG. 37 illustrates an example home rental assistant smartphone MPHI application display depicting summary information about a selected home including a confirmation that a user's rental offer has been sent.

FIG. 37 illustrates an example mobile device 200 MPHI user interface screen 37000 displayed by software application program 800. This user interface screen is displayed/accessed in response to a user selecting the "Send Offer" soft key/control 36330, see FIG. 36. In this example user interface, in response to the user selection, the MPHI rent application returns to the summary display (see for example FIG. 34) and displays a user confirmation message 37500 that the message has been sent to the property owner/landlord. Optionally, the confirmation message includes the date and time the message was sent. Optionally, the MPHI buy application user interface screen includes a "Show Details" soft key/control 37310 which when selected by the user provides additional detail regarding the imaged/listed property. Optionally, the MPHI user interface screen includes an "Options" soft key/control 37320 that when selected displays a list of additional options available to the user, see FIG. 31 description.

Figure 38:
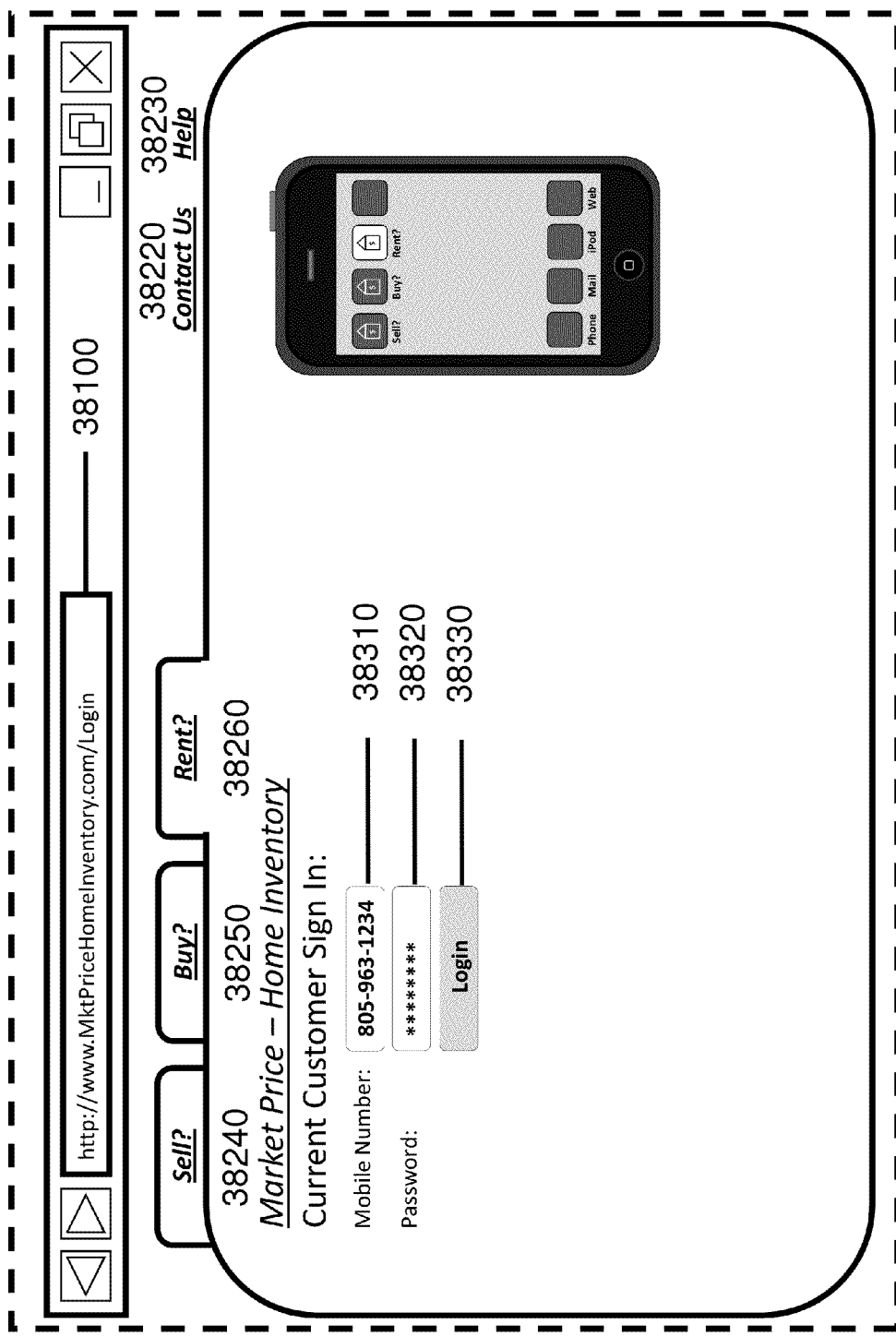
FIG. 38 illustrates an example MPHI web page that allows current customers to login to a web-based service.

FIG. 38 illustrates an example login user interface 38000 presented via a browser (or other interface application) to a user. The browser can be, by way of example executing on a computer terminal 100, such as a personal computer, a Wireless Application Protocol (WAP) or browser-enabled phone 200, a PDA or the like. The login web page can optionally be accessed by supplying the appropriate URL 38100 to the browser, by selecting a link in response to a search query, or the like. The example user login includes a user name/mobile phone number entry field 38310 and a password entry field 38320. When the user clicks on the "Login" control 38330, the entered mobile number and password are transmitted to the web server 600 over the data network 400 for authentication. In this example, a single user login is presented to access all three user interface service tabs including "Sell" 38240 and "Buy" 38250 in addition to "Rent" 38260. Optionally, each tab/service can represent a separate service and require individual logins. In this example, the web page user interface for the MPHI system includes a "Contact Us" web page control 38220 that allows users to provide feedback to the MPHI system service provider, to request assistance on the use of the system, or raise questions regarding the information provided by the system. The web page displayed in response to the control 38220 section is, for example, a listing of contact email addresses, a question form, contact phone numbers, etc. In this example, the web page user interface for the MPHI system also includes a "Help" web page control 38230 that when selected provides help information regarding the use of the system and or information provided by the system. Optionally, in response to the user selection of the "Help" control 38230 the system responds by displaying a collection of help web pages.

Figure 39:
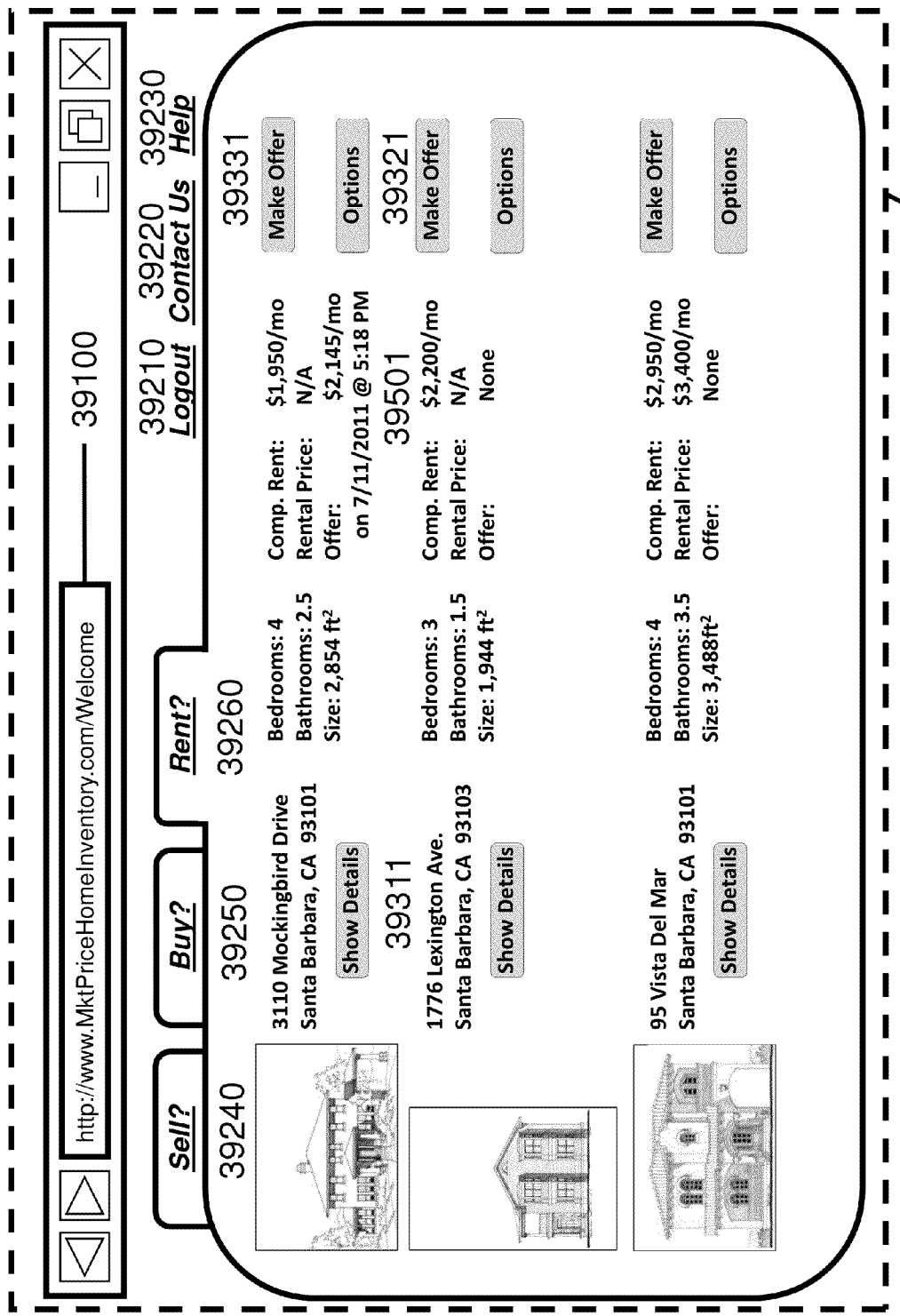

FIG. 39 illustrates an example MPHI system user interface 39000 presented via a browser (or other interface application) to a user who has successfully logged into the system. The browser can be, by way of example, executing on a computer terminal 100, such as a PC, a Wireless Application Protocol (WAP) or browser-enabled phone 200, a PDA, tablet computer, smartphone, or the like. The web page can optionally be accessed by selecting a control on a widget/gadget application program, by supplying the appropriate Uniform Resource Locator (URL) to the browser 39100, by selecting a link in response to a search query, or the like (the latter two access methods optionally may require the user to first login by submitting a user id and/or password). The example user interface provides a top-level or home page display of the different features and services the MPHI system can provide including, for example, an MPHI "Sell" web interface 39240 which provides home sellers with market price information and tools to facilitate home sales; an MPHI "Buy" web interface 39250 which provides home buyers with market price information on various homes and tools to facilitate home purchases; an MPHI "Rent" web interface 39260 which provides renters and/or landlords with rental market price information and tools to facilitate home rental. Optionally, the web page user interface for the MPHI system includes a "Logout" control 39210 which when selected by the user logs the user out of the web session (in this example, precluding user access to the user's profile and features of the web site) and displays a logout web page message (not shown). In this example, the web page user interface for the MPHI system includes a "Contact Us" web page control 39220 that allows users to provide feedback to the MPHI system service provider, to request assistance on the use of the system, or raise questions regarding the information provided by the system. The web page displayed in response to the user control 39220 selection is, for example, a listing of contact email addresses, a question form, contact phone numbers, etc. In this example, the web page user interface for the MPHI system also includes a "Help" web page control 39230 that when selected provides help information regarding the use of the system and or information provided by the system. Optionally, in response to the user selection of the "Help" control 39320, the system responds by displaying a collection of help web pages. Optionally, the MPHI system service provider configures a default web page which is displayed after the user login. In this third example shown in FIG. 39, the default web page/tab is configured to display the "Rent" display of rental property listings. Optionally, the user can select the "Sell" tab 39240 to access the features and/or information associated with the MPHI system home selling services. Optionally, the user can select the "Buy" tab 39250 to access the features and/or information associated with the MPHI system home buying services. In this example, the MPHI Rent system displays one or more properties the user is interested in or that were specifically selected by the user. Optionally, the service provider selects a collection of information to display about each property. Optionally, the user configures, for example in a user profile, how much and what information is to be displayed in the summary of the rental listings. Optionally, the MPHI web page user interface includes a "Show Details" control 39311 for each rental listing. Optionally, selecting the "Show Details" control displays a complete listing of all the information publically or privately available regarding the rental listing including for example: one or more photographs or videos of the external property and internal property (e.g., individual rooms); property address; name of property owner/landlord; property owner/landlord contact information if available; number of bedrooms; number of bathrooms; market rental price; rental status (e.g., available or unavailable); number of current outstanding rental offers; maximum rental price offer; all rental price offers; minimum rental price offer; whether pets are allowed including type and how many of each; lease terms, rental history including for example previous tenant history; security deposit requirements; security deposit return history; utility responsibilities; utilities averages; utilities peak; utilities low; average ages of residents in multi-tentant properties, number of children in multi-tentant properties, etc.; lease-to-buy options; school district; etc. Optionally, the MPHI web page user interface includes a "Make Offer" control 39331 for each rental listing. When selected, the "Make Offer" user control facilitates the communication of an offer including rental price to the property owner/landlord. The process (not shown) is similar to that described above in FIGS. 35-36 but rendered in web pages in this alternative scenario. Optionally, the MPHI web page user interface includes an "Options" control 39321 for each rental listing. In this example, the options control when selected displays a listing of options the user can request with respect to the associated rental listing (as described in additional detail in FIG. 40).

Figure 40:
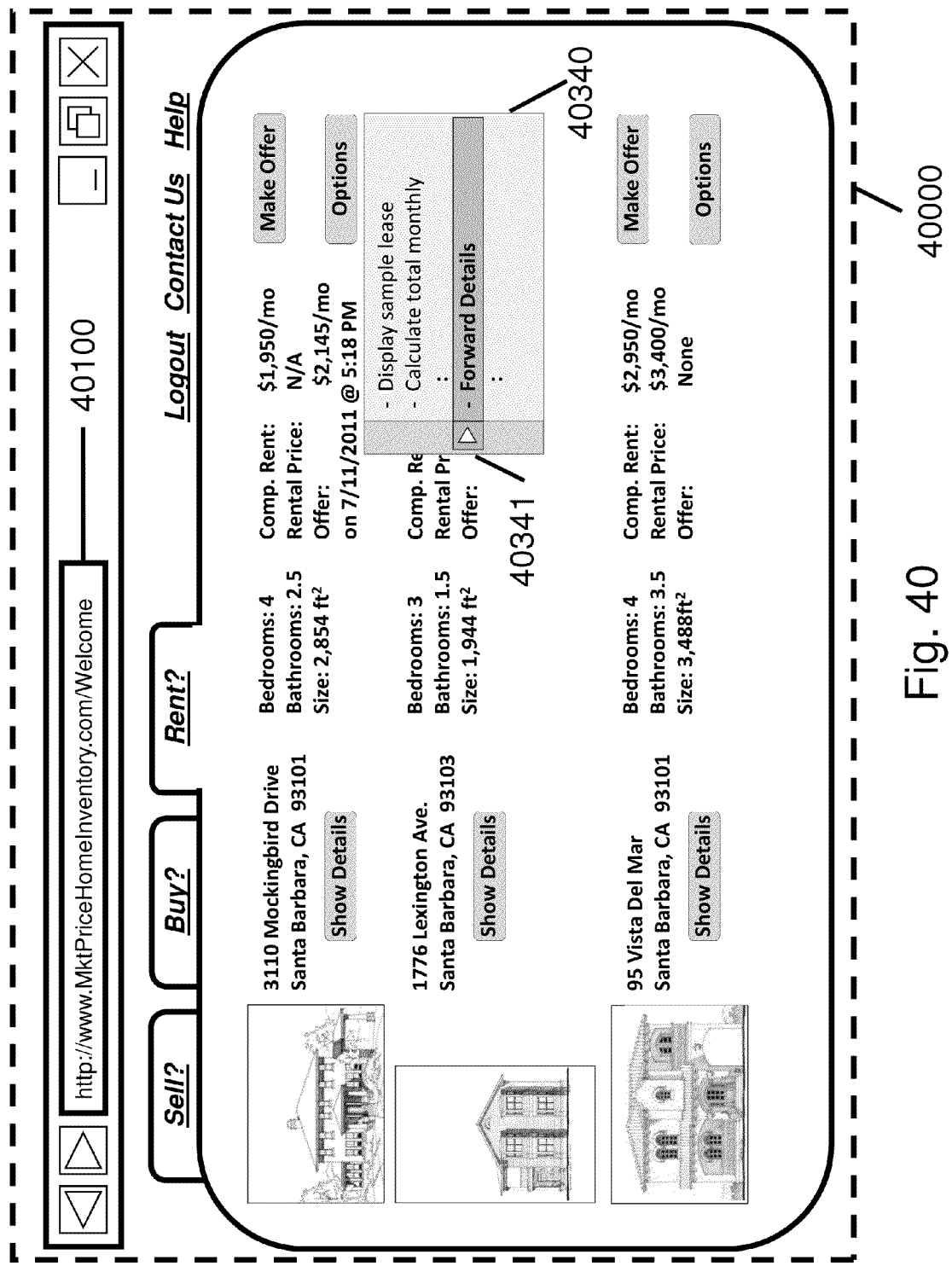
FIG. 40 shows an example home rental assistant MPHI web page which lists a menu of user option choices.

FIG. 40 illustrates an example MPHI system user interface 40000 presented via a browser (or other interface application) to a user who has selected the "Options" control 39321, see FIG. 39. In response to the user selecting the "Options" control 39321, the MPHI system displays a menu of selection controls 40340 which in this example enable the user to perform certain tasks relating to the property of interest. In this example, the user has selected the "Forward Details" control 40341.

Figure 41:
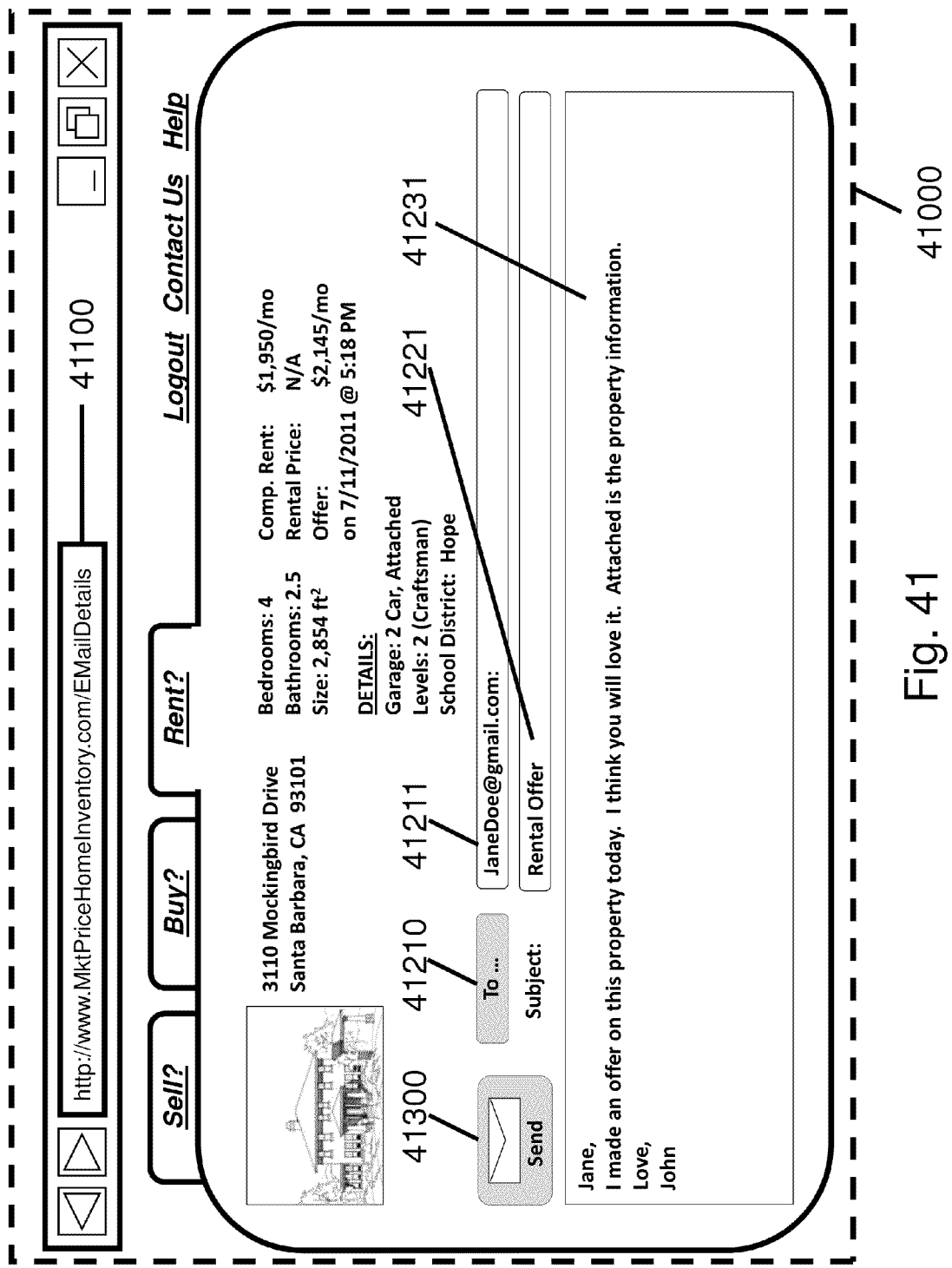
FIG. 41 illustrates an example home rental assistant MPHI web page detailing a completed form that a user has filled-in to compose an EMail message to be forwarded to a user specified EMail address along with attachments that highlight rental details about a selected property.

FIG. 41 illustrates an example MPHI system user interface 41000 presented via a browser (or other interface application) to a user who has selected the "Forward Details" Options sub-menu control 40341, see FIG. 40. The web page can optionally be accessed by selecting a control on a widget/gadget application program, by supplying the appropriate Uniform Resource Locator (URL) to the browser 41100, by selecting a link in response to a search query, or the like (the latter two access methods optionally may require the user to first login by submitting a user id and/or password). In response to the user selecting the "Forward Details" control 40341, the MPHI system displays a collection of controls which enable the user to forward the detailed property information to one or more email addresses. Optionally, the user can select to whom the information is to be sent by selecting the "To" control 41210. In this example user interface, selecting the "To" control will display a list of contacts (not shown) or previous email recipients. Optionally, the user can type, into a form field 41211, one or more email addresses. In this example, the user can type, into a subject form field 41221, a subject line for the message which will be included along with the rental property information in the email. Optionally, the user can compose, into a third form field 41231, a message which will be included along with the rental property information in the email. Optionally, the user selects the "Send" control 41300 when the user has completed addressing and composing an email message to be sent along with the property information. Optionally, the system displays a message sent confirmation (not shown) and transitions the user back to a rental property listing display, for example see FIG. 39.

Figure 42:
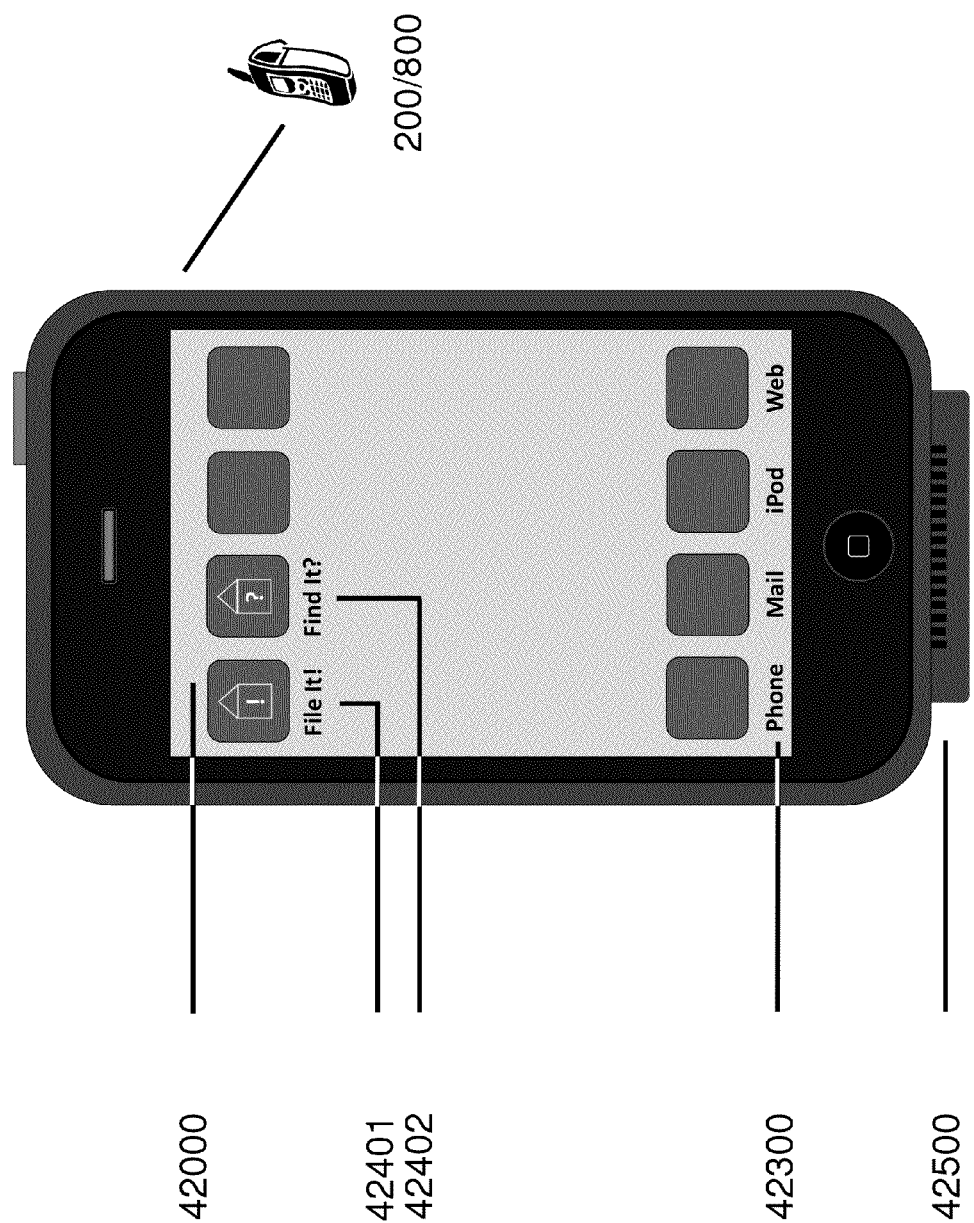
FIG. 42 illustrates an example smartphone User Interface with Home Inventory (HI) application icons.

FIG. 42 illustrates an example mobile device display 42000. In this example, the mobile device displays user downloaded software applications 42401 and 42402 and pre-installed or fixed applications 42300. The list of applications in the figure includes the Mobile Phone Home Inventory (MPHI) applications for adding items to the Home Inventory (File It! 42401) and searching the Home Inventory to locate items (Find It? 42402). The mobile device 200 illustrated includes a touch sensitive screen 24100 which enables a user to open, close, and navigate applications/services 800 with a touch or stroke of a finger, see FIG. 24. The mobile device in FIG. 42 also includes a "HOME" button/control 24200 which when selected by the user exits any open mobile device application, see FIG. 24. The mobile device in FIG. 42 has a plug-in RFID reader secure digital (SD) card 42500. Optionally, the RFID reader can be built into the phone without the need of a separate plug-in device.

Figure 43:
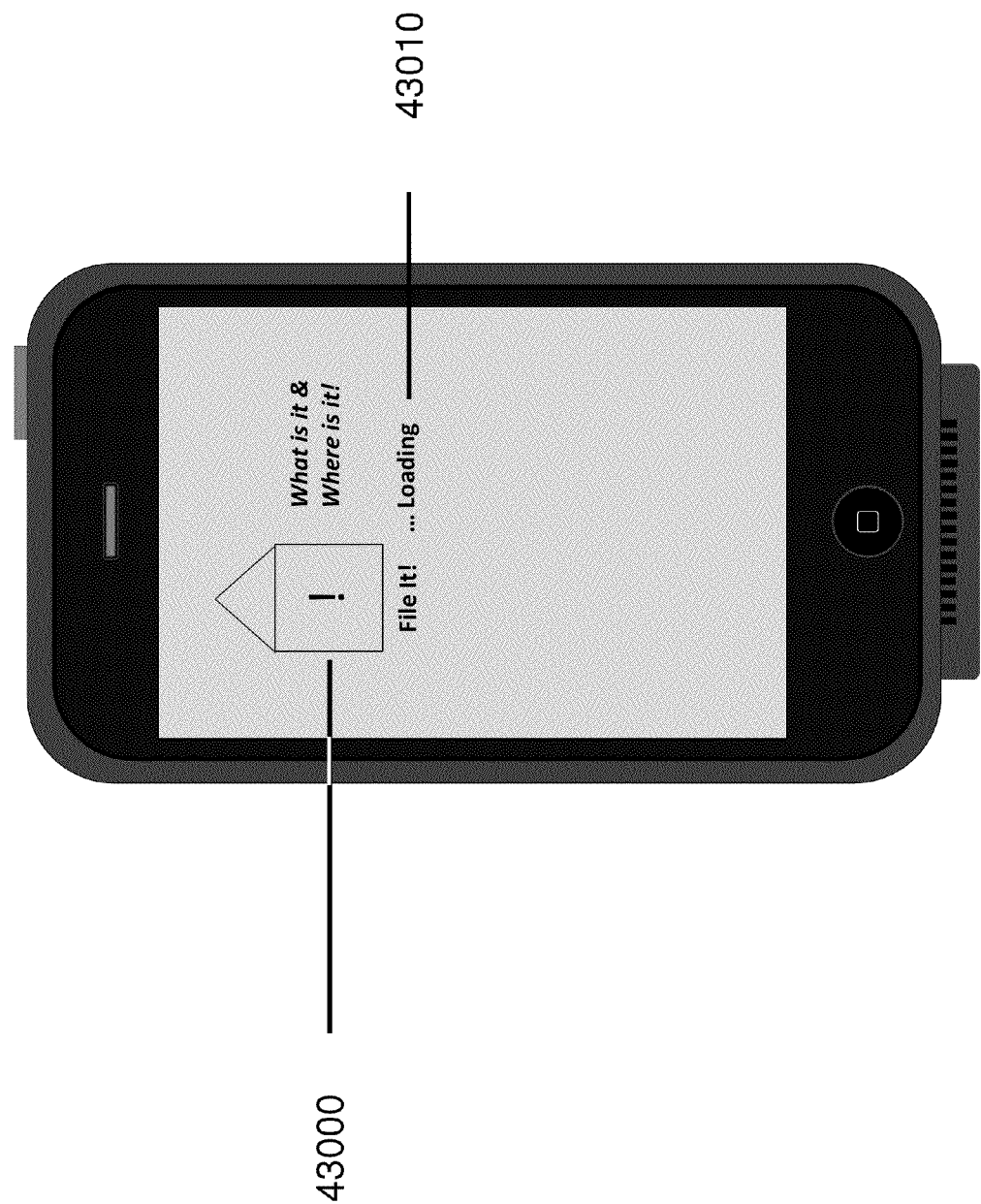
FIG. 43 illustrates an example smartphone HI application startup/welcome display for a service to help users create and manage an inventory of their household items.

FIG. 43 illustrates an example mobile device 200 and application presentation following a user selection of the MPHI File It! application icon 42401, see FIG. 42. The MPHI application user interface screen 43000 displays a welcome message and/or loading application transition message 43010.

Figure 44:
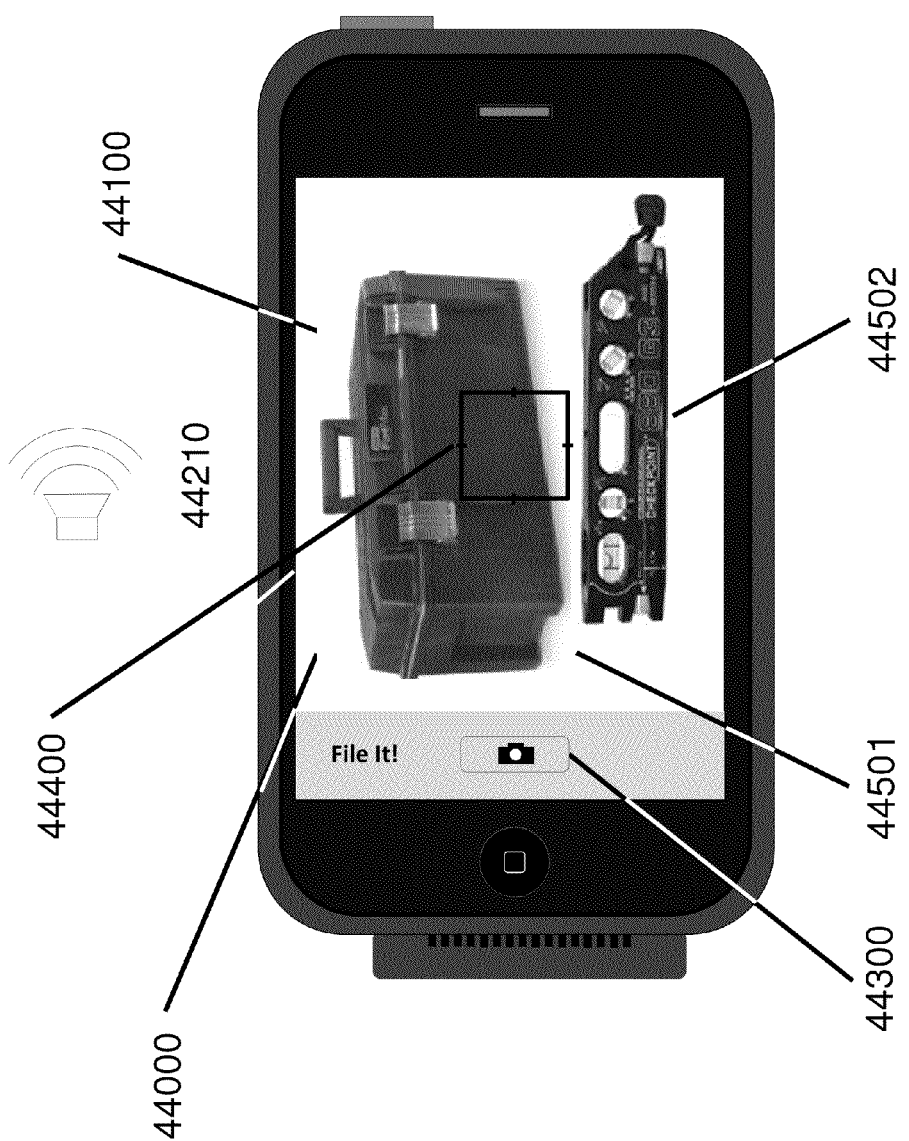
FIG. 44 illustrates an example smartphone HI application display in item filing image capture mode.

FIG. 44 illustrates an example mobile device 200 MPHI user interface screen 44000 displayed by software application program 800. In this example, this screen is displayed/accessed in response to a user selecting the HI File It! application 42401, see FIG. 42. In this example user interface screen, the application is indicating to the user that the mobile device is in picture taking mode. The mobile device displays on the user interface screen the view through the camera lens 44100 of the image that would be captured if the user were to select the "Take Photo" soft key/control 44300. In this example, the MPHI software application program 800 audibly prompts 44210 the user to select the "Take Photo" key and/or provide any additional user guidance. Optionally, the application supports a picture focus assist feature 44400. This feature helps the user adjust the camera's focal point by centering or highlighting the camera image on the most likely item of interest for the user. For example, picture assist, automatic zoom technology is generally available and used in most digital cameras on the market today to locate individual faces. In this example, the picture focus assist technology attempts to identify a key item since the MPHI is assisting the user in inventorying, cataloging, and/or storing information about their personal items. In FIG. 44, the user is inventorying a laser level 44502 which will be stored in a tool box 44501.

Figure 45:
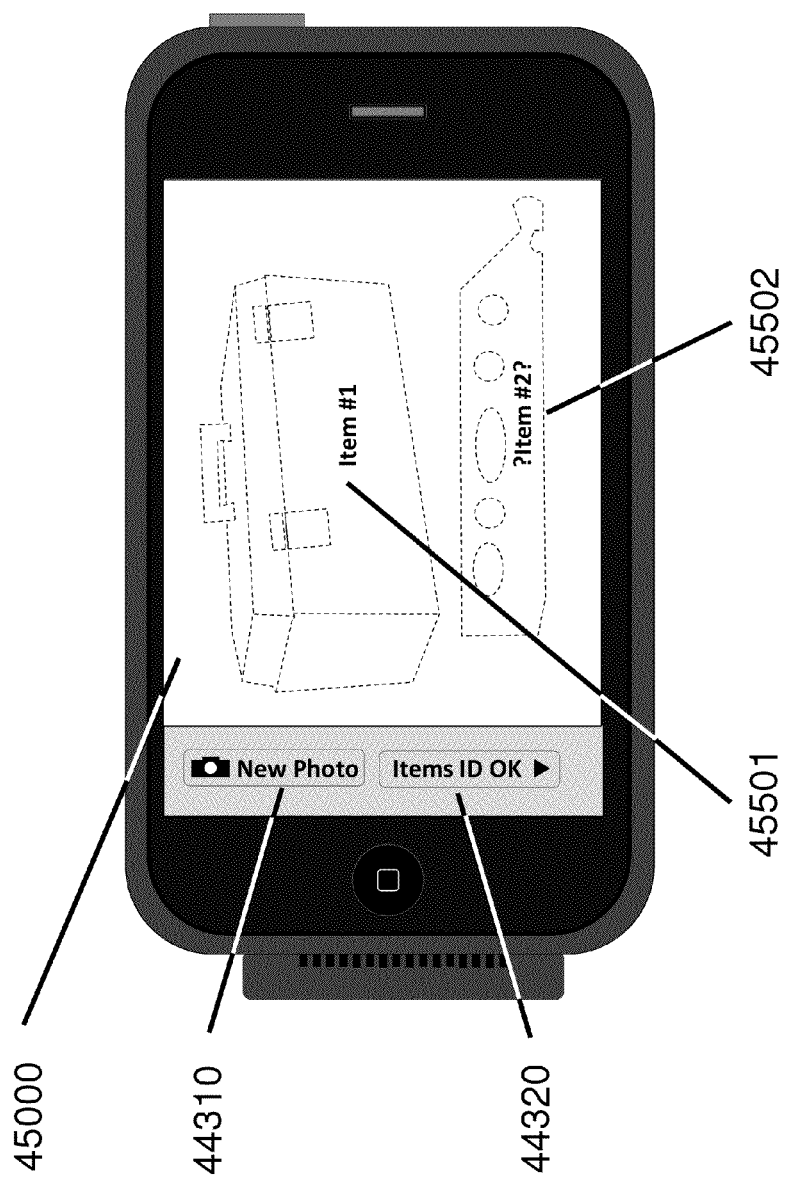
FIG. 45 illustrates an example smartphone HI application display of items to be filed which require user review and approval to facilitate item identification.

FIG. 45 illustrates an example mobile device 200 MPHI user interface screen 45000 displayed by software application program 800. In this example, this screen is displayed/accessed in response to a user selecting the "Take Photo" soft key/control 44300, see FIG. 44. In this example, the MPHI system has identified two items in the picture, Item #1 45501 and Item #2 45502. In this example, the picture was transferred over a phone network 500 with data networking capabilities to a Digital Signal Processing server 700 configured as a recognition server. The recognition server applies a combination of image processing, item recognition, and pattern matching techniques to determine the likely identity of the items. Optionally, based on the uncertainty of the item recognition, an error message is displayed to the user. In this example, the user interface displays one or more question marks next to the item identifiers (45501 and 45502) when the recognition results are marginal (e.g., a range of no question marks to ???, with ??? being highly uncertain of what the item is). Optionally, the signature returned by the RFID tag enables the item to be specifically identified. Alternatively, a combination of RFID tag signatures and pattern recognition are used together (e.g., the signature returned by the RFID tag reduces the number of possible items to be recognized in the image). In this example, the user interface includes a "New Photo" soft key/control 44310 which, when selected by the user, transitions the application display back into picture taking mode in order for the user to recapture an improved image; see FIG. 44 for an example of the user interface state the application would transition to after selecting 44310. In this example, the user interface includes an "Item ID OK" soft key/control 45320 which when selected advances the image processing to permit categorization of the detected items.

Figure 46:
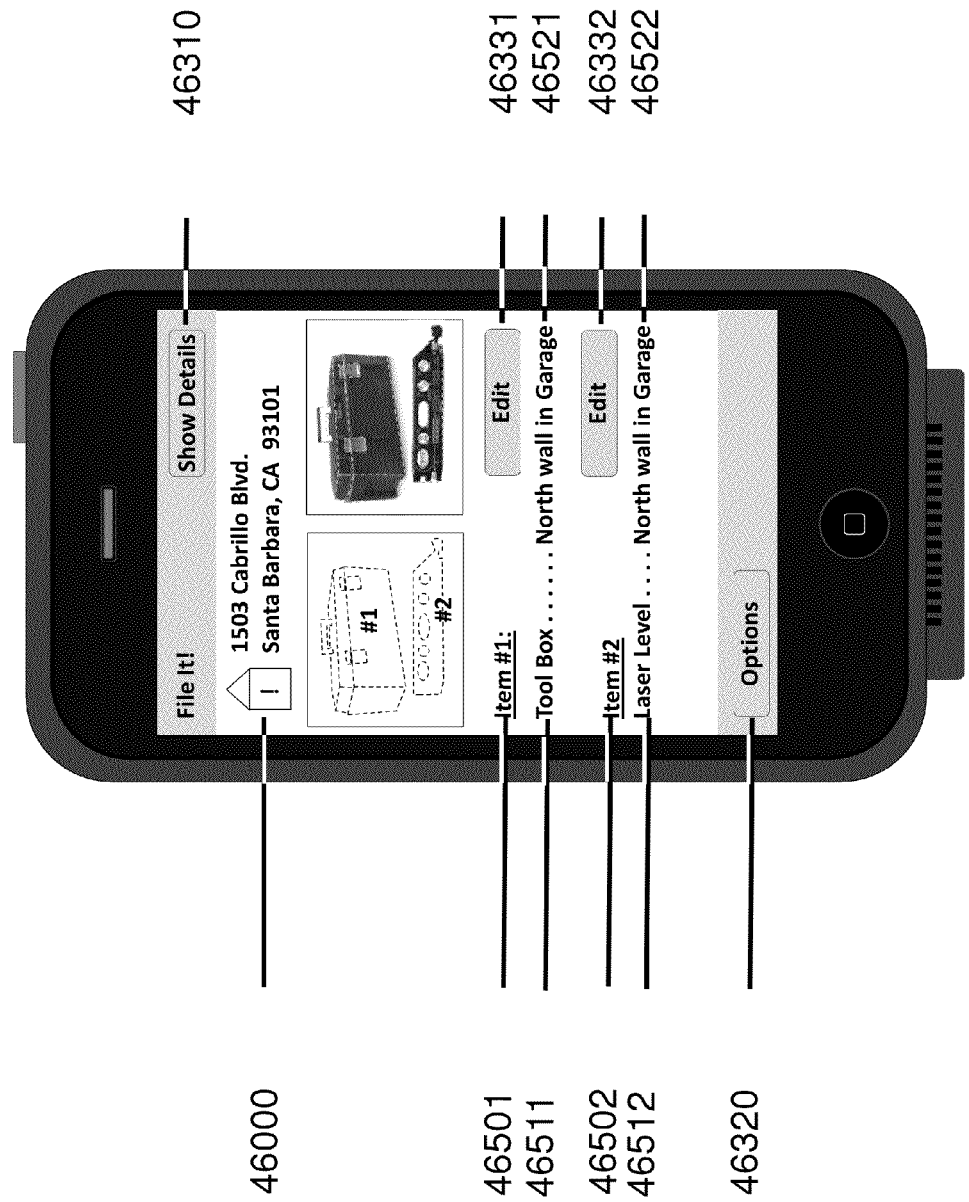
FIG. 46 illustrates an example smartphone HI application display of summary information about items that have just been filed.

FIG. 46 illustrates an example mobile device 200 MPHI user interface screen 46000 displayed by software application program 800. In this example, this screen is displayed/accessed in response to a user selecting the "Item ID OK" control 45320, see FIG. 45. In this example, summaries of the items identified in the image (Item #1 Summary 46501 and Item #2 Summary 46502) along with their location and item type categorization are displayed in the user interface screen 46000. The item location information is determined by the MPHI application querying the smartphone location coordinates at the time the image was taken. In this example, the MPHI application also queries the smartphone internal compass to determine the direction the camera lens was pointing at the time the image of the items was taken. These queries, together with access to one or more internal and/or external databases, help to infer the room and wall location of the items at the time the image was taken. This location information (Item #1 Location 46521 and Item #2 Location 46522) is included in the summary display along with the name/type label of the items (Item #1 Name 46511 and Item #2 Name 46512). In this example, information generated and/or associated with each identified item in the image can be edited by selecting the corresponding edit controls 46331 and 46332, see FIG. 47. In this example, an "Options" soft key/control 46320 is displayed which, when selected by the user, displays other options available to the user of the MPHI File It! application. Optionally, the MPHI File It! application user interface screen includes a "Show Details" soft key/control 46310 which when selected by the user provides additional detail regarding the items (see also FIG. 47, for example, of the type of additional information for each item).

Figure 47:
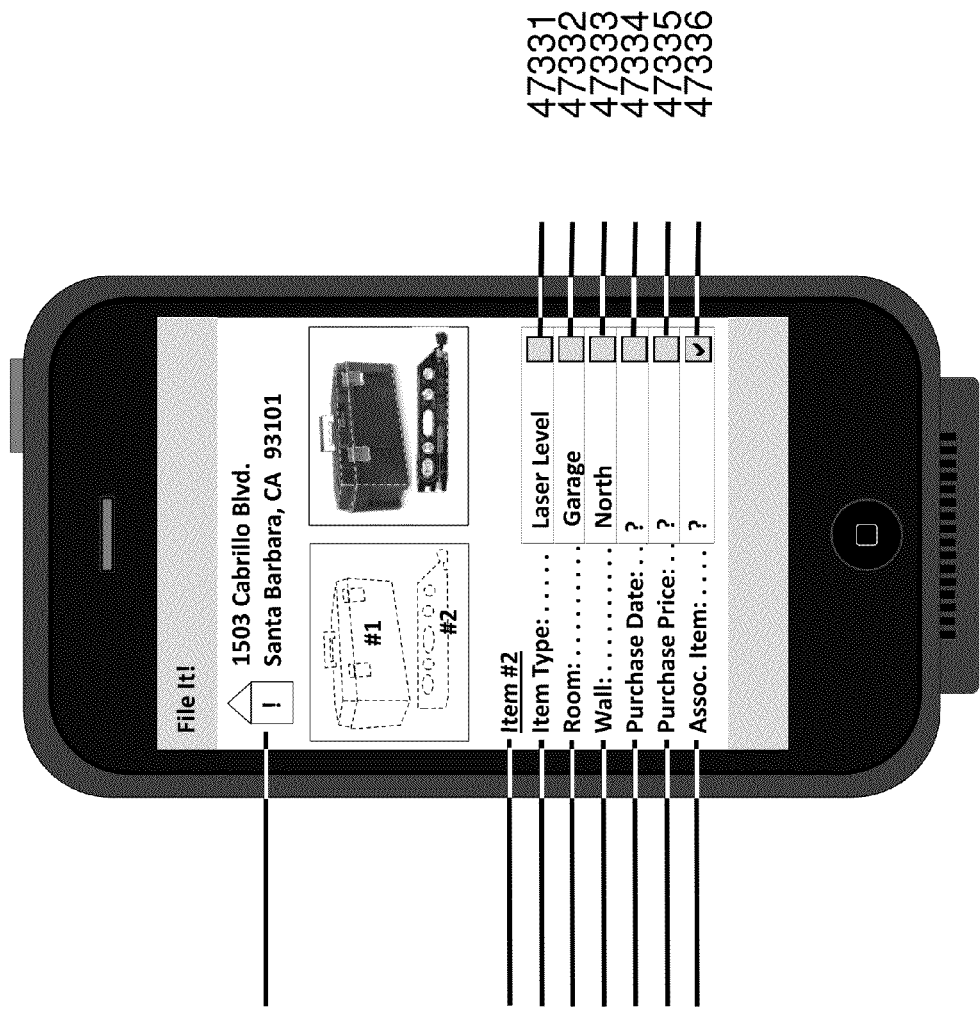
FIG. 47 illustrates an example smartphone HI application display depicting a menu of user editable fields for a user selected specific filed item.

FIG. 47 illustrates an example mobile device 200 MPHI user interface screen 47000 displayed by software application program 800. In this example, this screen is displayed/accessed in response to a user selecting the "Edit" control 46332, see FIG. 46. In this example, detailed information associated with the laser level (Item #2) is displayed including: the item number 47530 (to distinguish multiple items in an image); the item name 47531 as determined by the MPHI system and/or the user editing this field; the room 47532 the item is located in; the wall 47533 the item is located nearest; the purchase date 47534 if known (optionally this is determined from the signature returned from the RFID tag if, for example, the RFID tag was applied by the retail merchant at purchase); the purchase price 473535 if known (optionally this is determined from the signature returned from the RFID tag if, for example, the RFID tag was applied at the retail merchant at purchase); and an associated linkage 47536 between this item and another inventoried item. In this example, linking the laser level to the toolbox in which it is stored aids in maintaining up to date status of the location of several items which may be frequently moved from room to room (and some or all of which may not be equipped with individual RFID tags). Optionally additional information about the item is determined from the signature returned from the RFID tag and/or access to one or more external databases by the MPHI application or MPHI system back-end servers. In this example, each field includes an "Edit" soft key/control (47331-47336) which, when selected, enables a user to override, edit, or replace the text in the field, see FIG. 48.

Figure 48:
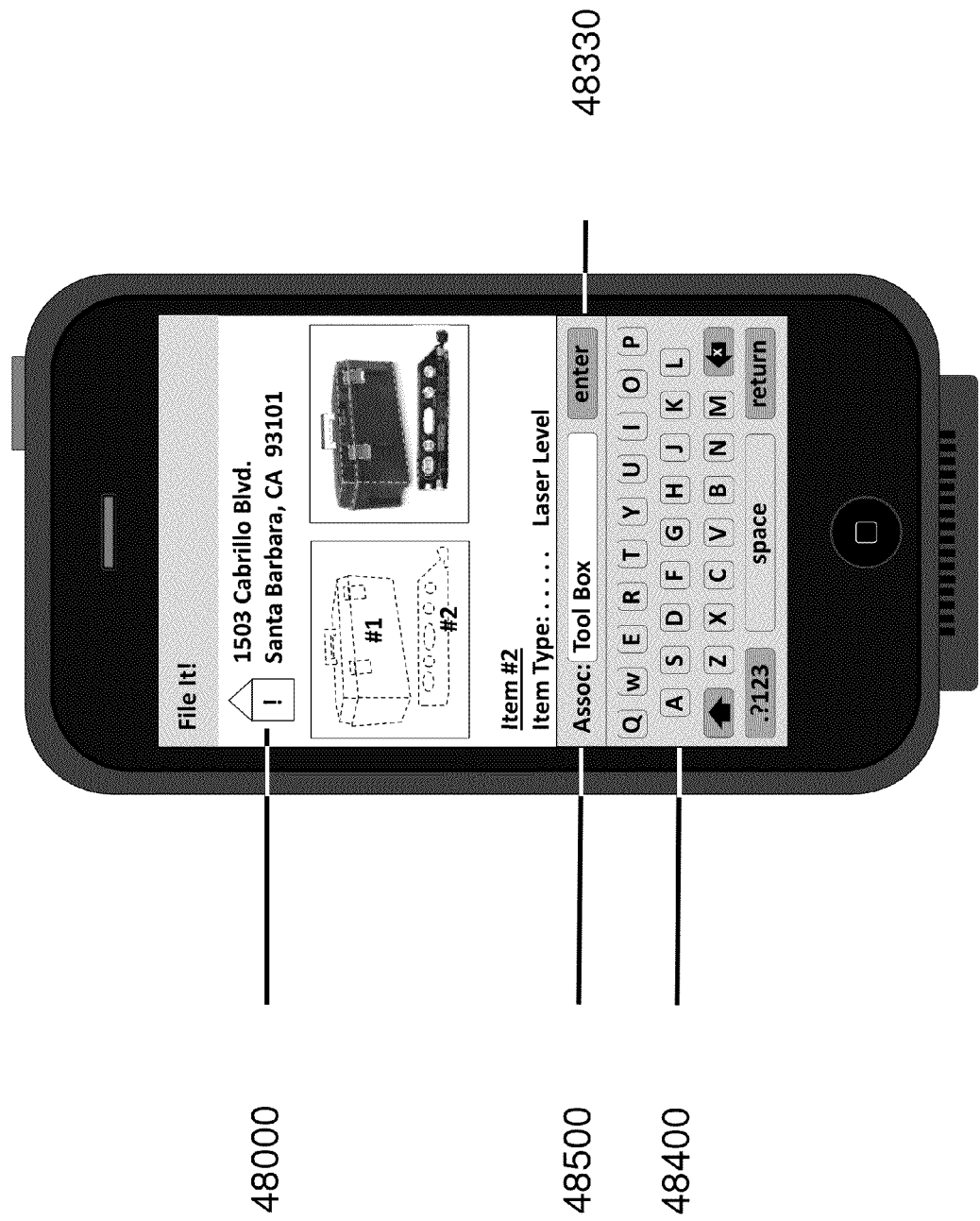
FIG. 48 illustrates an example smartphone HI application display showing a filled-in edit form for one of the data fields of a user selected specific filed item.

FIG. 48 illustrates an example mobile device 200 MPHI user interface screen 48000 displayed by software application program 800. In this example, this screen is displayed/accessed in response to a user selecting the "Edit" item field control 47336, to create or modify an association between two items, see FIG. 47. In this example, the MPHI user interface also displays a small soft keyboard 48400 which the user can use to fill-in the Name 48500 of the second item to link this item to. After the user identifies the associated linked item name, the user can select the "Enter" soft key/control 48330 to record the linkage fields in the data store 700 in association with items #1 and item #2 in further association with the user account. Further, after selecting the "Enter" soft key/control 48330 (e.g., after completing the edit process), the user interface transitions back to the summary display state as illustrated by FIG. 49 with the updated information included in the summary display, in this example.

Figure 49:
FIG. 49 illustrates an example smartphone HI application display of summary information about items that have recently been filed. The display includes a user modified information field.

FIG. 49 illustrates an example mobile device 200 MPHI user interface screen 49000 displayed by software application program 800. In this example, this screen is displayed/accessed in response to a user selecting the "Enter" control 48330 (see FIG. 48) after specifying an association linking this item to a second item, The user interface displays is returned to the summary presentation of the items in the image as previously described in detail in FIG. 46. In addition, the summary display now also includes a note describing the linkage to the second item 49500 entered by the user.

Figure 50:
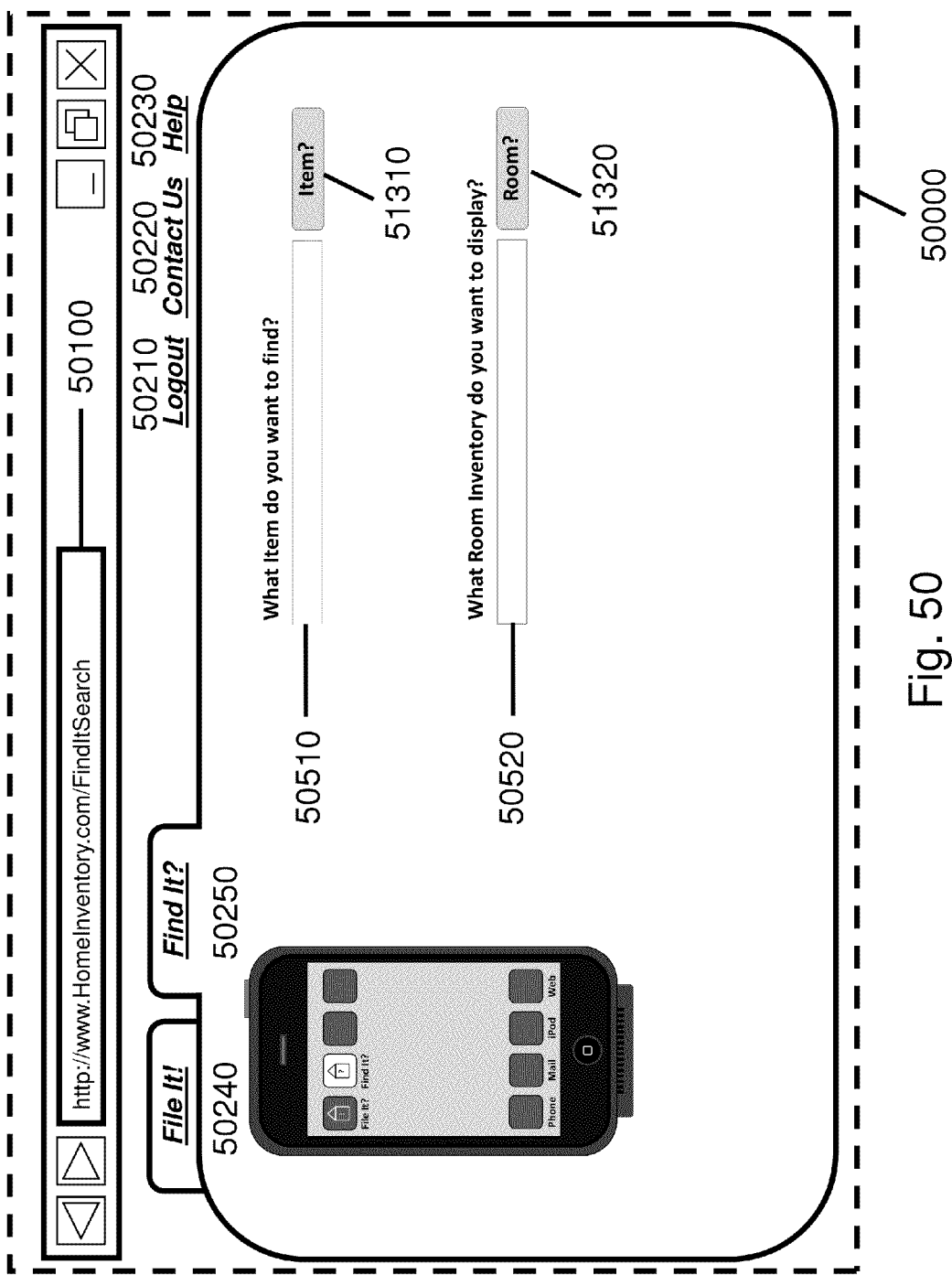
FIG. 50 illustrates an example HI web page providing a user interface that allows a user to search through their inventory.

FIG. 50 illustrates an example MPHI system user interface 50000 presented via a browser (or other interface application) to a user who has successfully logged into the HI system. The browser can be, by way of example, executing on a computer terminal 100, such as a PC, a Wireless Application Protocol (WAP) or browser-enabled phone 200, a PDA, tablet computer, smartphone, or the like. The web page can optionally be accessed by selecting a control on a widget/gadget application program, by supplying the appropriate Uniform Resource Locator (URL) to the browser 50100, by selecting a link in response to a search query, or the like (the latter two access methods optionally may require the user to first login by submitting a user id and/or password). The example user interface provides a top-level or home page display of the different features and services the HI system can provide including, for example, an "File It" HI web interface 50240 tab which provides a user interface by which users can view and edit inventory information for items they have previously filed using the HI system; a "Find It" HI web interface 50250 which provides a user interface by which users can search for filed items and/or display the items in a specific room. Optionally, the web page user interface for the MPHI system includes a "Logout" control 50210 which, when selected by the user, logs the user out of the web session (in this example, precluding user access to the user's profile and features of the web site) and displays a logout web page message (not shown). In this example, the web page user interface for the MPHI system includes a "Contact Us" web page control 50220 that allows users to provide feedback to the MPHI system service provider, to request assistance on the use of the system, or raise questions regarding the information provided by the system. The web page displayed in response to the control 50220 section is, for example, a listing of contact email addresses, a question form, contact phone numbers, etc. In this example, the web page user interface for the MPHI system includes a "Help" web page control 50230 that when selected provides help information regarding the use of the system and or information provided by the system. Optionally, in response to the user selection of the "Help control" 50320, the system responds by displaying a collection of help web pages. Optionally, the MPHI system service provider configures a default web page which is displayed after the user login. In FIG. 50, the default web page/tab is configured to display the "Find It" tab and, in this fourth example, Home Inventory item and room search controls. Optionally, the user can select the "File It" tab 50240 to access the filing services of the Home Inventory system. Similarly, the user can then select the "Find It" tab 50250 to return access to the features and/or information associated with the HI system item locating service. In this example, the HI Find It application displays two item search term data fields 50510 and 50520. In this example, the "What item do you want to find?" data field

50510 enables a user to enter the name of an item they would like to search for across the inventory of items stored by the HI system. After entering the name of the item and/or other distinguishing characteristic of the item, the user selects the corresponding "Item" search control 50310. In this example, the HI system responds to the request by providing a summary of the item information and the item's location. In this example, the "What room inventory do you want to display?" data field 50320 enables a user to display the item contents of a particular room. After entering the name of the room and/or other distinguishing characteristic of the room, the user selects the "Room" search control 50320. Optionally, the HI system responds to the request by providing a list of the items inventoried in the room selected by the user.

Figure 51:
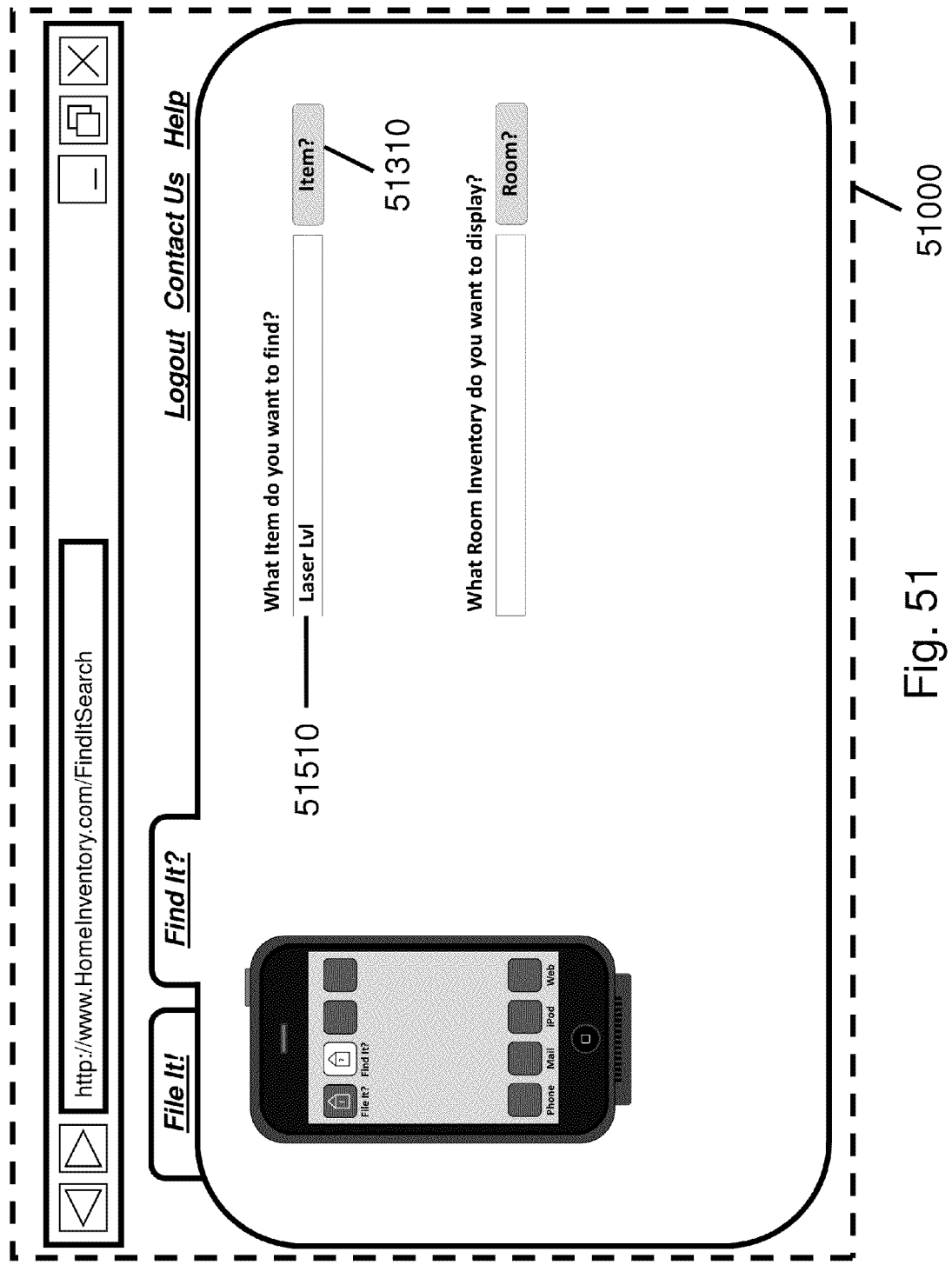
FIG. 51 illustrates an example HI web page providing a user interface where a user has completed an inventory search request looking for information filed for a specific item.

FIG. 51 illustrates an example Find It HI system user interface 51000 presented via a browser (or other interface application) to a user who has composed text in the item search term data field 51510 and then pressed the "Item" search soft key 51310.

Figure 52:
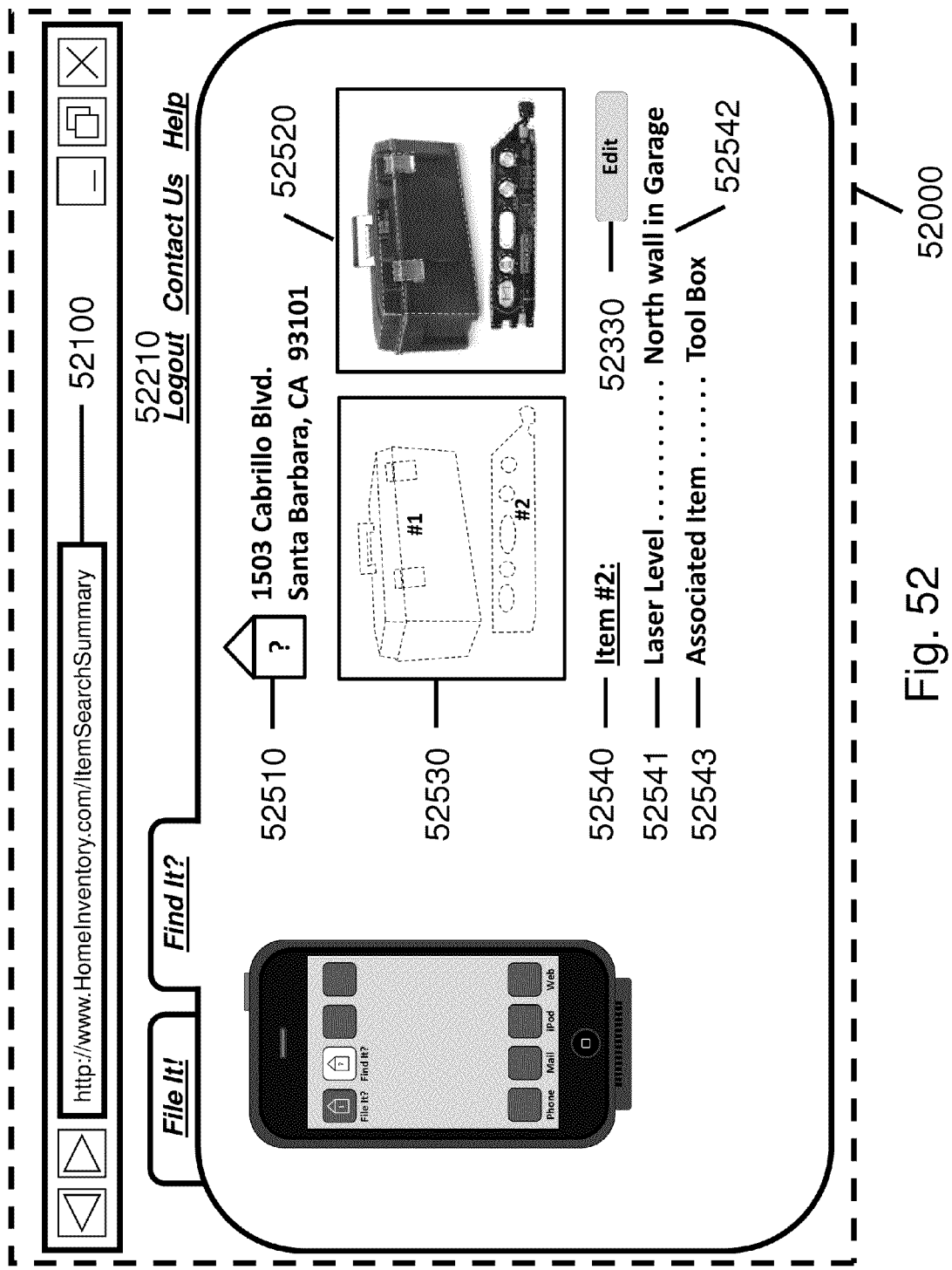
FIG. 52 illustrates an example HI web page summarizing search results of filed information for a user specified item.

FIG. 52 illustrates an example Find It HI system user interface 52000 presented via a browser (or other interface application) to a user who has selected the "Item?" control 51310, see FIG. 51, after entering the text "Laser Lv1" into the search term data field 51510. The web page can optionally be accessed by selecting a control on a widget/gadget application program. In this example, the Find It HI system displays: the address 52510 of the user's home, the image 52520 of the item taken by the user (or by an associate or other 3rd party if someone was requested or paid to inventory the contents of a user's home); a line drawing rendition of the image 52530 which outlines identified items within the picture; an HI system numbering 52540 of the item referenced in the rendition drawing; the name 52541 of the item (either as recognized by the system using pattern recognition, determined from the RFID signature and/or user edits); the item's location 52542; and linked items 52543 to assist in updating item location information. The user interface display 52000 of the search results also includes an "Edit" user control 52330 which can be selected by the user to edit the information displayed or other detailed information associated with the item but not shown in the display (e.g., price, merchant purchased from, etc.).

Figure 53:
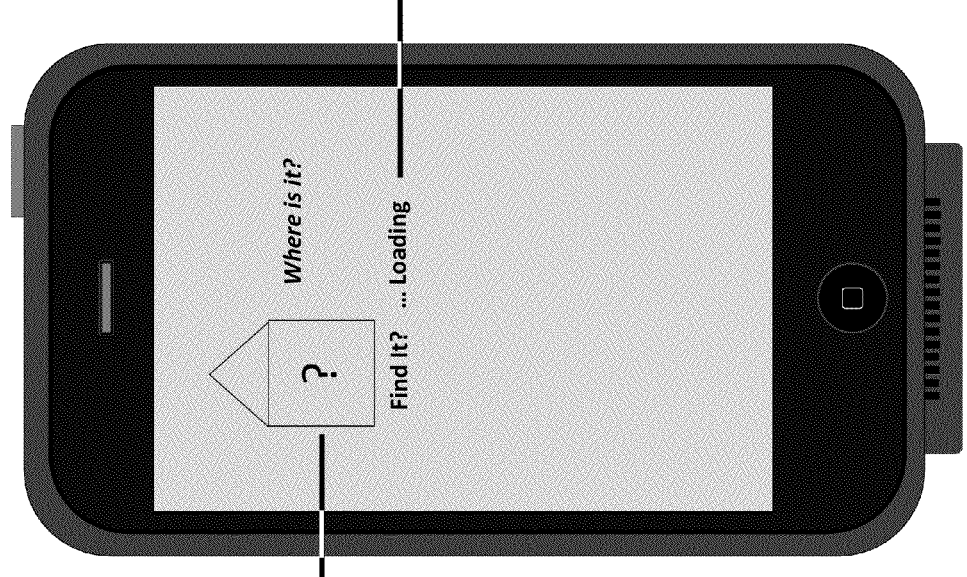
FIG. 53 illustrates an example smartphone HI application startup/welcome display for a service to help users search through their home inventory and to physically locate specific items.

FIG. 53 illustrates an example mobile device 200 and application presentation following a user selection of the MPHI Find It application icon 42402, see FIG. 42. The MPHI application user interface screen 53000 displays a welcome message and/or loading application transition message 53010.

Figure 54:
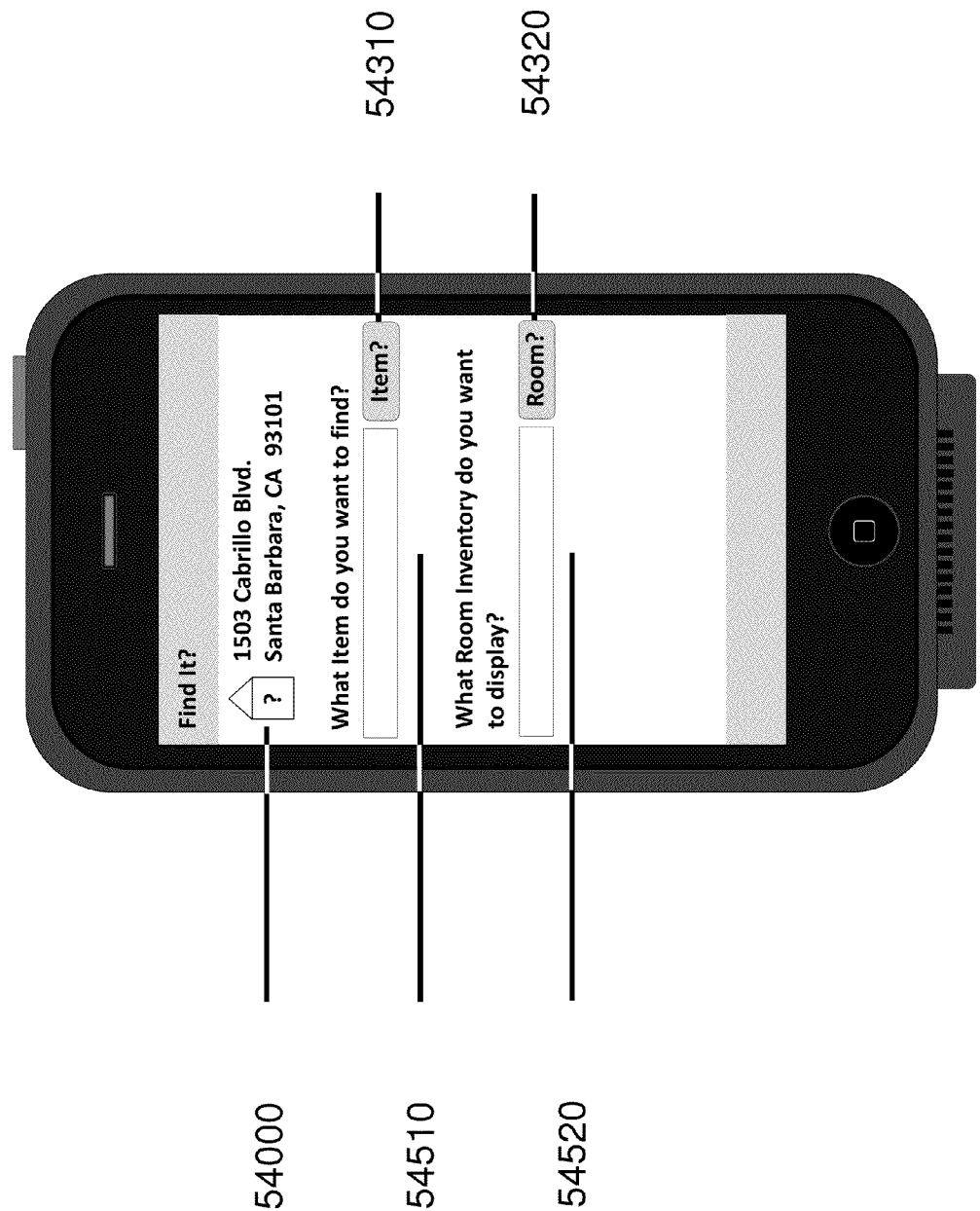
FIG. 54 illustrates an example smartphone HI application display providing a user interface that allows a user to search through their inventory.

FIG. 54 illustrates an example mobile device 200 HI user interface screen 54000 displayed by software application program 800. In this example, this screen is displayed/accessed in response to a user launching the HI Find It application 42402, see FIG. 42. In this example user interface screen, the application is prompting the user to type in to the item search term data field 54510 an item they would like to find (e.g., from those items they have previously filed using the File It HI application). In this example user interface screen, the application is prompting the user to alternatively type in to the room search term data field 54520 a display of the item contents of a room (e.g., again from those items they have previously filed in a room using the File It HI application). In this example user interface screen 54000, if the user touches the item search term data field 54510, a soft keypad similar that previously described is displayed and the user enters the text of the item to be found (see also FIG. 55). The user selects the "Item" search soft key/control 54310 after entering the text of the item to be found to cause the HI application to initiate a search by querying a data store on the mobile device 200 or by querying one or more internal data stores 700 managed by HI server 600. Optionally, the "Item" search query includes searching a data store of common or similar item names (e.g., where the system HI system creates a library of common or similar names over time using terms entered by users). While in this example, search is illustrated as the primary means of accessing items in the data store, other methods can be used including for example scrolling through a displayed list of stored items or by displaying a list of items in a room specified by the user. In this example, the user can optionally enter a room label in the data field 54520 and select the "Room" search control 54320 to display the item contents of a specific room.

Figure 55:
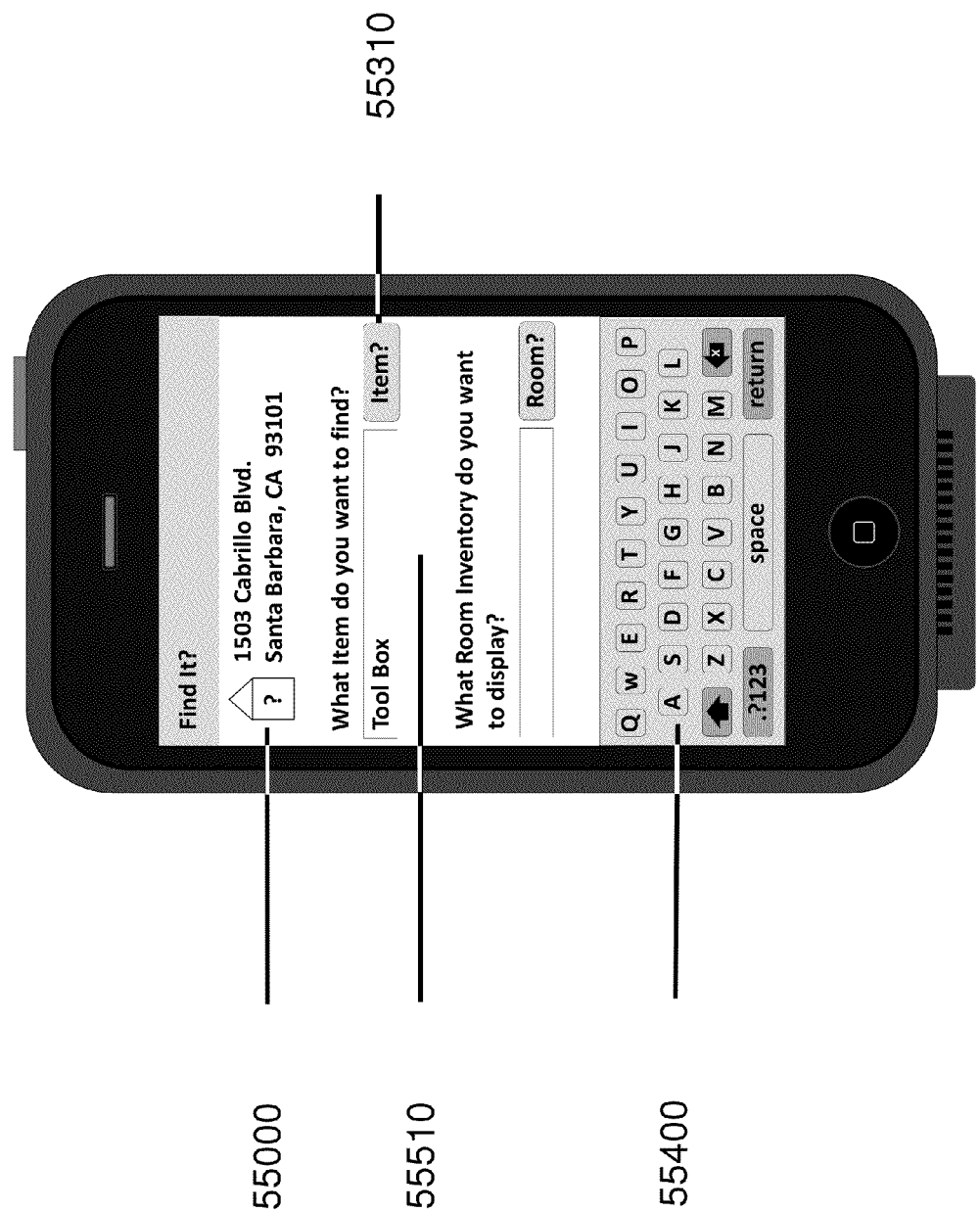
FIG. 55 illustrates an example smartphone HI application display highlighting a specific user item search request.

FIG. 55 illustrates an example mobile device 200 Find It HI user interface screen 55000 displayed by software application program 800. In this example, this screen is displayed/accessed in response to a user selecting the HI Find It application 42402, see FIG. 42. In this example user interface screen, the user has completed typing the text "Tool Box" into the item search term data field 55510 using the soft keypad 55400. The user can now select the "Item" search soft key/control 55310 to initiate a search for the "Tool Box".

Figure 56:
FIG. 56 shows an example smartphone HI application display presenting a summary of the results of the previous user item search request.

FIG. 56 illustrates an example mobile device 200 HI user interface screen 56000 displayed by software application program 800. In this example, this screen is displayed/accessed in response to a user selecting the "Item" search soft key/control 55310, see FIG. 55. In this example user interface screen, the HI application displays the application search results for the item and any additional information which may have been stored in association with the item. In this example user interface screen, the HI application display includes an "Edit" soft key/control 56330 that can be selected by a user to modify the text associated with displayed item (e.g., change the name or location of the item). In this example user interface screen, the HI application display includes an "Options" soft key/control 56320 that can be selected by a user to instruct the application to perform other actions (e.g., to search for another item). In this example user interface screen, the HI application display includes a "Locate" soft key/control 56340 that if selected by a user instructs the application to attempt to locate the object which was returned in response to the search query. In this example, the locate control, if selected by the user, attempts to find the object by activating the RFID reader and performing a scan of the room (or other area, for example, garage, yard, shed, etc.).

Figure 57:
FIG. 57 depicts an example smartphone HI application display presenting the failed results of an RFID scan to physically locate a specific item.

FIG. 57 illustrates an example mobile device 200 HI user interface screen 57000 displayed by software application program 800. In this example, this screen is displayed/accessed in response to a user selecting the "Locate" soft key/control 56340 while in the user's Garage, see FIG. 56. In this example user interface screen, the HI application displays the application locate results 57500 for the selected item, the Tool Box. In this example the RFID scan came up with negative locate results 57500 in a search of the Garage. (In this example the HI user interface determined that the user initiated the locate/RFID scan from the user's Garage using, for example by: the user entry of the location, the HI software application program 800 querying the smartphone's location (and determining by accessing one or more internal or external data stores that the location pertains to the user's Garage), and/or the HI software detecting multiple objects in the room and inferring from these objects (and, optionally, from their assignment by the user or other means) are stored in the Garage. In this example, the HI application also generates an alert sound or speaks (e.g., using text-to-speech) the results of the locate item RFID scan audibly 57210. Additionally, in this example, a quick view Pass/Fail status indicator 57510 is also presented (in this case indicating an unsuccessful RFID scan). In this example user interface screen, the HI application display includes an "Edit" soft key/control 57330 that can be selected by a user to modify the text associated with displayed item (e.g., change the name or location of the item). In this example user interface screen, the HI application display includes an "Options" soft key/control 57320 that can be selected by a user to instruct the application to perform other actions (e.g., to search for another item). In this example user interface screen, the HI application display also includes a "Locate" soft key/control 54340 that if selected by a user instructs the application to attempt to locate the object of interest. In this example, the locate control, if selected by the user, attempts to find the object by activating the RFID reader and performing a scan of the room (or other area, for example, garage, house, shed, etc.).

Figure 58:
FIG. 58 depicts an example smartphone HI application display presenting the successful results of an RFID scan to physically locate a specific item.

FIG. 58 illustrates an example mobile device 200 HI user interface screen 58000 displayed by software application program 800. In this example, this screen is displayed/accessed in response to a user selecting the "Locate" soft key/control 57340 while in the user's Shed, see FIG. 57. In this example user interface screen, the HI application displays the application locate results 58500 for the selected item, the Tool Box. The RFID reader 42500 scan in this example came up with positive locate results 58500 in a scan of the Shed. Once again, in this example, a quick view Pass/Fail status indicator 58510 is also presented (in this case indicating a successful RFID scan result). In this example user interface screen, the HI application display includes an "Update" soft key/control 58340 that can be selected by a user to have the location information associated with the object updated by the application. The user points the phone in the direction of the newly located item and presses the "Update" key 58340. In this example, this causes the HI app 800 to re-establish the item's room/wall location by resampling the phone's GPS and compass coordinates. The recorded location of all items linked to this item will also be automatically updated as well. In this example user interface screen, the HI application display includes an "Edit" soft key/control 58330 that can be selected by a user to modify the text associated with displayed item (e.g., change the name or location of the item). In this example user interface screen, the HI application display includes an "Options" soft key/control 58320 that can be selected by a user to instruct the application to perform other actions (e.g., to search for another item).

Figure 59:
FIG. 59 shows an example smartphone HI application display presenting an updated summary of information about a specific user selected item immediately after a user initiated item location update based on the RFID scan results.

FIG. 59 illustrates an example mobile device 200 HI user interface screen 59000 displayed by software application program 800. In this example, this screen is displayed/accessed in response to a user selecting the "Update" soft key/control 58340, see FIG. 58. In this example user interface screen, the HI application displays the update 59500 to the Tool Box's location, from "North wall in the Garage" to "South wall in the Shed". In this example user interface screen, the HI application display includes an "Edit" soft key/control 59330 that can be selected by a user to modify the text associated with displayed item (e.g., change the name or location of the item). In this example user interface screen, the HI application display includes an "Options" soft key/control 59320 that can be selected by a user to instruct the application to perform other actions (e.g., to search for another item). In this example user interface screen, the HI application display includes a "Locate" soft key/control 59340 that if selected by a user instructs the application to attempt to locate the object of interest using the RFID scanner.

First Example Embodiment

See FIGS. 2 and 3

FIGS. 2 and 3 depict a first example embodiment where a homeowner wants to create an inventory of her personal property. In this example, the homeowner accesses a Home Inventory service via the Internet from her personal computer, takes pictures of her personal property, downloads the pictures, and edits and/or organizes a presentation of her personal property.

State 1. The homeowner (user) accesses the Home Inventory (HI) service provider web site. In this example, the user browses to the home inventory web site using a personal computer 100 connected to data network 400. Optionally, any data networking capable device can be used by the user including for example, a mobile phone with data networking capabilities.

State 2. The HI service provider's web hosting server 600 receives the web page URL 4100 and presents the login/registration web page 4000 to the user (see FIG. 4).

State 3. With reference to FIG. 4, the user signals their desire to register a new account by clicking the pull down window control 43000 which opens registration window 5500 (see FIG. 5). The user next enters her name in the name field 5510, mobile phone number in the phone number field 5520, creates and enters a new password in the Password field 5530 and indicates they live in a single level structure by selecting the "no" radio button option 5540. Optionally, if the user resides in a multi-level structure, they enter the number of levels (excluding the basement) in field 5550. The user then clicks on the Download Now button 5560 to submit their information to the hosting web server 600.

State 4. The hosting web server 600 receives the information entered by the user and in this example creates a new customer account in the Home Inventory Database 700. In this example, one or more software programs 800 are next downloaded from the HI server 600, over the data network 400 and wireless network 300 and installed on the user's mobile device 200.

State 5. The web server 600 notifies the user over the data network 400 at the personal computer 100 that the software program download is complete and provides instructions to the user on how to activate the software program 800.

State 6. The user follows the provided instructions to activate the downloaded software program 800 on their mobile device 200. The software 800 acknowledges the activation by sending a message to the web server 600.

State 7. The application program 800 displays a welcome message 6000 and requests the user select their first location 6100 (places where personal property are located) to inventory, see FIG. 6 of an example mobile device user interface screen.

State 8. In this example, the user selects the bedroom as the first location to inventory. The user scrolls through the list of locations until the "bedroom" is highlighted and then the option is selected. Other alternative interfaces could be used for location selection. For example, the user could have spoken "bedroom" to select the bedroom location. Or, each location could have had a number assigned which could have been dialed by the user. The user then proceeds to the next user interface screen by selecting the "Next" button 6300. The updated user data can be incrementally sent at the end of each state (as shown by the dashed lines in FIG. 2) or buffered locally in the mobile phone 200 and sent as a batch message to the HI server 600 at the end of data collection (e.g. during state 12).

State 9. With reference to FIG. 7, since it is likely the user has more than one bedroom, the software program 800 requests that the user assign a reference identifier such as a name or number to the bedroom. In this example, the user assigns the name "Luke's Bedroom" 7100 to the bedroom. The user then proceeds to the next user interface screen by selecting the "Next" button 7300.

State 10. The user is then requested to stand in the center of the room and click "Next", see FIG. 8. In response to the user selection, the program 800 queries the mobile device/wireless network to determine the Global Positioning (GPS) coordinates of the location being inventoried. In this example, these coordinates are downloaded from the mobile device 200 over the wireless network 300, either at the end of this state or at the end of state 12. In another example, these coordinates are sent directly from the wireless network 300 and/or data network 400 to the HI server 600.

State 11. In this example, the user's mobile device has digital camera capabilities. The user is requested to photograph the contents of the location, see FIG. 9. Optionally, the user can take no pictures or as many pictures as they choose. In this example, the user interface increments 9100 with each picture of the bedroom. This is accomplished through a programmatic interface between the digital camera capabilities of the mobile device and the software program 800. Again, the images can be incrementally sent to the HI server 600 at the end of this state or at the end of state 12.

State 12. When the user is finished photographing the items in the room, she is requested to select the "Next" button 9300 as shown in FIG. 9. In this example, once the user has finished photographing the contents of the room and selected the "Next" button, all unsent data is transmitted from the mobile device 200 over the wireless network 300 through the data network 400 (which can optionally be the same network as the wireless network 300) to the network-based server 600 for storage in a secure customer account database 700.

State 13. The HI server 600 processes each photo image to separate individual items which are depicted by shape outlines 11310-11340 on an image item map rendition 11000 (see FIG. 11). The photo label 11200, initially created by the HI server, is shown at the top of the rendition.

Figure 12:
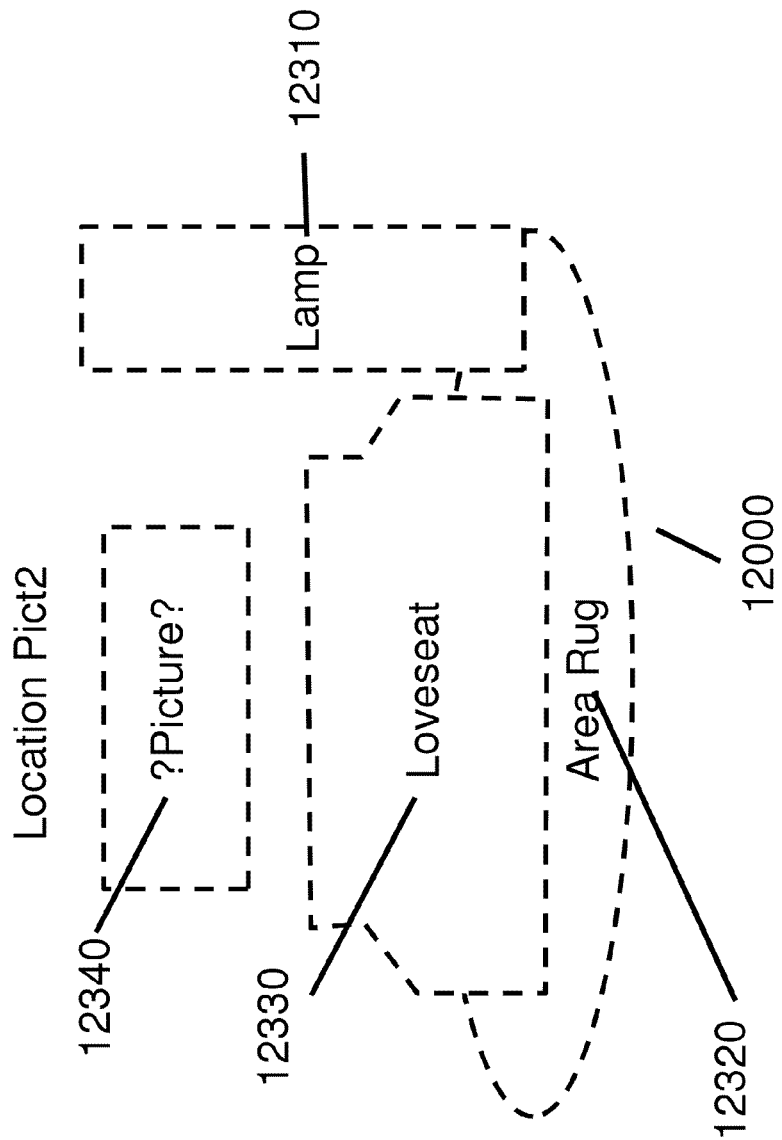
FIG. 12 illustrates an example photo item map with item labels generated by a Home Inventory system.

State 14. The HI server 600, in conjunction with the DSP servers 550, compares the item shape outlines to known item types to identify and label each item. The item labels 12310-12340 are added to the image item map 12000 as shown in FIG. 12.

State 15. Based on user preferences recorded in the customer's profile in the database 700, the item map is stored in the customer database 700 using item outlines in the rendition 12000 or alternatively is converted into a line drawing 13000 using standard line drawings of each individual item type 13310-13340 (see FIG. 13).

State 16. The program 800 displays a screen requesting the user select the next location to inventory, see FIG. 10. In addition, there is a menu selection 10350 whereby the user can indicate that they are finished.

The process states 8 through 16 are repeated until the user has completed their room by room inventory of personal items.

State 17. The user signals the Home Inventory system 900 that she has completed her inventory by entering the Finished 10350 menu selection.

State 18. Upon detection that the user has completed entering room and item information, the HI server 600 uses the GPS room locations to create and store a rendition of the floor plan of the user's residence. The server 600 initially plots the room center points 14000 on a grid 14100 as illustrated in FIG. 14. Recorded on the plot for each room is the room label 14210, an indicator 14220 of the location of the center point on the grid, and the x,y coordinates 14230 of the center point relative to the grid 0,0 origin 14100.

State 19. With reference to FIG. 15, the network-based server 600 next uses coordinate map 14000 to create a rendition of the homeowner's floor plan 15000. Simple editing tools are provided for the user to change the labels attached to the rooms in the floor plan and to resize the room shapes.

State 20. In the event of multiple levels, the network-based server 600 optionally creates side views 16000 of the residence structure to facilitate user navigation. An example Home Inventory generated side view is shown in FIG. 16.

State 21. After completing the image capture, the user can access the home inventory service provider web site and login to view the downloaded images and the floor plan created by the home inventory system (see FIG. 4).

The homeowner (user) accesses the Home Inventory (HI) service 900 by browsing to the home inventory web site using a personal computer 100 connected to data network 400. The browser passes the web site URL 4100 to the HI web hosting server 600 to initiate the process.

State 22. The web server 600 presents the login/registration web page 4000 to the user (see FIG. 4).

State 23. With reference to FIG. 4, the user signals their desire to login to their account by clicking the pull down window control 4200 which opens login window 17300 (see FIG. 17). The user next enters her mobile phone number in the phone number field 17310 and enters her password in the Password field 17320. The user then clicks on the Sign In button 17330 to submit their information to the hosting web server 600.

State 24. The hosting web server 600 receives the information entered by the user and opens the customer's account in the Home Inventory Database 700. The server 600 then sends a web page 18000 (see FIG. 18) to the user's terminal 100 displaying the floor plan of the user's residence to allow the user to navigate through their inventory. This includes a side view 18100, a top view of the ground level 18200 of the residence, and a link 18300 to select alternate views. Additional navigation controls are provided to allow the user to select different floor plan levels (e.g. by clicking link 18110 to view the basement) and to focus on an individual room (for example by clicking link 18210 to view the items in Luke's Bedroom).

State 25. In this example, after logging in, the user clicks link 18210 in FIG. 18 to select "Luke's" bedroom to review and edit the contents of the location (or to modify the label assigned to that location).

State 26. FIG. 19 is an example web presentation display 19000 of the information stored in association with Luke's bedroom sent to the user's browser by the HI server 600. The presentation is in a tabbed format with "Luke's Bedroom" the current open tab 19100. Optionally, other tabs across the top include all of the locations (depending upon the number of locations), or the higher-level abstraction of the different floor levels.

State 27. In this example, the user decides to view a list of individual items within one of the camera images. She clicks the maximize[+]/minimize[−] button 19300 associated with the image "Location Pict2". This causes the photo item list to be displayed and the button 19300 to enter the minimize[−] state. Each photo item list can be similarly opened (maximized) and closed (minimized). The user next requests that the photo and associated item information be visually displayed by double clicking the image identifier "location Pict2" 19200. The request is transmitted back to the network-based server 600 over the data network 400.

State 28. The network-based server 600 retrieves the selected image from the customer database 700 and displays the image on the user's data terminal 100. An illustrative web display 21000 is shown in FIG. 21.

State 29. The user can now examine and modify the items identified in the selected photo. A thumbnail 21100 of the original photo, the photo label/identifier 21200, a line drawing 21300 of the identified photo items, and a pallet 21400 of line drawing item types are displayed. The user next selects a single item to view by double clicking the associated item label (for example, item label 21335 to select the loveseat). This user request is once again sent on to the HI web server 600 for processing.

State 30. Upon reception of the above user request, the web server 600 queries the database 700 to retrieve the requested item parameters which are returned to the user's browser and displayed 22000 as illustrated in FIG. 22.

State 31. In this example, the user describes in further detail the previously selected item—the loveseat 21335 shown in FIG. 21. This is accomplished by updating fields in a pop-up web form 22000 as illustrated by way of example in FIG. 22.

The pop-up web form 22000 prompts the user to enter a structured set of item information (e.g., label or title for the item 22010, the purchase price 22030, beneficiary 22040, etc.). In this example, there is also a note field 22050 for general information to be detailed by the user about the selected item. When the user has completed her updates, she clicks the Submit button 22300. This causes the browser to forward the filled in form fields to the web server 600.

State 32. The HI web server 600 updates the database 700 with the new item information.

State 33. The user signals the web server 600 that she is done managing her home inventory information by closing all associated HI web pages.

State 34. Upon detection that the user has closed their HI web pages, the web server 600 cleans up any incomplete open records and logs the user account out of the system.

Second Example Embodiment

See FIGS. 60-63

FIGS. 60-63 depict a second example embodiment where a user wants to determine the current market price of property in an area the user may be interested in moving to. In this example, the user invokes an application on her smartphone, takes a picture of the property of interest, and is returned the market price of the property of interest.

Figure 60:
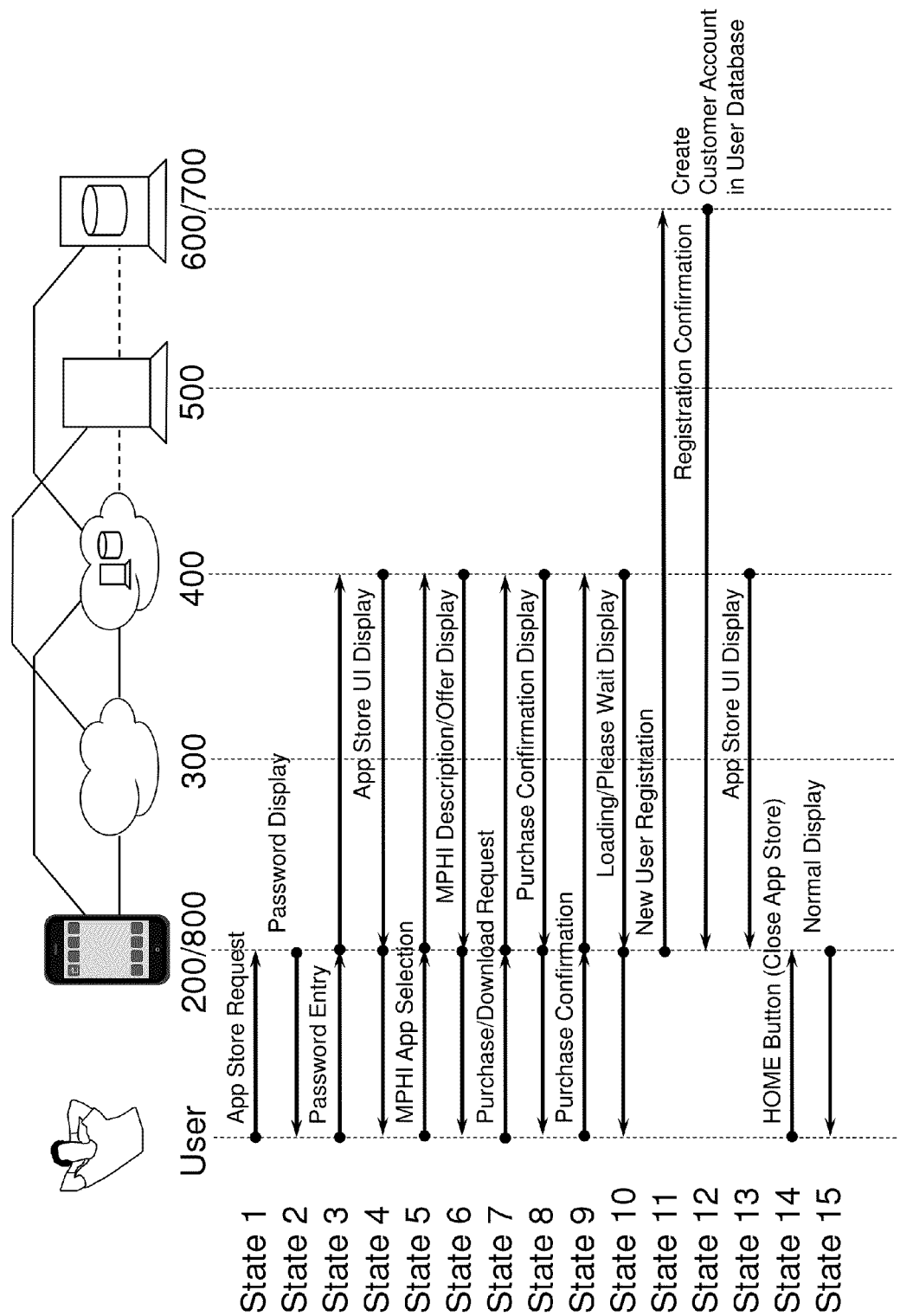
FIGS. 60-63 illustrate the operating environment/process workflow of a second example user scenario.

State 1 of FIG. 60. The user powers on their smartphone 200 and accesses the App Store in the Data Network Cloud 400 by pressing its Icon 24305 on the phone's touch screen 24100 (reference FIG. 24).

State 2. The phone prompts the user to enter his/her password. (The well known in the state of the art process of logging in and downloading applications is described in this state through State 14. The process flow is illustrated in FIG. 60 but is not otherwise illustrated pictorially.)

State 3. The user enters his/her password using the keypad on the touch screen 24100 and then hits the enter soft key, also on the touch screen.

State 4. The phone displays the App Store interface which allows the user to search or browse for available smartphone applications.

State 5. The user reviews available applications and selects the MPHI app.

State 6. The phone displays a description of the selected application and its purchase price. Also displayed is a button to enable the user to purchase the application and a button to return the display to the search/browse menu.

State 7. The user presses the buy app button on the touch screen.

State 8. The phone next requests that the user confirm or cancel their purchase request.

State 9. The user presses the confirm soft key.

State 10. The phone then begins the MPHI app download and instructs the user to wait for several seconds for the download to complete.

State 11. Upon completion of the download and installation of the MPHI app, the app 800 is launched and registration information is passed from the phone 200 to the MPHI server 600. Note that in some instances, user interaction would be required. In this example, it is assumed that the app 800 can automatically retrieve the required information directly from internal memory without user assistance.

State 12. The MPHI server 600 uses the registration information to create a new customer account in the User Database 700 and returns a registration confirmation message.

State 13. The phone display is returned to the App Store menu.

State 14. The user closes the App Store using the phone's HOME button 24200 (see FIG. 24).

State 15. The phone returns to its normal display mode in which the loaded applications are listed. The MPHI app to facilitate Buy?-ing inquiries 24402 (see FIG. 24) is included in the display.

Figure 61:
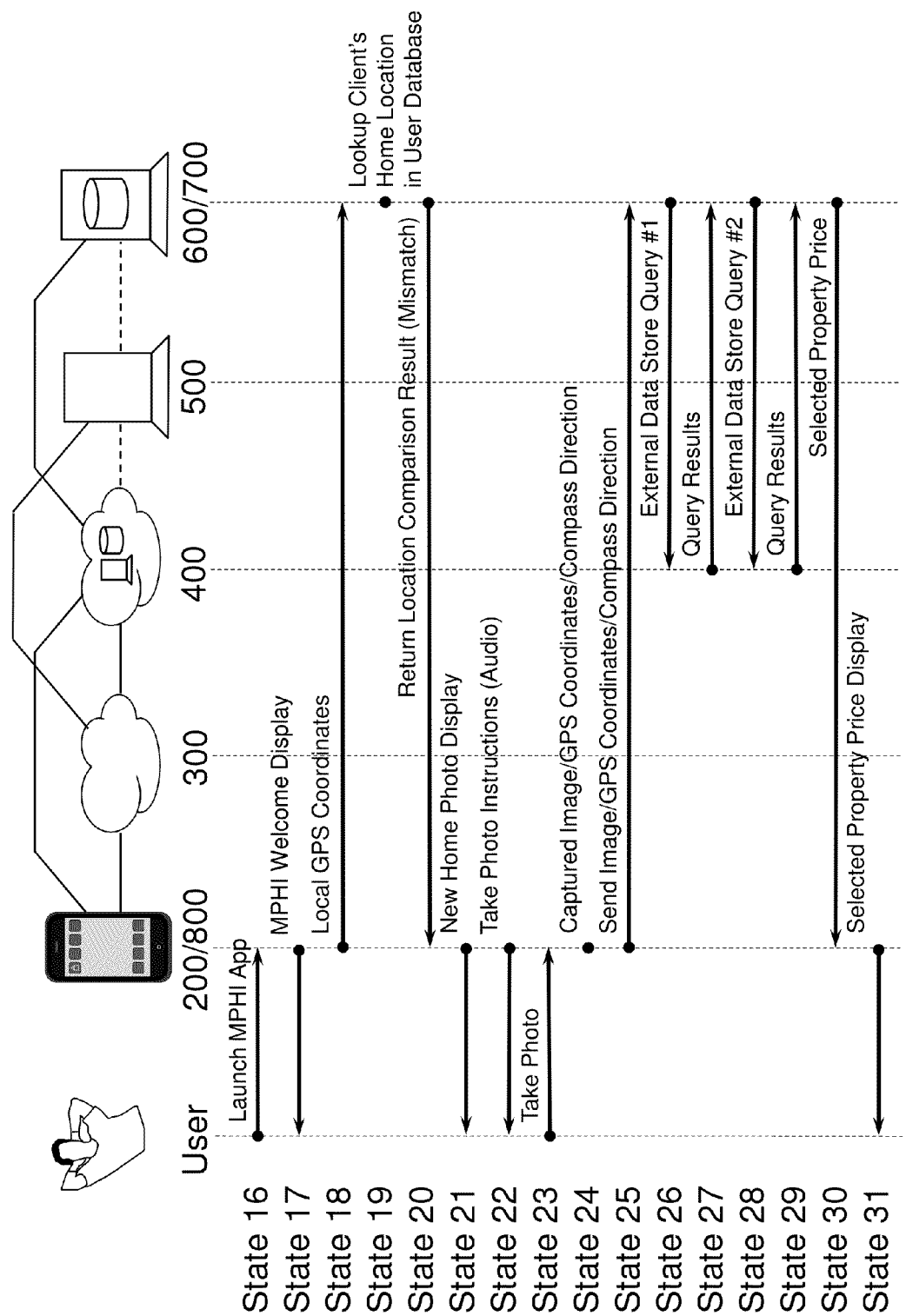

State 16 of FIG. 61. The user, a married mother of three children, is interested in selling their home and moving into a larger home in a better school district. In this example, the user is interested in moving into the Hope school district. The user currently has her house on the market and today would like to go house hunting. She travels to a desirable neighborhood thought to be in the Hope school district. She sees a charming home and one which looks like it might be in the price range of homes she can afford. She removes her smartphone from her purse and launches the market price HI application. FIG. 24 illustrates an example smartphone interface with a Buy? MPHI application icon 24402.

State 17. The application program 800 responds to the user's command and displays a welcome message 25000.

State 18. In this example embodiment, in response to the activation of the application program 800, the application queries the smartphone's GPS technology to determine the user/smartphone's location coordinates. In this example, the application program 800 sends the location coordinates to the HI system server 600.

State 19. In this example, the HI system server 600 queries an internal data base to determine if the location coordinates sent by the MPHI application are within a homeowner's property boundaries.

State 20. In this example, the location coordinates indicate the user is not within a homeowner's property boundaries. The HI system 600 notifies the MPHI application 800 that the user/smartphone is not within a property boundary.

State 21. The MPHI application receives the HI system notification. Optionally, the smartphone changes the mode of the phone to photo shoot (i.e., ready to take a picture) and the smartphone user interface display 25000 changes to a display of the field of view 26000 as seen through the camera lens 26100. Optionally, the smartphone user interface display maintains this mode until the user takes a picture by selecting a control 26300 or a timeout event occurs (see FIG. 26).

State 22. In this example, the MPHI user interface in the smartphone speaks an audio prompt 26210 to the user to take a picture of the property of interest, see FIG. 26 for an example user interface display. Optionally, to assist with focusing the camera lens, a box outline of a house 26400 is illuminated in the center of the display (see FIG. 26).

State 23. The user points the smartphone camera at the property of interest and takes a picture by selecting a user interface control 26300 (e.g., the user interface control typically used to take a picture).

State 24. Optionally, several actions occur in this state. First, the GPS technology of the smartphone is queried to get the location coordinates at the time the photo was taken. Second, the compass technology of the smartphone is queried to determine the direction the camera lens was pointing at the time the photo was taken. Third, the image of the property, the GPS coordinates, and the camera lens direction are stored in memory in the phone.

State 25. In this example, the application program 800 sends the image file, the location coordinates, and the compass information to the HI system server 600.

State 26. In this example, the HI system server 600 queries an external data store (in the Data Network Cloud 400) to identify the property located immediately adjacent to the location coordinates in the direction specified by the compass technology (e.g., due North). State 27. The property location query results are returned to the HI system including, for example, the physical address and other details of the identified property. In this example, the location coordinates lookup find a property match. If no match is found, optionally, the results are returned and the user is prompted for additional information regarding the location or the user is requested to re-take another picture, optionally, from a different location (e.g., closer to the proximity to the property, etc.).

State 28. The HI system generates another query request to a market price external data store. This external data store optionally provides a return result of the expected market price for a specified property.

State 29. In this example, the market price external data store returns a market price for the specified property.

State 30. The HI system 600 sends the MPHI application 800 the market price, physical property address, and whether the property is currently listed 27000.

State 31. The MPHI application receives the market price from the HI server and displays the market price to the user. The MPHI application also displays a user interface control 27310 to request additional information related to the property, see FIG. 27 for an example user interface display.

Figure 62:
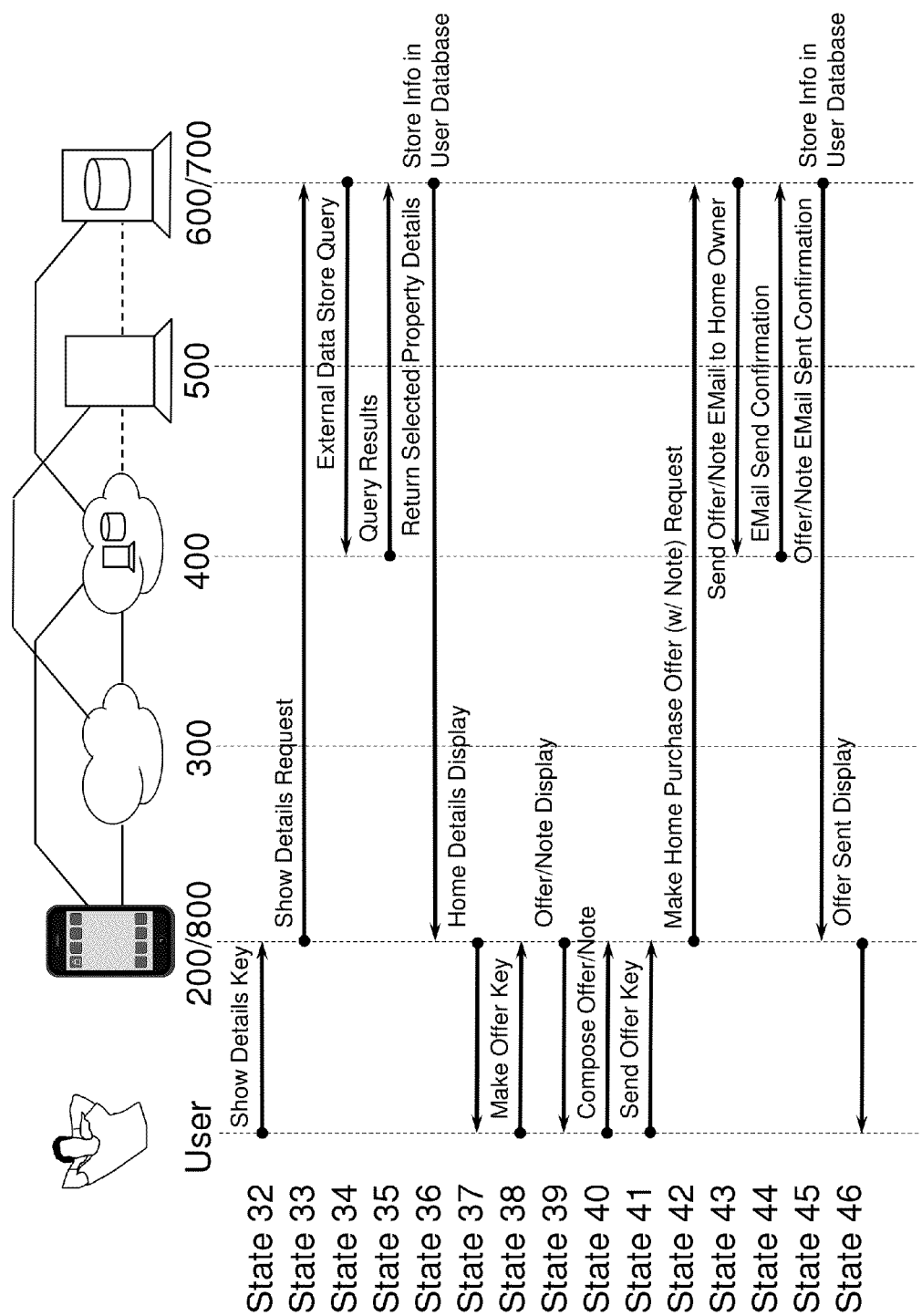

State 32 of FIG. 62. In this scenario, the user is interested in addition information related to the property, in particular, to confirm whether the property is within the Hope school district. The user selects the MPHI application additional information control 27310.

State 33. In response to the user request, the MPHI application 800 sends a request from the smartphone 200 to the HI server 600 over the wireless data network 400.

State 34. The HI server 600 generates a query request to a real estate property external data store 400.

State 35. The real estate property external data store 400 receives the request from the HI server. In response to the query request, the external data store returns to the HI system a collection of information regarding the property of interest including, for example, the number of bedrooms and bathrooms, structure square footage, school district, etc.

State 36. The HI server 600 receives the requested information from the real estate property external data store and stores all or some of the information in the user's account. In this example, a summary of the information (for example, just the information/parameters of interest as defined by the user and stored in the user's profile) is sent to the MPHI application 800.

State 37. The MPHI application 800 receives the requested additional information regarding the property of interest, formats the data, and displays the data within the user interface of the smartphone, see FIG. 28. The MPHI application included, as part of the additional information query request to the HI server (see State 36), a determination request as to whether the owner participates in a network of users who will accept notifications of interest in the purchase of their homes (e.g., a "make me a purchase offer" network). In this example, the home owner does participate in such a network (hereinafter referred to as the Make Offer network) which the HI system is either a part of or has access to. The HI server 600 included the home owner's status in this Make Offer network in the property information sent to the MPHI application 800. The MPHI application includes, as part of the display of additional property information, a user interface control 28330, to inform the property owner of the user's potential interest in the purchase of the home.

State 38. The user reads the displayed data and sees that the home is in the Hope School district. The user is now even more interested in investigating purchasing the property. In this example, the user selects the Make Offer user interface control 28330.

State 39. In response to the Make Offer user request, the MPHI application 800 updates the display to allow the user to compose a note 29500 to the owner to be presented with their purchase interest notification (see FIG. 29).

State 40. The user enters their note in the displayed form field using the touch screen data entry keypad 29400 (see FIG. 29).

State 41. The user then confirms their request by selecting the Send Offer soft key 29330.

State 42. In response to the selection of the confirm action command, the MPHI application 800 sends the request to the HI server 600.

State 43. The HI server receives the MPHI application request to contact the home owner and in response, in this example, sends an email to the owner. Optionally, the email to the home owner includes information about the user from the user's account. Optionally, linkage is established through the HI server between the user account and home owner so communications can occur, optionally, anonymously (e.g., bridged communications can be established between the home owner and user without disclosing to either party their respective phone numbers, email addresses, text accounts, etc.).

State 44. An Email sens confirmation is returned to the MPHI server 600 via the data network 400.

State 45. The MPHI server 600 informs the MPHI app 600 that the offer/notification has been successfully sent.

State 46. The MPHI application returns the user display to the presentation of home details (see FIG. 30) with an added indicator 30500 that the Offer/Note was delivered.

Figure 63:
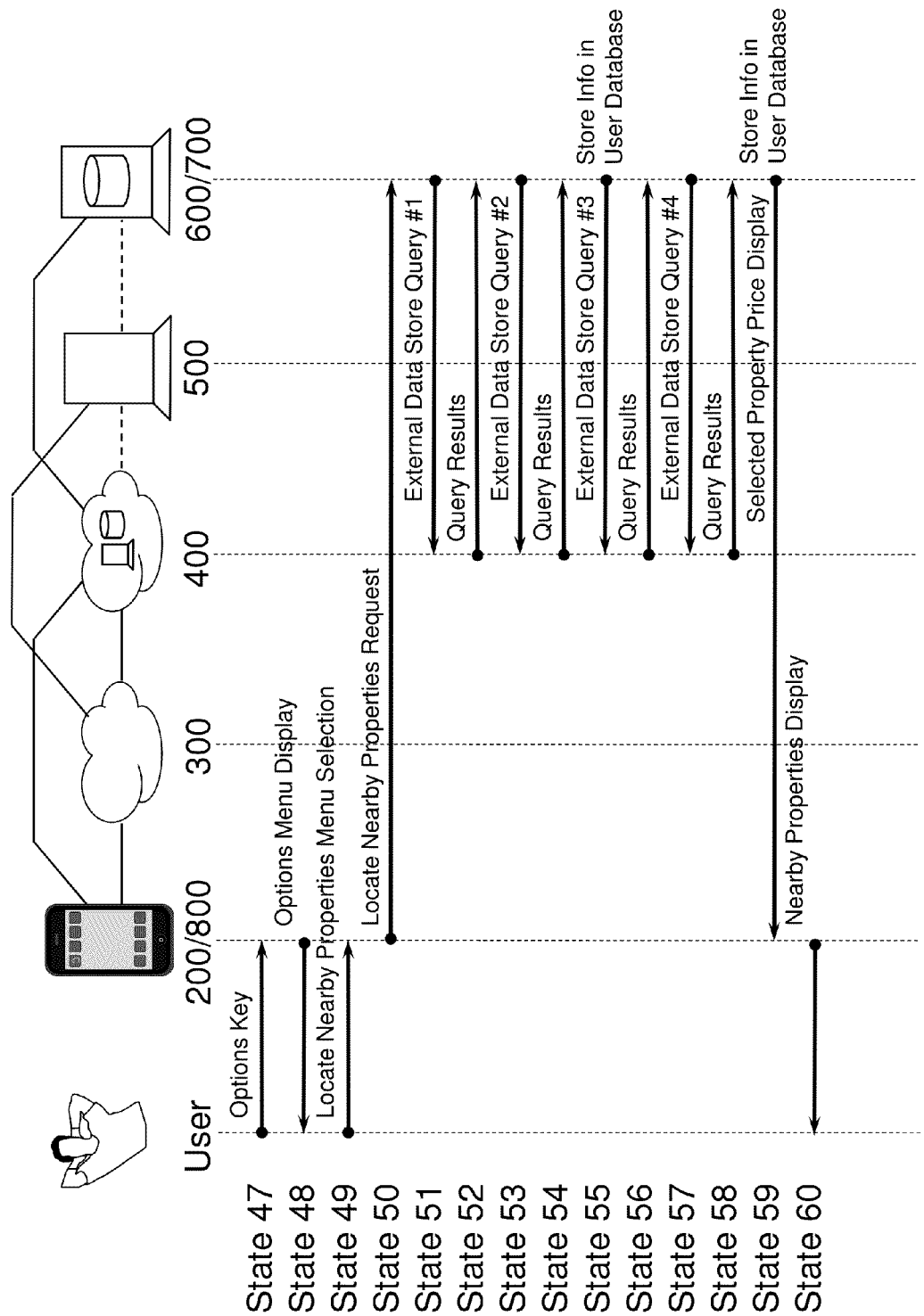

State 47 of FIG. 63. The user next selects the Options soft key 30320 (see FIG. 30).

State 48. In response, the MPHI app 600 displays an Options Menu of next step choices 31340, see FIG. 31.

State 49. From the Options user menu 31340, see FIG. 31, the user selects the "locate nearest property" sub-menu item 31344.

State 50. In response to the user interface control selection, the MPHI application 800 sends the request to the HI server 600.

State 51. The HI server queries one or more internal or external data stores (e.g., a real estate multiple listing database) to determine one or more properties which are currently for sale within a configurable parameter distance from the user's location (e.g., one block, one mile, etc.). In this example, the HI server sends a query to a real estate multiple listing database (MLS) using as a location parameter the address of the property just returned to the user and a proximity parameter of one-quarter mile radius.

State 52. The external MLS data store receives the HI server requests. The MLS data store determines there are no homes for sale given the parameters specified by the HI server. The MLS data base returns the results to the HI server.

State 53. The HI server receives the query results from the MLS data store. Since the result is null, the HI server makes a second request to the MLS data store using as a location parameter the address of the property just returned to the user and a proximity parameter of one-half mile radius.

State 54. The external MLS data store receives the HI server request. The MLS data store determines there are two homes for sale within the range specified by the HI server. The MLS data base 400 returns the results to the HI server 600.

States 55-58. The HI server receives the query results from the MLS data store and stores all or some of the information in the user's account. In this example, the HI server queries a directions data store (e.g., Google Maps) to retrieve specific directional travel information. As parameters in the query, the HI server optionally provides the address of the property of interest (A) and the address of the first home for sale within the half mile radius (B) (query States not shown). A second query to the directional data store is made using the address of the property of interest (A) and the address of the second home for sale within the half-mile radius (C) (query States not shown).

State 59. The HI server 600 receives the query results from the directions data store in the Data Network Cloud 400 and stores all or some of the information in the user's account. The HI server sends directional information and a profile of the two homes (for example, just the information/parameters of interest as defined by the user and stored in the user's profile) to the MPHI application 800 over the wireless data network 400.

State 60. The MPHI application 800 displays on the smartphone user interface a listing of the two homes 32501 and 32502 for the user's review, see FIG. 32.

The example above illustrates the advantage of the HI system in determining for a user the property information and selling price or estimated selling price for a property of interest. Further, the methods and system described facilitate the selling of the property for the seller and the purchasing of the property for the buyer. Still further, the above illustrates how the invention can apply varying technologies in order to greatly simplify the user experience.

Third Example Embodiment

Figure 64:
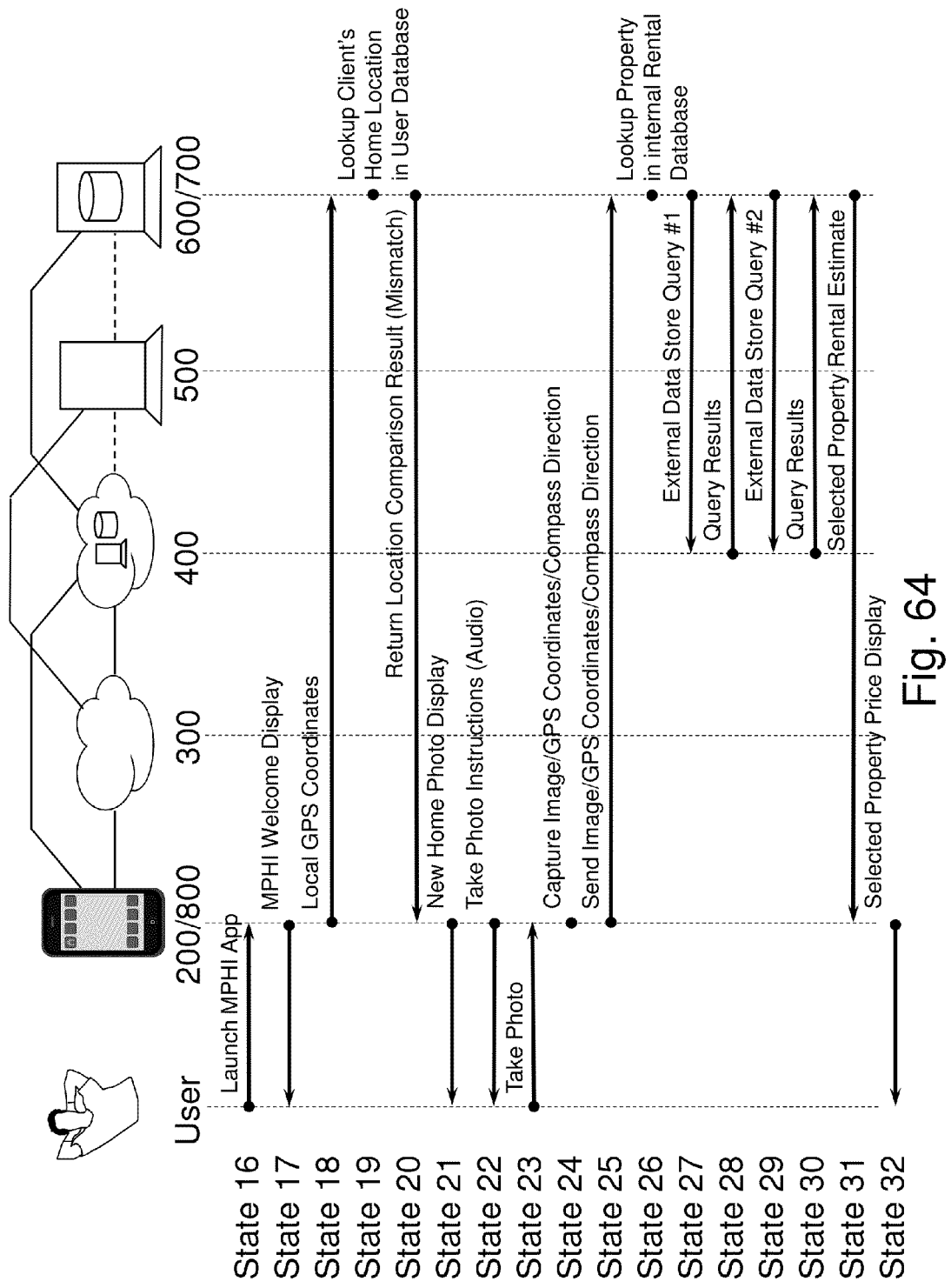
FIGS. 64-66 illustrate the operating environment/process workflow of a third example user scenario.
Figure 65:
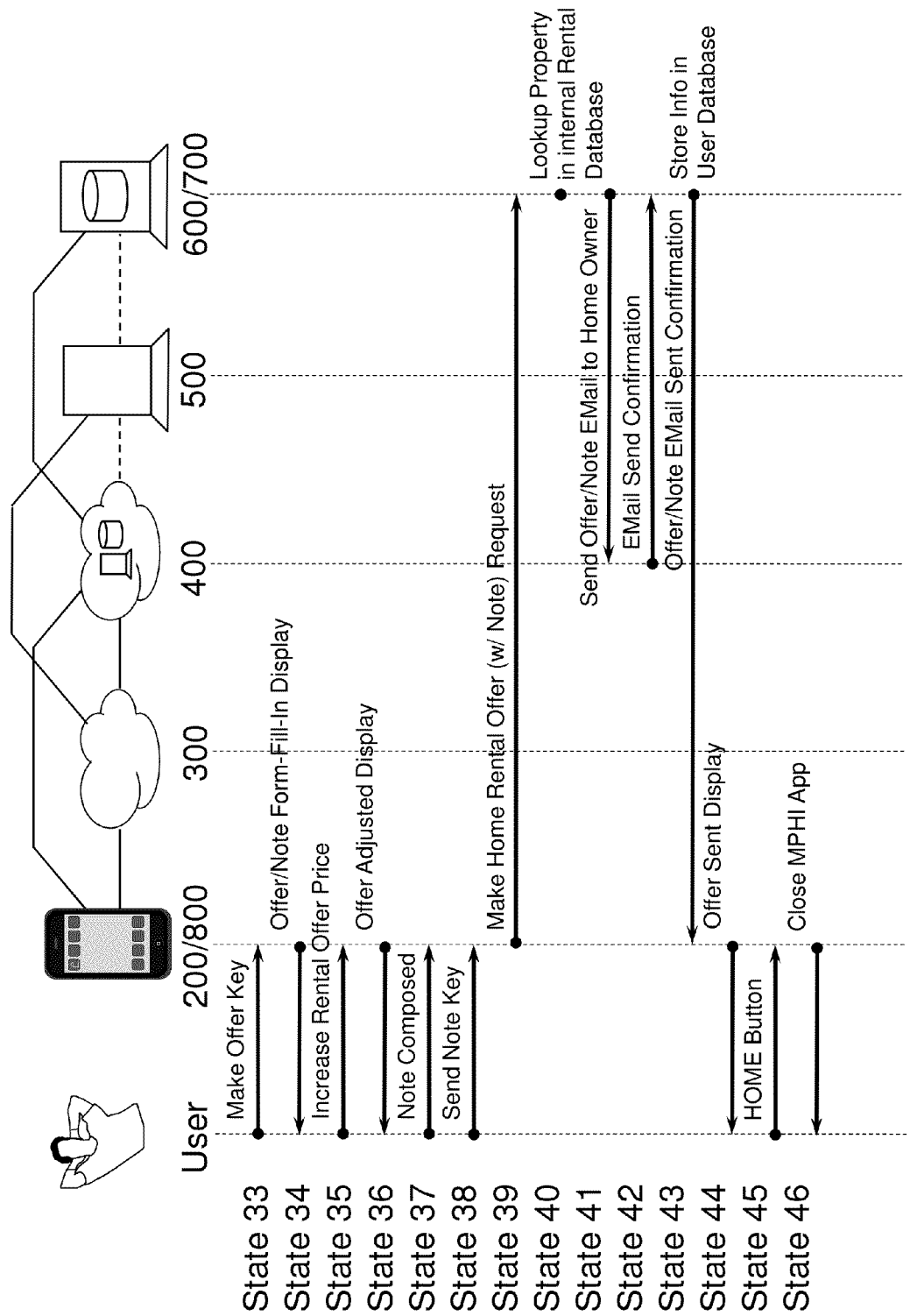
Figure 66:
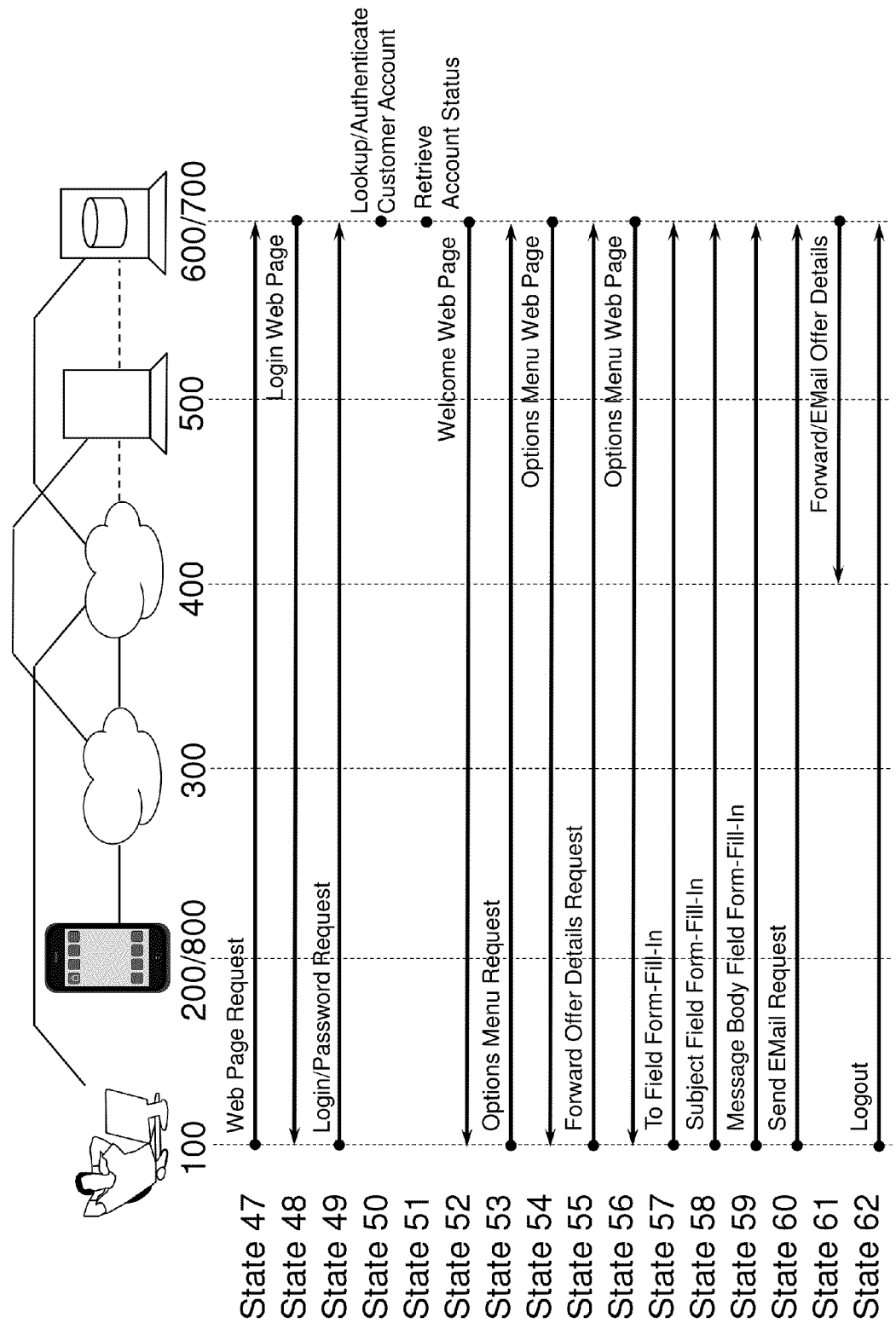

See FIGS. 64-66

FIGS. 64-66 depict a third example embodiment where a user wants to determine the current rental price of property in an area the user is interested in renting. In this example, the user invokes an application on his smartphone, takes a picture of the property of interest, and is returned the rental price of the property of interest.

States 1-15. These states are analogous to those of the second example embodiment above (see FIG. 57).

State 16 of FIG. 64. The user is married, currently living in an apartment, and interested in renting a home. A motivation for moving out of the apartment is the user is contemplating getting a dog. The apartment he currently lives in does not allow pets. The user travels to a desirable neighborhood. The user sees a great home for sale in the neighborhood that he is sure his wife will love. He selects the rental price HI application icon 24403 on his smartphone, see FIG. 24.

State 17. The application program 800 responds to the user's command and displays a welcome message.

State 18. In this example embodiment, in response to the activation of the application program 800, the application queries the smartphone's GPS technology to determine the user/smartphone's location coordinates. In this example, the application program 800 sends the location coordinates to the HI system server 600.

State 19. In this example, the HI system server 600 queries an internal data base to determine if the location coordinates sent by the MPHI application are within a homeowner's property boundaries.

State 20. In this example, the location coordinates indicate the user is not within a homeowner's property boundaries. The HI system 600 notifies the MPHI application 800 that the user/smartphone is not within a property boundary.

State 21. The MPHI application receives the HI system notification. Optionally, the smartphone changes the mode of the phone to photo shoot (i.e., ready to take a picture) and the smartphone user interface display changes to a display 33000 of the field of view as seen through the camera lens 33100. Optionally, the smartphone user interface display maintains this mode until the user takes a picture by selecting a control 33300 or a timeout event occurs (see FIG. 33).

State 22. In this example, the MPHI user interface in the smartphone speaks an audio prompt 33210 to the user to take a picture of the property of interest, see FIG. 33 for an example user interface display. Optionally, to assist with focusing the camera lens, a box outline of a house 33400 is illuminated in the center of the display (see FIG. 33).

State 23. The user points the smartphone camera at the property of interest and takes a picture by selecting a user interface control 33300 (e.g., the user interface control typically used to take a picture).

State 24. Optionally, several actions occur in this state. First, the GPS technology of the smartphone is queried to get the location coordinates at the time the photo was taken. Second, the compass technology of the smartphone is queried to determine the direction the camera lens was pointing at the time the photo was taken. Third, the image of the property, the camera lens direction, and the GPS coordinates are stored in memory in the phone.

State 25. In this example, the application program 800 sends the image file, the location coordinates, and the compass information to the HI system server 600.

State 26. The HI server 600 generates a query request to an internal rental price data store. This internal data store optionally immediately returns result of the expected rental price for a specified property if previously the rental price of the home has been calculated and/or if there is a comparable home in the neighborhood with a previously determined rental value.

State 27. If the property is currently not listed for rent, the rental price is determined, in this example, by accessing one or more external data bases to identify comparable rentals. For example, the HI server 600 queries an external data store via the data network 400 to determine known rental prices for the surrounding area.

State 28. In this example, the market price external data store returns a rental price for the specified property.

States 29-30. In this example, the HI server also queries one or more additional external data bases to acquire further information about the property of interest.

State 31. The MPHI server 600 integrates and forwards some of all of the collected information to the MPHI application 800.

State 32. The MPHI application receives the requested information regarding the property of interest, formats the data, and displays a summary of the data 34000 within the user interface of the smartphone, see FIG. 34.

State 33 of FIG. 65. The user reads the displayed data and sees that the property is in the user's rental price range and has the desired number of bedrooms. Further, the MPHI application displays a control 34330 which if selected by the user formulates a rental offer request to the owner. In this example, the user is interested in making an offer so he selects the "Make Offer" soft key 34330.

State 34. The MPHI application displays a rental offer form 35000 with auto-filled fields suggesting a rental price 35400 and User note template 35500, see FIG. 35.

State 35. The user modifies the offer rental price by clicking the increase offer adjustment soft key 35340 (again, see FIG. 35).

State 36. In response, the MPHI app updates the displayed rental price offer 36400 by 10%, see FIG. 36.

State 37. The user next composes a more detailed and personalized note 36500.

State 38. The user then submits their offer by clicking the Send Offer soft key 36330, see FIG. 36.

State 39. The MPHI application 800 receives the user's request and sends the completed rental offer form to the MPHI server 600.

State 40. The MPHI application, included as part of the additional information query request to the HI server, a determination request as to whether the owner participated in a network of users who will field requests for interest in the rental of their homes (e.g., a make me a rental offer network). In this example, the home owner participates in such a network (hereinafter referred to as the Make Rental Offer network) which the HI system is either a part of or has access to. Optionally, the home owner does not participate in such a network and other means are used to determine contact information for the home owner including, for example, reverse directory look ups (address to phone number), MLS, etc. Optionally, the system sends a United States Postal Service mail offer. Optionally, the HI system sends a request for contact information to a representative of the property owner, e.g., the real estate agent representing the sale of the property owner. In this example, the user is a member of the Make Rental Offer network and the system is able to readily obtain the property owner's email address. The HI server 600 queries the internal Make Rental Offer database 700 with the property owner's address as a query parameter.

State 41. The MPHI server extracts the home owner's email address from the contact information, creates an email with the specified rental offer price and user note, and sends the email to property owner. From this point forward, the HI server can optionally manage anonymous communications between the property owner and user/renter.

State 42. The MPHI server 600 receives confirmation that the EMail was successfully sent.

State 43. The MPHI server notifies the MPHI app that the user's rental offer/note was sent.

State 44. The MPHI application returns the user interface to the summary display of the selected rental property status 37000 (see FIG. 37) with a new field 37500 indicating that the offer/note has been delivered.

State 45. The user requests to close the MPHI application on his smartphone by depressing the HOME button 24200, see FIG. 24.

State 46. The MPHI application is closed and the SmartPhone display returned to its normal quiescent mode.

States 47-48 of FIG. 66. When the user returns to his apartment later in the day, he decides he wants to forward the picture and associated information regarding the potential rental property to his wife. The user browses to the MPHI web site; for an analogous workflow, see States 1-2 of example one above.

State 49. The user enters their login 38310 and password 38320 and presses the submit button 38330 (see FIG. 38) on their home computer.

State 50. The MPHI server 600 receives the login and password information entered by the user and authenticates the account against known users' account information in the customer data store 700.

State 51. The credentials of the user are valid and the MPHI server 600 responds by retrieving the user's current account status from the customer database 700.

State 52. The MPHI server then summarizes that status in a user Welcome web page 39000, see FIG. 39. The Welcome page includes, for example, a record 39501 of the transaction conducted earlier in the day. Optionally, there are controls for each logged property which allow the user to display addition property details 39311, to make a new rental offer 39331, or to choose from an expanded list of additional options 39321.

State 53. The user clicks the options key 39321.

State 54. The MPHI server 600 opens a pulldown menu 40340 on the web page 40000 (see FIG. 40).

State 55. The user scrolls their mouse through the menu items and selects the option of Forwarding Offer Details 40341, see FIG. 40.

State 56. The MPHI server receives the Forward Offer Details control request and launches a new web form 41000 to capture the user's forwarding parameters.

State 57. The user enters his wife's EMail address in the To Field 41211 of the web form 41000. Alternatively, he could have retrieved addresses from a local address book using the address book control 41210.

State 58. The user next enters the EMail Subject Line 41221.

State 59. The user then composes a note entered into the message body field 41231.

State 60. Finally, after reviewing the completed form, the user submits the information by clicking the "Send" key 41300.

State 61. The MPHI server receives the completed form, optionally validates that the email address is properly formatted, and then sends the associated property information to the entered email address.

State 62. The user notices that no response has been received from the property owner and logs out of the HI server by killing his browser.

The example above illustrates the advantage of the HI system for determining for a user the rental information and estimated rental price for a property of interest. Further, the methods and system described facilitate the rental of the property for both the lessor and lessee. Still further, the above illustrates how the invention can apply varying technologies in order to greatly simplify the user experience.

Fourth Example Embodiment

See FIGS. 67-70

FIGS. 67-70 depict a fourth example embodiment where a user adds a new purchased item to his Home Inventory. In this example, the user purchases a laser level and stores the item in his garage. Months later the user needs to use the level but cannot remember where the level is stored. The user uses the HI system to locate it.

States 1-15. These states are the same as the second example embodiment (see FIG. 57). State 16. The user purchases a good quality laser level from a local merchant for approximately $50. In this example, the purchased item does not contain an embedded RFID tag. The user returns home from the merchant and applies a color coded RFID label to the side of the laser level. (Note that this activity is not explicitly depicted in the state flow diagrams.)

Figure 67:
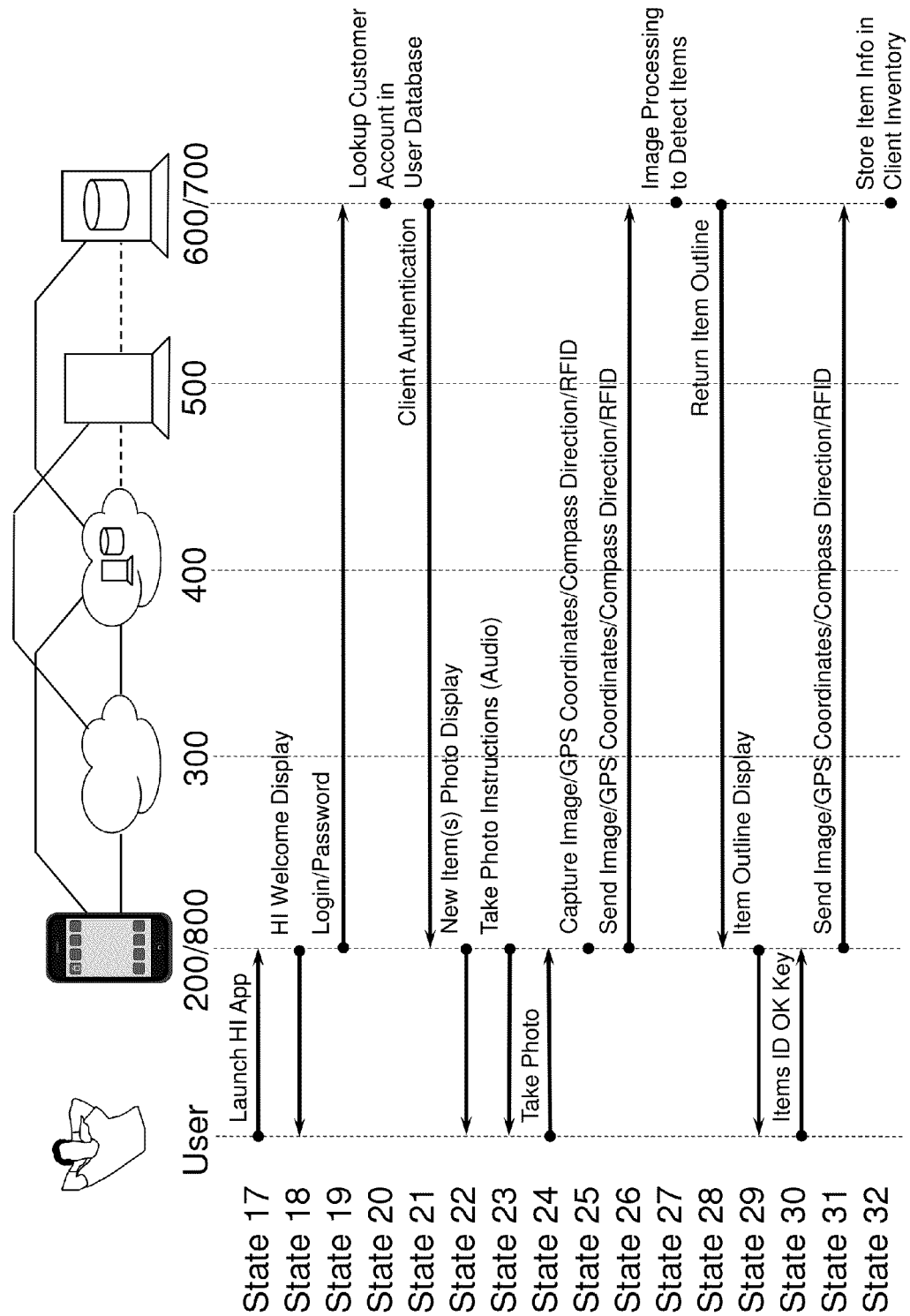

States 17-23 of FIG. 67. The user connects the RFID reader to his smartphone, which in this case automatically invokes the HI smartphone application 800, hereinafter in this application referred to as the "File It! HI app". The File It! HI app startup process is analogous to that depicted for the MPHI startup process (see States 16-22 of FIG. 58), State 23 concludes with an audio prompt 44210 from the smartphone 200 to the user to take a picture of the newly purchased item at the location in which the item is to be stored, see FIG. 44.

State 24. The user takes a picture of the newly purchased item beside the tool box in which it will be stored in the garage.

State 25. In this example, the File It! HI app 800, at the same time or nearly at the same time, performs or requests a GPS location query of the smartphone to determine the location of the smartphone at the moment that the picture was taken. In this example, the File It! HI app further performs or requests an RFID reading. Optionally, the compass direction the camera lens was pointing at the time the picture was take is also determined. Optionally, some or all of the information collected (the picture, camera direction, location coordinates, RFID reading results, and date and time) are stored in memory on the smartphone.

States 26-28. The image captured in the photo is analyzed, (e.g. using object edge detection techniques as previously described in this specification or by alternate means known to those skilled in the art of image processing), to identify discrete items. Optionally the File It! Application 800 independently performs this analysis without assistance from the server 600. The analysis includes confidence metrics to measure the quality of the original image and the probability of correct item discrimination. Optionally, the items are identified by the reflected signature of the RFIDs and/or the image processing.

State 29. Optionally, the File It! application depicts an outline drawing of detected items for the user to review to assist in the analysis. In this example, a simple display 45000 is presented for user approval prior to further analysis, see FIG. 45.

State 30. The users scans the display and observing that two items (45501 and 45502) have been correctly detected, advances the image processing by selecting the Item ID OK soft key 45320, see FIG. 45. Alternatively, the user could choose to rearrange the items and take another photo using the New Photo soft key 45310.

State 31. Upon receipt of user approval of the preliminary image processing results, the File It! application 800 signals the HI server 600 to continue processing to determine the types of objects detected in the image.

State 32. The File It! HI server determines from the picture, using pattern and/or text recognition techniques described in this specification or known to those skilled in the art of pattern and/or text recognition, what the type of the newly purchased item is and associates an item description which is then stored in the customer inventory record. Optionally, the items are identified by the reflected signature of the RFIDs and/or the image processing.

Figure 68:
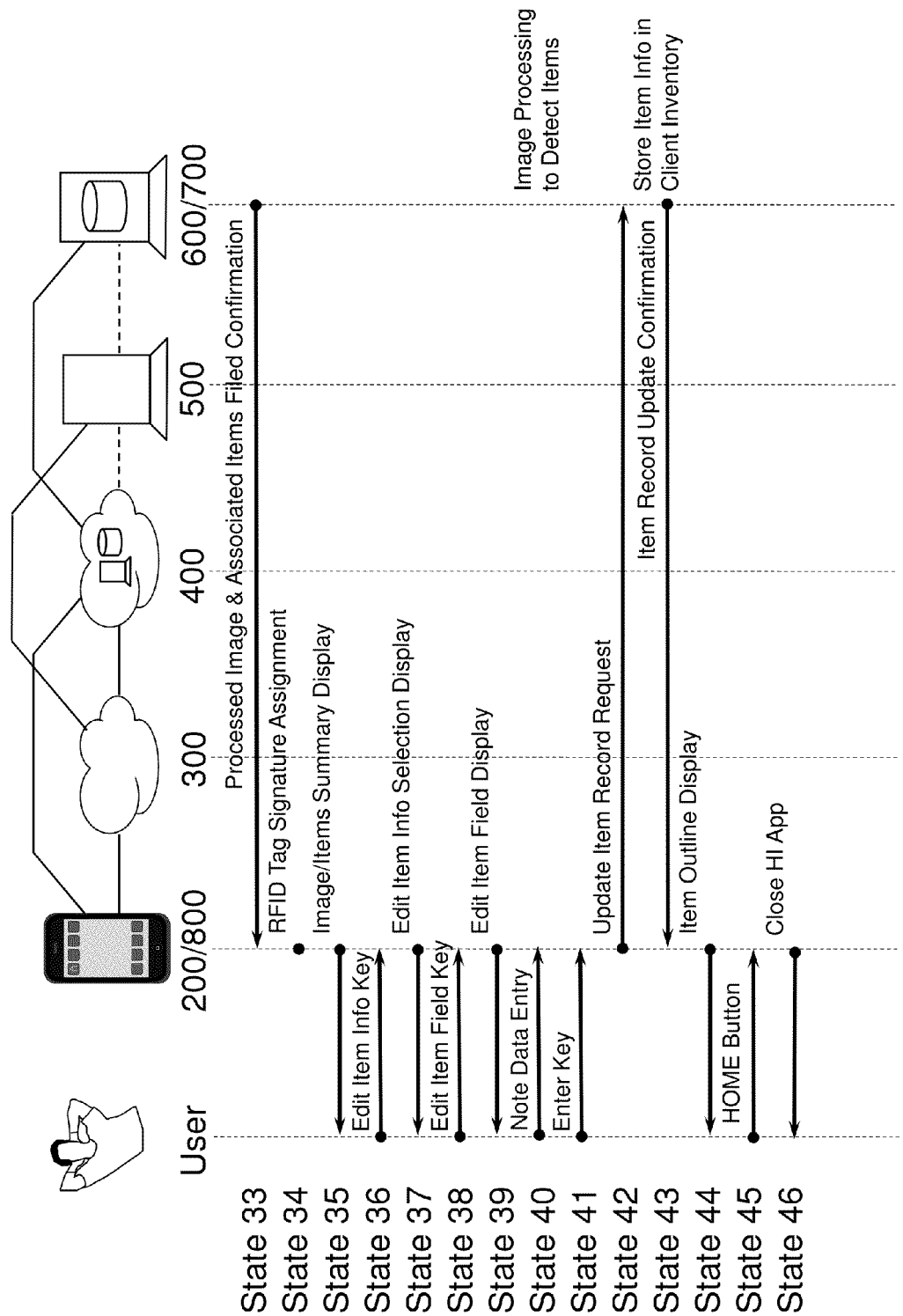

State 33 of FIG. 68. The server 600 then forwards the analysis results to the HI app 800 over the data network 400. The analysis includes confidence metrics to measure the quality of the original image and the probability of correct item type determination. In an alternate embodiment (not further described in this specification), the File It! Application 800 independently performs this analysis without assistance from the server 600

Optionally, the HI server and/or HI app prompts the user to confirm and/or edit the description. In an alternate embodiment (not further described in this specification), the HI app prompts the user to enter an item description if the user does not take a picture (or is using a device without image capture) or if the recognizer cannot recognize the item. Optionally, the picture is sent to an HI system server over a network (e.g., wireless data network) where the pattern and/or text recognition is applied to the picture. In this case, several additional states would be introduced including, for example, the sending of the picture to the HI server, the recognition processing (possibly including accessing one or more internal or external data stores and/or additional internal or external servers), and the sending of the recognition results back to HI app over a network.

State 34. Optionally, the HI app analyzes the RFID reading results. Optionally, if a single unassigned RFID tag is found (e.g., the RFID reader performs a scan and detects one or more RFID tags in the room and compares these detected RFID tags against those previously recorded for the room (or in another room)), the HI app presumes that this unassigned RFID tag is intended to be assigned to the new household item. The HI app assigns the RFID tag to the newly purchased item. Optionally, if there are multiple unassigned RFID tags the tag with the strongest return signal is used by the HI app. If there are more than one unassigned RFID tags, the HI app optionally prompts the user to confirm the selection by displaying the RFID color and/or code numbers of the unassigned tags. Optionally, the HI app prompts the user to perform associations of the unassigned items in a manner similar to that which is described in this example.

State 35. Upon receipt of the image processing results, the HI app formats a summary of the information 46000 which is presented to the user for review, see FIG. 46.

State 36. The user sees that the HI system has correctly identified two items: a tool box 46501 (in this example, previously tagged and filed) and a laser level 46502 (new item). The user decides to record a note to himself that the level will be stored in the tool box. The user clicks the Edit soft key 46332 for item #2 in the smartphone display.

State 37. The HI app honors the user request by displaying a menu 47000 that lists item fields and their current values.

State 38. The user selects the field 47336 that he desires to edit, see FIG. 47.

State 39. The HI app displays an edit Form 48000 for the selected fields, see FIG. 48.

State 40. The user fills-in a text note in the NOTE field 48500.

State 41. The user then clicks the enter soft key 48330, see FIG. 48.

State 42. The HP app confirms that the update field is properly formatted and forwards the information to the HI server.

State 43. Upon receipt of the new information, the HI server 600 updates the fields in the Client Inventory in the Customer database 700 and returns a confirmation message to the HI app 800.

State 44. The HI app returns the display to the item summary presentation 49000 including a display of the updated fields 49500, see FIG. 49.

State 45. The user is satisfied with the record of the new item filing and so presses the HOME button 24200, see FIG. 24.

State 46. The MPHI application is closed and the SmartPhone display returned to its normal quiescent mode.

Figure 69:
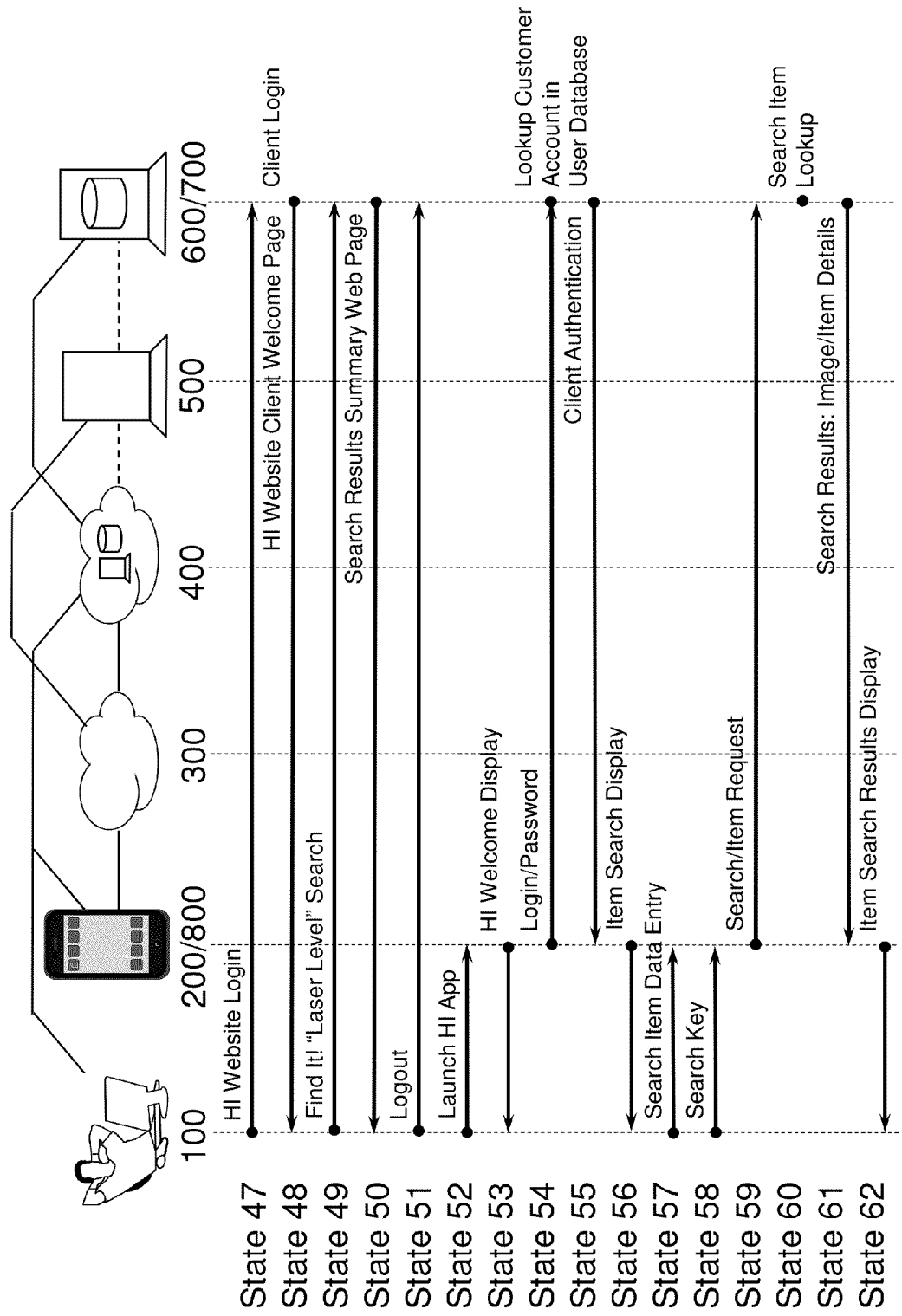

State 47 of FIG. 69. Months later, the user is getting ready to begin a minor construction project which will involve the use of the laser level. He cannot recall if he stored the laser level in the shed or garage and where within either of these two locations. The user is at his desk and logged into the Internet. The user accesses his online HI system account by entering the URL of the HI system and a user ID and password.

State 48. The system authenticates his login credentials and presents the user with an HI system user Welcome page. The states of browsing to or searching for an HI system home page on a web page, enter a user ID and password, selecting the Login control (or return) on the HI system web page, sending the login information to an HI system authentication server, authenticating the user information, and presenting the user home page are well known and not shown here for brevity. The resultant HI system client welcome page 50000 is shown in FIG. 50.

State 49. The user enters "laser lv1" in the search term data field 51510 on the HI system's user Welcome page followed by clicking the search control 51310, see FIG. 51.

State 50. The HI server receives the search request and queries the HI system's user account inventoried item labels and associated text descriptions. In this example, a match is found on the word "laser". The results of the query including the user's home address 52510, original item photo 52520, item line drawing rendition of the photo 52530, numbered item identification in the rendition 52540, item description with room location and compass location within that room 52541, and user entered notes 52542 associated with the specified item are displayed on the user's web page 52000, see FIG. 52.

State 51. The user, having obtained the information he was looking for, logs out of the HI system user account by clicking the Logout control 52210.

State 52. The user walks into the garage to the location specified, looks around for the laser level and the tool box and does not find either. He connects the RFID reader to his smartphone and launches the Find Stuff! HI app 42402, see FIG. 42.

States 53-55. An analogous smartphone app launch process ensues (e.g. by way of reference, see states 18-20 in FIG. 61, detailed in example two above). During this process, the smartphone displays the Find Stuff? HI App loading message 53010, see FIG. 53.

State 56. The Find Stuff? HI App opens by displaying search options 54000 to the user, see FIG. 54. The user is presented with an option to search for detailed information for an individual item 54510 (including its filed location) or to review the entire recorded inventoried items residing within a specific location/room 54520, see FIG. 54.

State 57. Fearing that the RFID tag can't be read inside the enclosed metal tool box, the user decides to attempt to find it first. The User enters the item description "Tool Box" in the search term data field 55510, shown in FIG. 55.

State 58. Then user next clicks the Item? Search soft key 55310 to review the previously filed location of the tool box and its contents.

State 59. The HI app 800 forwards the user's search request to the HI server 600 over the data network 400.

State 60. The HI server 600 looks up the specified item in the user's records of inventoried items in the customer database 700.

State 61. The HI server extracts the requested item records and returns the information to the HI app.

State 62. The HI app formats a summary of the requested item information 56000 (see FIG. 56) and displays it for user review.

State 63 of FIG. 70. The user sees that this information matches that reviewed previously at his desktop PC so he requests that the HI system attempt to locate the tool box in this room by selecting the Locate soft key 56340, see FIG. 56.

State 64. The HI app performs an RFID scan and does not detect the tag signature for the tool box.

State 65. The HI app informs the user of the scan result via a message 57500 (see FIG. 57) on the smartphone touch screen display. Optionally, the HI app also plays an error tone 57210 to the user.

State 66. The user assumes that the laser level and tool box must be in another part of the house; for instance the shed. He walks over to the shed and requests another RFID scan by clicking the Locate soft key 57340 a second time.

State 67. The HI app performs another RFID scan and does detect the tag signature for the tool box this time.

State 68. The HI app informs the user of the successful scan result via a message 58500 on the smartphone touch screen display, see FIG. 58. Optionally, the HI app also plays a different tone to the user to indicate a positive result (not shown in this example). In addition, the display also includes a new user control soft key 58340 to facilitate an easy update of the newly discovered location in the filed inventory record.

State 69. The user requests that the recorded item locations be updated to match the RFID scan results by selecting the Update soft key 58340.

State 70. The HI app passes the updated location information and a list of all detected items to the HI server.

State 71. The HI server 600 updates the flagged inventory items' location fields in the client's customer database records 700 and returns a confirmation message to the HI app 800. It also updates the room and wall location fields for all items linked to any of these items.

State 72. The HI app reformats the display 59000 with the newly filed item information including an updated item location listing 59500, see FIG. 59.

State 73. The user is satisfied with the updated record of the new location filing and so presses the HOME button 24200, see FIG. 24.

State 74. The MPHI application is closed and the SmartPhone display returned to its normal quiescent mode.

In an alternate embodiment (not shown), rather than requiring the user to select an individual user control (e.g. the Locate soft key) for a single RFID scan (see State 66 for example), the HI app could function like a Geiger counter and perform continuous periodic RFID scanning for a specific item used in conjunction with audio tones or spoken responses to indicate a scan result. The user would then be able to turn this function on and off as they walked about through the rooms of their property.

These examples illustrate the advantage of the HI system for creating and maintaining an inventory of household items and its subsequent use in finding/tracking the location of those items over current methods (e.g., those methods which rely upon user's simply remembering where an item was stored). Further, the above illustrates how the invention can apply varying technologies and techniques in order to greatly simplify the user experience.

In addition, it should be understood that certain variations and modifications of the systems and processes described herein would suggest themselves to one of ordinary skill in the art. The scope of the present invention is not to be limited by the illustrations or the foregoing descriptions thereof.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method of tagging an inventory of personal property items comprising:
    registering a user by an inventory system;
    providing an inventory software program associated with the inventory system, to a mobile device associated with the user, wherein some or all of the inventory software program is at least in part:
    preinstalled on the mobile device of the user,
    transmitted to the mobile device of the user, or
    preinstalled on the mobile device and transmitted to the mobile device of the user;
    partly causing an image capture instruction to be presented to the user on the mobile device;
    receiving at the inventory system:
        an image wherein the image is taken using the user's mobile device,
        a detected one or more RFID (Radio Frequency Identification) tags which are in proximity to an RFID reader associated with the user's mobile device at substantially the same time the image was taken by the user using the user's mobile device, and
        a geographic location of the user's mobile device wherein the geographic location is determined at least in part using a GPS (Global Position Satellite) location information and corresponds to at least in part the geographic location of the user's mobile device at substantially the same time the image was taken by the user using the user's mobile device;
    identifying at least in part by the inventory system a one or more items within the image;
    forming a one-to-one association of the detected one or more RFID tags with the one or more identified items within the image;
    forming a one-to-many association of a room identifier with the one or more identified items within the image;
    storing by the inventory system in computer readable memory, the one or more identified items and their associated RFID tags and room identifiers;
    providing a user interface via which the room identifier and the identified items can be (a) viewed, (b) edited, (c) reassigned or any combination of (a), (b), and (c) by the user.

2. The method as defined in claim 1, wherein the one-to-many association includes a one-to-one association.

3. The method as defined in claim 1, wherein the reassignment includes changing a first room identifier of an identified item to a second room identifier.

4. The method as defined in claim 1, the method further comprising:
    capturing a camera lens direction at substantially the same time the image was taken by the user using the user's mobile device;
    dividing the room where the image was taken into a one or more partitions;
    assigning a label to one of the partitions of the room based at least in part on the camera lens direction;
    forming a one-to-many association of the labeled room partition with the one or more identified items within the image; and
    storing the labeled room partition associated with the one or more identified items within the image.

5. The method as defined in claim 4, the method further comprising using a compass within the user's mobile device to determine the camera lens direction.

6. The method as defined in claim 4, wherein a divided room includes a north partition, a south partition, an east partition, and a west partition.

7. The method as defined in claim 1, wherein the formed assignment of the one-to-many association of the room identifier with the one or more identified items within the image is based at least in part on a color of the RFID tag.

8. The method as defined in claim 7, wherein the RFID tag color is determined by an Electronic Product Code or by processing the image.

9. The method as defined in claim 1, wherein the room identifier is a master bedroom, a guest bedroom, a garage, a shed, or a kitchen.

10. The method as defined in claim 1, wherein the user interface is provided (a) on the user's mobile device, (b) on a computing device other than the user's mobile device, or any combination of (a) and (b).

11. A method of tagging an inventory of personal property items comprising:
    registering a user by an inventory system;
    providing an inventory software program associated with the inventory system, to a mobile device associated with the user, wherein some or all of the inventory software program is at least in part:
    preinstalled on the mobile device of the user,
    transmitted to the mobile device of the user, or
    preinstalled on the mobile device and transmitted to the mobile device of the user;
    partly causing an image capture instruction to be presented to the user on the mobile device;
    receiving at the inventory system:
        an image wherein the image is taken using the user's mobile device, and
        a detected one or more RFID (Radio Frequency Identification) tags which are in proximity to an RFID reader associated with the user's mobile device at substantially the same time the image was taken by the user using the user's mobile device;
    providing at least in part a first user interface via which a room identifier can be specified, confirmed, or specified and confirmed by the user;
    identifying at least in part by the inventory system, a one or more items within the image;
    forming a one-to-one association of the detected one or more RFID tags with the one or more identified items within the image;
    forming a one-to-many association of a room identifier with the one or more identified items within the image;
    storing by the inventory system in computer readable memory, the one or more identified items and their associated RFID tags and room identifiers;

providing at least in part a second user interface via which the room identifier and the identified items can be (a) viewed, (b) edited, (c) reassigned or any combination of (a), (b), and (c) by the user.

12. The method as defined in claim 11, wherein the room identifier confirmed by the user is an identifier determined by the inventory system using at least in part the one or more identified items in the image.

13. The method as defined in claim 11, wherein the second user interface is the first user interface.

14. The method as defined in claim 11, the method further comprising:
- capturing a camera lens direction at substantially the same time the image was taken by the user using the user's mobile device;
- dividing the room where the image was taken into a one or more partitions; assigning a label to one of the partitions of the room based at least in part on the camera lens direction;
- forming a one-to-many association of the labeled room partition with the one or more identified items within the image; and
- storing the labeled room partition associated with the one or more identified items within the image.

15. The method as defined in claim 14, the method further comprising using a compass within the user's mobile device to determine the camera lens direction.

16. The method as defined in claim 11, wherein the image is a picture or a video.

17. The method as defined in claim 11, wherein the image is a plurality of images.

18. The method as defined in claim 11, wherein the formed assignment of the one-to-many association of the room identifier with the one or more identified items within the image is based at least in part on a color of the RFID tag.

19. The method as defined in claim 17, wherein the RFID tag color is determined by an Electronic Product Code or by processing the image.

20. A system of tagging an inventory of personal property items comprising:
at least one computing device;
program instructions stored in non-transitory memory, that when executed by the at least one computing device, are configured to cause the system to perform operations comprising:
registering a user;
providing an inventory software program to a mobile device associated with the user, wherein some or all of the inventory software program is at least in part:
- preinstalled on the mobile device of the user,
- transmitted to the mobile device of the user, or
- preinstalled on the mobile device and transmitted to the mobile device of the user;
partly causing an image capture instruction to be presented to the user on the mobile device;
receiving:
- an image wherein the image is taken using the user's mobile device, and
- a detected one or more RFID (Radio Frequency Identification) tags which are in proximity to an RFID reader associated with the user's mobile device at substantially the same time the image was taken by the user using the user's mobile device;
providing at least in part a first user interface via which a room identifier can be specified, confirmed, or specified and confirmed by the user;
identifying at least in part a one or more items within the image;
forming a one-to-one association of the detected one or more RFID tags with the one or more identified items within the image;
forming a one-to-many association of a room identifier with the one or more identified items within the image;
storing the one or more identified items and their associated RFID tags and room identifiers;
providing at least in part a second user interface via which the room identifier and the identified items can be (a) viewed, (b) edited, (c) reassigned or any combination of (a), (b), and (c) by the user.

* * * * *